United States Patent
Groza et al.

(10) Patent No.: US 11,674,317 B2
(45) Date of Patent: Jun. 13, 2023

(54) APPARATUS AND PROCESS WITH A VIBRATORY ANGLED PLATE AND/OR FIXED HORIZONTAL PLATE FOR FORMING FIBER-REINFORCED CEMENTITIOUS PANELS WITH CONTROLLED THICKNESS

(71) Applicant: UNITED STATES GYPSUM COMPANY, Chicago, IL (US)

(72) Inventors: Peter Brandon Groza, Antioch, IL (US); David R. Blackburn, Barrington, IL (US); Ashish Dubey, Grayslake, IL (US); Eugene Scott Stivender, Yorkville, IL (US); Andrew Henry Bauer, Beloit, WI (US); Rajesh Raitani, Buffalo Grove, IL (US); Nicholas McCartney, Harwood Heights, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 207 days.

(21) Appl. No.: 17/116,416

(22) Filed: Dec. 9, 2020

(65) Prior Publication Data

US 2021/0189737 A1 Jun. 24, 2021

Related U.S. Application Data

(60) Provisional application No. 62/952,660, filed on Dec. 23, 2019.

(51) Int. Cl.
*E04F 13/16* (2006.01)
*C04B 28/14* (2006.01)
(Continued)

(52) U.S. Cl.
CPC .............. *E04F 13/16* (2013.01); *B28B 1/522* (2013.01); *C04B 28/14* (2013.01); *E04C 2/06* (2013.01); *C04B 2201/20* (2013.01)

(58) Field of Classification Search
None
See application file for complete search history.

(56) References Cited

U.S. PATENT DOCUMENTS

| | | |
|---|---|---|
| 3,969,056 A | 7/1976 | Larsen et al. |
| 4,379,729 A | 4/1983 | Cross |

(Continued)

FOREIGN PATENT DOCUMENTS

| | | |
|---|---|---|
| JP | 10180728 A | 7/1998 |
| JP | 2004074631 A | 3/2004 |

*Primary Examiner* — Jeffrey D Washville
(74) *Attorney, Agent, or Firm* — Vorys, Sater, Seymour & Pease LLP; Philip T. Petti; Pradip K. Sahu

(57) ABSTRACT

A production line and process including a moving carrier web for transporting the panel, and a device for controlling thickness of a formed, but not yet set, fiber reinforced cementitious panel slurry on the web. The thickness control device may include an angled rigid plate for contacting a downstream end of the angled plate with the slurry on the moving carrier web and a mounting stand for mounting the angled rigid. The thickness control device may include a flat horizontal plate at a fixed height over the moving carrier for contacting the entire lower surface of the horizontal plate with a facer on the slurry on the moving carrier web. Or, the thickness control device may include the angled plate and include the horizontal plate that contacts the facer.

20 Claims, 37 Drawing Sheets
(7 of 37 Drawing Sheet(s) Filed in Color)

(51) Int. Cl.
  *B28B 1/52* (2006.01)
  *E04C 2/06* (2006.01)

(56) References Cited

U.S. PATENT DOCUMENTS

| | | |
|---|---|---|
| 4,450,022 A | 5/1984 | Galer |
| 4,642,042 A | 2/1987 | Smith |
| 5,221,386 A | 6/1993 | Ensminger et al. |
| 6,620,487 B1 | 9/2003 | Tonyan et al. |
| 6,702,966 B1 | 3/2004 | Suzuki et al. |
| 6,878,321 B2 | 4/2005 | Hauber et al. |
| 6,986,812 B2 | 1/2006 | Dubey et al. |
| 7,182,589 B2 | 2/2007 | Porter |
| 7,300,515 B2 | 11/2007 | Porter |
| 7,445,738 B2 | 11/2008 | Dubey et al. |
| 7,475,599 B2 | 1/2009 | Frank et al. |
| 7,513,768 B2 | 4/2009 | Porter et al. |
| 7,513,963 B2 | 4/2009 | Frank et al. |
| 7,524,386 B2 | 4/2009 | George et al. |
| 7,670,520 B2 | 3/2010 | Dubey |
| 7,754,052 B2 | 7/2010 | Frank et al. |
| 7,789,645 B2 | 9/2010 | Dubey et al. |
| 7,794,221 B2 | 9/2010 | Dubey |
| 7,841,148 B2 | 11/2010 | Tonyan et al. |
| 8,038,790 B1 | 10/2011 | Dubey et al. |
| 8,038,915 B2 | 10/2011 | Stivender |
| 8,163,352 B2 | 4/2012 | Jones |
| 8,770,139 B2 | 7/2014 | Frank et al. |
| 10,272,399 B2 | 4/2019 | Dubey et al. |
| 2004/0089393 A1 | 5/2004 | Watras |
| 2005/0064164 A1 | 3/2005 | Dubey et al. |
| 2007/0149083 A1 | 6/2007 | Agrawal |
| 2008/0099133 A1* | 5/2008 | Stivender ............... B01F 27/13 156/500 |
| 2009/0297865 A1 | 12/2009 | Hauber et al. |
| 2010/0132870 A1 | 6/2010 | Stivender |
| 2010/0227073 A1* | 9/2010 | Frank ...................... B28B 13/02 427/420 |
| 2016/0222656 A1 | 8/2016 | Teng et al. |
| 2018/0036909 A1 | 2/2018 | Dubey et al. |
| 2018/0036911 A1 | 2/2018 | Dubey et al. |
| 2018/0036912 A1 | 2/2018 | Dubey et al. |
| 2019/0329448 A1 | 10/2019 | Davis et al. |

* cited by examiner

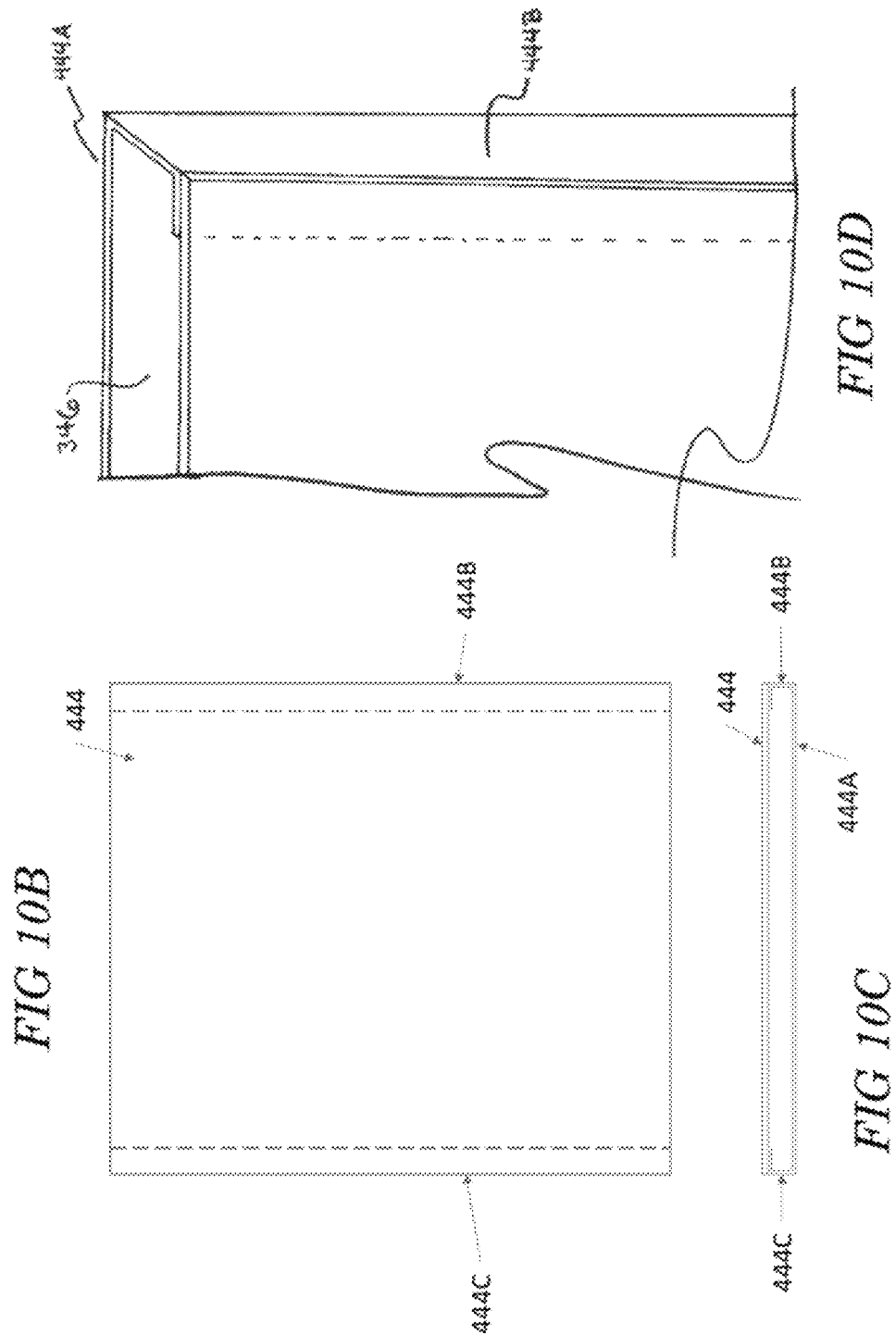

Standard deviation and difference of maximum and minimum thickness of formed panels at different experimental conditions in samples measured in cross machine direction with and without the angled plate thickness control device of the present invention. Control #1 and #2 are experimental conditions without the present invention.

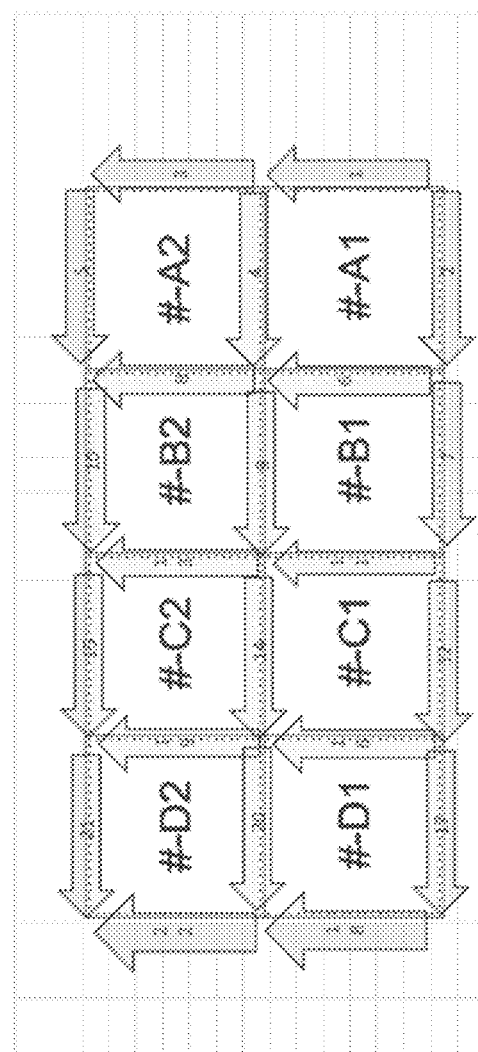

Cross-section profile of a formed cementitious panel without using the angled plate thickness control device of the present invention Cross-section profile of a formed cementitious panel when using the angled plate thickness control device of the present invention Standard deviation and difference of maximum and minimum thickness of formed panels at different experimental conditions in samples measured in machine direction with and without the angled plate thickness control device of the present invention. Control #1 and #2 are experimental conditions without the angled plate of the present invention.

Cross-section profile of a formed cementitious panel without use of the angled plate thickness control device of the present invention Cross-section profile of a formed cementitious panel when using the angled plate thickness control device of the present invention

APPARATUS AND PROCESS WITH A VIBRATORY ANGLED PLATE AND/OR FIXED HORIZONTAL PLATE FOR FORMING FIBER-REINFORCED CEMENTITIOUS PANELS WITH CONTROLLED THICKNESS

CROSS REFERENCE TO RELATED APPLICATION

This application claims the benefit of priority from U.S. Provisional Patent Application No. 62/952,660 filed on Dec. 23, 2019, the entire disclosure of which is incorporated herein by reference.

FIELD OF THE INVENTION

This invention relates to a continuous process and related apparatus for producing structural panels using settable slurry, and more specifically, to a thickness control device for controlling thickness to reduce thickness variation during the manufacture of fiber-reinforced cementitious panels (FRC panels) in which fibers are combined with quick-setting slurry for providing flexural strength. These FRC panels are also referred to herein as fiber-reinforced concrete panels or structural cement panels (SCP panels).

BACKGROUND OF THE INVENTION

Fiber-reinforced concrete panels (FRC panels) may be formed by laying down alternating layers of reinforcing glass fibers and cementitious slurry. A thin layer of slurry is deposited to the line. A glass fiber chopper then deposits a layer of chopped glass on top of the slurry. A double disc embedment roller then embeds the glass fibers into the slurry as disclosed. For example the process may include 4 layering stations, which are situated in series over a conveyor belt, after which the product has reached an overall average thickness. Next, two vibrating screed plates skim over the top of the panel while the layered mass is still somewhat flowable, providing a smoothing effect on the top surface. An exemplary process is disclosed in U.S. Pat. No. 7,794,221 to Dubey. This process is repeated several times until the panel is the desired thickness.

U.S. Pat. No. 7,445,738 to Dubey et al. discloses a multi-layer process for producing fiber-reinforced concrete panels (FRC panels), termed structural cementitious panel, which includes: (a.) providing a moving web; (b.) one of (i) depositing a first layer of individual, loose fibers upon the web, followed by depositing a layer of settable slurry upon the web or (ii) depositing a layer of settable slurry upon the web; (c.) depositing a second layer of individual, loose fibers upon the slurry; (d.) actively embedding said second layer of individual, loose fibers into the slurry to distribute said fibers throughout the slurry; and (e.) repeating steps (ii) through (d.) until the desired number of layers of settable fiber-enhanced slurry is obtained and so that the fibers are distributed throughout the panel.

U.S. Pat. No. 8,038,790 to Dubey et al. discloses structural cement panels employing one or more layers of a continuous phase resulting from curing an aqueous mixture of calcium sulfate alpha hemihydrate, hydraulic cement, coated expanded perlite particles filler, optional additional fillers, active pozzolan and lime. The coated perlite has a particle size of 1-500 microns, a median diameter of 20-150 microns, and an effective particle density (specific gravity) of less than 0.50 g/cc. The panels are reinforced with fibers, for example alkali-resistant glass fibers.

US 2018/0036912 to Dubey et al. discloses a single-layer process for producing slurry for cementitious panels having high reinforcing fiber concentrations. These fiber reinforced cementitious panels are made with edges wrapped in a surface reinforcing web such as a nonwoven fiber mat, on the panel production line, where the nonwoven fiber mat may be a polypropylene mat or a fiberglass mat. The process applies a first nonwoven fiber mat onto the surface of a moving endless belt and a second nonwoven fiber mat over the setting fiber-slurry mixture.

Other aspects of single layer processes for producing slurry for cementitious panels having high reinforcing fiber concentrations are disclosed by the following:

US Published Patent Application No. 2018-0036912 A1 to Dubey et al, entitled METHODS OF MAKING FIBER REINFORCED CONCRETE PANELS USING A CONTINUOUS PROCESS;

U.S. Pat. No. 10,272,399 to Dubey et al, entitled A METHOD FOR PRODUCING FIBER REINFORCED CEMENTITIOUS SLURRY USING A MULTI-STAGE CONTINUOUS MIXER (also published as US 2018-0036693 A1);

US Published Patent Application No. 2018-0036911 A1 to Dubey et al, entitled CONTINUOUS MIXER AND METHOD OF MIXING REINFORCED FIBERS WITH CEMENTITIOUS MATERIALS;

US Published Patent Application No. 2018-0036909 A1 to Dubey et al entitled HEADBOX AND FORMING STATION FOR FIBER REINFORCED CEMENTITIOUS PANEL PRODUCTION.

These structural FRC panel manufacturing processes include two separate production lines: The Forming Line, and the Finishing Line. During panel formation on the Forming Line, panel thickness is thicker than the finished product. This extra material is provided so the entire panel, including thickness variations, meets a desired minimum thickness to ensure there are no thin spots on the finished panels. However, the extra material is removed when panels are run through the Finishing Line to have the entire panel meet the desired minimum thickness without thickness variations. Thus, typically, the final thickness and surface of the fiber reinforced structural cement panels (also known as fiber reinforced concrete panels) are the result of a separate sanding and finishing process. This practice has several disadvantages. Product is thicker than the desired product thickness due to the constraints imposed by the formation process. Added sanding on the panel finishing line is necessary to achieve correct panel thickness. The product formed has dimensions (length and width) greater that the desired final product dimensions. This requires an added processing step on the panel finishing line to cut the panel to final dimensions. Panel production efficiency is reduced due to the additional time and steps for finishing.

It would be desirable to form the panels thinner, because a later step in the process will grind the panels to desired thickness, and the material which is ground off is waste. However, when attempting to form to a thinner average, there will be localized areas which are less than desired thickness, and this results in entire panels which cannot be sold, hence it is currently more economical to form too thick and then grind to desired thickness.

U.S. Pat. No. 6,702,966 of Suzuki et al. discloses a thickness control apparatus 4 having a vibrating leveler 2a on a smooth forming pressure plate 2b for smoothing the surface of slurry A'. The smooth-forming pressure plate 2b is tiltable and inclines downwardly and is set to have an incidence angle between 5 and 10 degrees, preferably 7 degrees. Angles less than 2 degrees cause formation of bubbles (see Col. 4, ll. 36-58).

U.S. Pat. No. 8,163,352 (US2009/0043780) of Jones discloses a production line having a smoothing device, also termed a vibrating edger bar, to gently smooth an upper surface of the deposited slurry layer prior to depositing the next respective fiber overlayer.

U.S. Pat. No. 8,038,915 (20100132870) of Stivender discloses a flexible curved smoothing sheet or shroud disposed transversely of a direction of travel of a formed fiber panel slurry, where the flexible sheet is designed to float over the surface of the formed panel without tearing or otherwise damaging the surface of the heavily fiber reinforced surface layers of the panel (see Abstract).

However, there is a still a need for additional thickness control in the production of fiber reinforced cementitious panels.

SUMMARY OF THE INVENTION

The invention provides a thickness control device and method for reducing thickness variation during formation of fiber reinforced cementitious panels. By minimizing or eliminating grinding, sanding, and/or edge finishing, there will be a significant cost savings in raw materials and other operating costs, such as Labor and Maintenance. Specific cost savings items will include reduced raw material usage, less waste handling, less wear and tear, and increased production speed on the finishing line. There may also be other advantages, such as a reduction in the amount of warp during the panel curing process, which will further reduce waste cost.

The present invention features a thickness control device having an adjustable but fixed position to apply a uniform pressure to the entire top surface of a formed fiber reinforced cementitious panel as it exits a headbox and/or exits an embedment device of a slurry forming station and/or further downstream of the headbox and/or an embedment device. The thickness control device levels and smooths the surface of the FRC panel and controls panel thickness without damaging the FRC panel. As used in this disclosure and depending on the context, one skilled in the art will understand that the term "panel" may include a panel precursor which is a cementitious product that has not yet been formed or cut into discrete panels.

The invention provides a fiber reinforced cementitious panel (FRC) production line comprising:
  a moving carrier web,
  a support frame for supporting the moving carrier web, wherein the panel is transported on the moving carrier web having a direction of travel relative to the support frame, and
  a thickness control device for controlling thickness of a formed, but not yet set or cut, fiber reinforced cementitious structural panel comprising fiber laden cementitious slurry comprising cementitious material and embedded chopped fibers on the moving carrier web,
    wherein the thickness control device comprises
    an angled rigid plate and
    a mounting frame for mounting the angled rigid plate over the support frame for the moving carrier web, and
    a flat, rigid support bed under the angled rigid plate, adapted and configured sufficient to support the fiber laden slurry and preferably withstand downward force exerted by the angled rigid plate with deflection less than 0.03 inches, preferably less than 0.01 inches, preferably less than 0.003 inches,
    the angled rigid plate having a transverse upstream back wall, a transverse downstream bottom wall extending downstream from a lower end of the transverse upstream back wall, open sidewalls and an open top, wherein the bottom wall lower surface has a flat horizontal profile, the transverse upstream back wall meeting the downstream bottom wall to form a bent transition section aligned transverse to the moving carrier web direction of travel, and the transverse upstream back wall meeting the transverse downstream bottom wall to form an angle in a range of 60 to 120 degrees, preferably from 70° to 110°, and most preferably from 80° to 100°, the transverse upstream back wall directed from the bent transition section upwardly away from the moving carrier web, the transverse downstream bottom wall directed from the bent transition section downwardly towards the moving carrier web,
    the angled rigid plate transverse upstream back wall mounted to the mounting stand to be transverse to the direction of travel of the moving carrier web,
    a vibrator attached to the angled rigid plate transverse upstream back wall,
    the mounting stand for fixedly, but adjustably, maintaining height of the angled plate over the moving carrier web and fixedly, but adjustably, maintaining angle of the angled plate relative to the moving carrier web 5° to 30°, typically the angle is in the range of 10° to 25°, to fixedly locate a downstream end of the transverse bottom wall at a height of 0.1 to 2 inches, preferably 0.2 to 1.1 inches, over the moving carrier web,
    wherein the downstream end of the transverse bottom wall is transverse to the direction of travel of the slurry and moving carrier web,
    wherein the downstream end of the transverse bottom wall extends transversely across the moving web, and
    wherein the downstream end of the transverse bottom wall is capable of contacting the fiber-laden cementitious slurry when carried on the moving carrier web.

The flat, rigid support bed under the angled rigid plate may be under or over the carrier web. The carrier web is typically an endless belt. The deflection less than 0.03 inches, preferably less than 0.01 inches, preferably less than 0.003 inches is deflection in a vertical direction relative to the horizontal moving carrier web.

Thus, the downstream end of the transverse bottom wall extends transversely across a path for the slurry on the moving web. Also, the angle of the angled plate relative to the moving carrier web places the downstream end of the transverse bottom wall lower than the upstream end of the transverse bottom wall.

The mounting stand mounts the angled rigid plate on or about the support for the traveling carrier web, typically at a position after the carrier web exits a headbox and/or an embedment device of a slurry forming station. The angled rigid plate back wall (vertical leg) and bottom wall (horizontal leg) are made for example of lightweight metal, which is relatively short and as wide as the formed fiber reinforced cementitious slurry panel. The horizontal leg of the angled rigid plate is disposed generally transversely to the direction of travel of the panel on the carrier web. The vibrator is mounted on the top surface of the back wall for imparting vibration to the angled rigid plate which will cause the surface of the angled rigid plate to vibrate while in use.

With respect to the angled plate the term "rigid" means it has sufficient strength to resist bending or flexing when contacting a slurry according to the invention.

The transverse bottom wall (also known as a horizontal leg) of the angled rigid plate is set, relative to the moving web and relative to the slurry moving underneath, to a fixed small angle of entry, e.g., 5° to 30°, typically the angle is in the range of 10° to 25°. Thus, only the surface of a downstream end portion of the angled rigid plate contacts the top surface of the slurry for forming the panel. This allows for a firm controlled contact with the fiber laden slurry as the angled rigid plate levels and smooths the slurry surface. The angled rigid plate height and angle adjustment and support system is configured such that the height of the angled rigid plate and angle of contact of the angled rigid plate with the fiber laden slurry is fixed, but adjustable, during this contact.

The shape of the angled plate may be an L-shape, but need not be a perfect L-shape, i.e., the angle "8" between the transverse upstream back wall and the transverse downstream bottom wall may not necessarily be always 90°. The angle between the back wall and bottom wall is fixed but may range from obtuse to acute. For example, the angle between the two walls may range from 60° to 120°, preferably from 70° to 110°, and most preferably from 80° to 100°. Furthermore, the transition geometry between the back wall and the bottom wall can be sharp or curved. The transverse upstream back wall and the transverse downstream bottom wall may be a single piece that forms the angle "8" or two pieces fixedly attached, for example by welding that form the angle "8".

The invention also provides a continuous process for controlling thickness of a formed, but not yet set, fiber reinforced cementitious panel comprising fiber laden cementitious slurry comprising cementitious material and embedded chopped fibers, in the fiber reinforced cementitious panel production line described above comprising the steps of:

transporting the panel on a moving carrier web having a direction of travel relative to a support frame for supporting the moving carrier web, contacting the formed, but not yet set, fiber reinforced cementitious panel comprising slurry and embedded chopped fibers with a downstream end of a thickness control device, wherein the thickness control device comprises
an angled rigid plate and
a mounting frame for mounting the angled rigid plate over the support frame for the moving carrier web, and
a flat, rigid support bed under the angled rigid plate, adapted and configured sufficient to support the fiber laden slurry and preferably withstand downward force exerted by the angled rigid plate with deflection less than 0.03 inches, preferably less than 0.01 inches, preferably less than 0.003 inches, the angled rigid plate having a transverse upstream back wall, a transverse downstream bottom wall extending downstream from a lower end of the transverse upstream back wall, open sidewalls and an open top, wherein the bottom wall lower surface has a flat horizontal profile, the transverse upstream back wall meeting the downstream bottom wall to form a bent transition section aligned transverse to the moving carrier web direction of travel, and the transverse upstream back wall meeting the transverse downstream bottom wall to form an angle in a range of 60 to 120 degrees, preferably from 70° to 110°, and most preferably from 80° to 100°, the transverse upstream back wall directed from the bent transition section upwardly away from the moving carrier web, the transverse downstream bottom wall directed from the bent transition section downwardly towards the moving carrier web, wherein the angled plate transverse upstream back wall is mounted to the mounting stand to be transverse to the direction of travel of the moving carrier web, a vibrator attached to the angled plate transverse upstream back wall, the mounting stand fixedly, but adjustably, maintaining height of the angled plate over the moving carrier web and fixedly, but adjustably, maintaining angle of the angled plate relative to the moving carrier web less than 30°, typically the angle is 5° to 30°, preferably in the range of 10° to 25°, to fixedly locate the downstream end of the bottom wall at a height of 0.1 to 2 inches, preferably 0.2 to 1.1 inches, over the moving carrier web, wherein the downstream end of the bottom wall contacts the fiber-laden slurry carried on the moving carrier web to control the thickness of the fiber laden slurry.

The flat, rigid support bed under the angled rigid plate may be under or over the carrier web. The carrier web is typically an endless belt.

Quite unexpectedly it has been found that a more uniform panel surface profile across the panel width is obtained when the outer lip of the bottom wall of the angled rigid plate assembly is situated below the top surface of panel being formed. Accordingly, the outer lip of the bottom wall of the angled rigid plate assembly is situated from about 0.01 inches to 0.25 inches below the top surface of the panel being formed.

Typically the thickness control device comprising the angled rigid plate and mounting frame may be employed in a multi-layer process or a single layer process for producing fiber reinforced cementitious panels (FRC panels).

In a first version of the multi-layer process, the process makes an initial deposit of loosely distributed, chopped fibers or a layer of cementitious slurry upon a moving web and then deposits fibers upon the slurry layer. An embedment device thoroughly mixes the recently deposited fibers into the slurry so that the fibers are distributed throughout the slurry to form a fiber laden cementitious slurry, after which additional layers of slurry, then chopped fibers are added, followed by more embedment by additional embedment devices. The process is repeated for each layer of the panel, as desired. The thickness control device is employed downstream of one or more of the embedment devices to contact the layer of fiber laden cementitious slurry to level and control the thickness of the layer. Downstream is an apparatus for cutting the set slurry into FRC panels.

In a second version of the multi-layer process the first version of the process is modified by depositing an additional layer of loose fibers upon existing fiber laden cementitious slurry after an embedment device, followed by a layer of slurry, then another layer of fibers. Next, the fiber/slurry/fiber combination is subjected to embedding to thoroughly mix the fibers in the slurry. The thickness control device is employed downstream of one or more of the embedment devices before the additional layer of loose fibers is deposited upon the existing fiber laden cementitious slurry. Thus, it contacts the layer of existing fiber laden cementitious slurry to level and control the thickness of the layer.

In the single layer process for making fiber reinforced concrete (FRC) panels the fiber laden slurry is mixed upstream of a headbox (slurry feed station) of a panel production line. Then this fiber laden cementitious slurry is fed to a slurry feed apparatus (known as a "headbox") and deposited directly by the headbox onto the moving carrier web the panel production line uniformly as a layer 0.125 to 2 inches thick, preferably 0.25 to 1 inches thick, typically 0.40 to 0.75 inches thick to produce the fiber reinforced cement panel. In the process for producing cementitious panels from fiber-slurry mixtures of the present invention produces panels having at most a single layer of fiber reinforced cementitious slurry, preferably the moving surface moves at a speed of 1 to 100 feet per minute, more preferably 5 to 50 feet per minute. Other speeds above 100 feet per minute are also contemplated, as one skilled in the art would understand. Downstream is an apparatus for cutting the set slurry into FRC panels.

Thus, the thickness control device of the present invention may be employed downstream of the headbox as part of an apparatus for producing a cementitious panel having at most a single layer of fiber reinforced cementitious composition which includes a conveyor-type frame supporting a moving web; a mixer system for mixing water, cementitious material and fibers in operational relationship to the frame and configured for feeding the resulting fiber-slurry mixture to the headbox in operational relationship to the frame and configured for depositing a layer of settable fiber-containing cementitious slurry upon the moving web.

In particular, the thickness control device of the invention comprising an angled rigid plate can be applied downstream of the headbox, preferably immediately downstream of a headbox, in a continuous process for depositing a uniform layer of a cementitious slurry containing reinforcing fibers from the headbox onto a traveling web comprising:

depositing the cementitious slurry containing reinforcing fibers on the inside surface of the rigidly mounted headbox, depositing the cementitious slurry containing reinforcing fibers from the headbox as a continuous layer on to a travelling web;

wherein the cementitious slurry containing reinforcing fibers deposited from the headbox has a slump of 4 to 11 inches as measured according to a slump test using a 4-inch-tall and 2 inch diameter pipe, the resulting cementitious slurry containing reinforcing fibers also has a viscosity less than 45000 centipoise, preferably less than 30000 centipoise, more preferably less than 15000 centipoise, and most preferably less than 10000 centipoise when measured using a Brookfield Viscometer, Model DV-II+ Pro with Spindle HA4 attachment running at 20 RPM speed. typically, the resulting fiber-slurry mixtures have a viscosity of at least 1500 centipoise; and contacting the formed, but not yet set, fiber reinforced cementitious panel comprising the cementitious slurry containing reinforcing fibers with a downstream end of a thickness control device, wherein the thickness control device comprises an angled rigid plate and a mounting frame for mounting the angled rigid plate over the support frame for the moving carrier web, and a flat, rigid support bed under the angled rigid plate, adapted and configured sufficient to support the fiber laden slurry and preferably withstand downward force exerted by the angled rigid plate with deflection less than 0.03 inches, preferably less than 0.01 inches, preferably less than 0.003 inches, the angled rigid plate having a transverse upstream back wall, a transverse downstream bottom wall extending downstream from a lower end of the transverse upstream back wall, open sidewalls and an open top, wherein the bottom wall lower surface has a flat horizontal profile, the transverse upstream back wall meeting the downstream bottom wall to form a bent transition section aligned transverse to the moving carrier web direction of travel, and the transverse upstream back wall meeting the transverse downstream bottom wall to form an angle in a range of 60 to 120 degrees, preferably from 70° to 110°, and most preferably from 80° to 100°, the transverse upstream back wall directed from the bent transition section upwardly away from the moving carrier web, the transverse downstream bottom wall directed from the bent transition section downwardly towards the moving carrier web, the angled plate transverse upstream back wall mounted to the mounting stand to be transverse to the direction of travel of the moving carrier web, a vibrator attached to the angled plate transverse upstream back wall, the mounting stand fixedly, but adjustably, maintaining height of the angled plate over the moving carrier web and fixedly, but adjustably, maintaining angle of the angled plate relative to the moving carrier web less than 30°, typically the angle is 5° to 30°, preferably in the range of 10° to 25°, to fixedly locate the downstream end of the bottom wall at a height of 0.1 to 2 inches over the moving carrier web, wherein the downstream end of the bottom wall contacts the fiber-laden slurry carried on the moving carrier web to control the thickness of the fiber laden slurry.

In another aspect of the invention, the invention may provide an FRC panel production line comprising a horizontal thickness control device comprising a horizontally oriented top forming plate having an adjustable but fixed height to apply a uniform pressure to the entire top surface of a formed fiber reinforced cementitious panel as it exits a headbox and/or an embedment device of a slurry forming station and/or further downstream of the headbox and/or an embedment device to level and smooth the surface of the panel and control panel thickness without damaging the panel.

More specifically, the invention provides an FRC panel production line and a method for FRC panel production which reduces thickness variation during formation of fiber reinforced cementitious panels, with the use of a facer, such as a glass mat placed across the width of the forming surface (belt/plate) and a rigid horizontal top forming plate. With the new invention, a facer, such as glass mat, is applied to one or both surfaces of the structural panel during the forming process. Then the rigid horizontal top forming plate, which is horizontally oriented, is used to form the FRC panel glass fiber/cementitious material slurry to the desired thickness. The position of the entire rigid horizontal top forming plate is fixed to provide a fixed gap between the lower surface of the rigid horizontal top forming plate and the moving carrier web underneath. Thus, it is not a "floating plate". Due to its horizontal orientation the entire lower surface of the rigid horizontal top forming plate, not merely the downstream end as in the above-described angled rigid plate, contacts the fiber laden slurry passing underneath the forming plate. This process produces panels with less variation (for example +/0.1 inches, preferably +/−0.05 inches) in thickness, which then allows the panels to be formed at a reduced average thickness, for example for a 0.80 inches target average thickness, without having local thin spots below 0.72 inches. Thus, it is possible to use less raw materials while making the same finished product. Additional savings will come from reduced waste handling costs, as well as items such as reduced equipment wear, and increased manufacturing speed. As mentioned, in this invention one or two facers may be used. Moreover, the one or two facers may be temporary, so that the facer(s) are removed prior to or during the finishing operation, or the facer(s) may remain on the finished product.

The carrier under the horizontal forming plate should be a rigid carrier web or a rigid flat bottom forming plate, because the top forming plate should be stiff and flat and the facer and fiber laden cementitious slurry passing under the horizontal forming plate will exert pressure on the carrier below. If the fiber laden cementitious slurry were pushing against a flimsy support frame under the moving carrier web, thickness results will be poor.

Thus, the invention provides a fiber reinforced cementitious panel production line comprising:

a moving carrier web, a support frame for supporting the moving carrier web, wherein the panel is transported on the moving carrier web having a direction of travel relative to the support frame, a means for applying a facer, such as a glass mat, on a fiber laden cementitious slurry on the moving carrier web, the means for applying the facer placed across the width of a forming surface of the moving carrier web, a horizontal thickness control device for controlling thickness of a formed, but not yet set, fiber reinforced cementitious panel comprising fiber laden cementitious slurry comprising cementitious material and embedded chopped fibers on the moving carrier web, wherein the thickness control device comprises a rigid horizontal top forming plate, wherein the rigid horizontal top forming plate has a flat bottom surface, an upstream end and a downstream end, and a forming plate mounting frame for mounting the rigid horizontal top forming plate in a horizontal orientation over the support frame for the moving carrier web, wherein the rigid horizontal top forming plate is mounted to the forming plate mounting frame, and a flat, rigid support bed under the rigid horizontal top forming plate, adapted and configured sufficient to support the fiber laden cementitious slurry and preferably withstand downward force exerted by the rigid horizontal top forming plate with deflection less than 0.03 inches, preferably less than 0.01 inches, preferably less than 0.003 inches, the forming plate mounting frame for fixedly, but adjustably, maintaining height of the rigid horizontal top forming plate over the moving carrier web and maintaining the rigid horizontal top forming plate parallel relative to the moving carrier web, to fixedly locate the flat bottom surface at a height of 0.1 to 2 inches, preferably 0.2 to 1.1 inches, over the moving carrier web, wherein the upstream end of the flat bottom surface extends across the moving web transversely, relative to direction of travel of the moving web, wherein the downstream end of the flat bottom surface extends across the moving web transversely, relative to direction of travel of the moving web, and wherein the entire flat bottom surface is capable of contacting the facer on the fiber-laden slurry when carried on the moving carrier web.

The flat, rigid support bed under the rigid horizontal top forming plate may be under or over the carrier web. The carrier web is typically an endless belt.

The invention also provides a process for making fiber reinforced cementitious panel comprising:

transporting a fiber laden slurry for a panel on a moving carrier web, the moving carrier web supported by a support frame, wherein the panel is transported on the moving carrier web having a direction of travel relative to the support frame, applying a facer, such as a glass mat, on a fiber laden cementitious slurry on the moving carrier web, across the width of a forming surface of the moving carrier web to cover the forming surface, passing the facer covered forming surface under a horizontal thickness control device for controlling thickness of a formed, but not yet set, fiber reinforced cementitious panel comprising fiber laden cementitious slurry comprising cementitious material and embedded chopped fibers on the moving carrier web, wherein the thickness control device comprises a rigid horizontal top forming plate (for example horizontal forming plate 446), wherein the rigid horizontal top forming plate has a flat bottom surface, an upstream end and a downstream end, and a forming plate mounting frame for mounting the rigid horizontal top forming plate in a horizontal orientation over the support frame for the moving carrier web, wherein the rigid horizontal top forming plate is mounted to the forming plate mounting frame, and a flat, rigid support bed under the rigid horizontal top forming plate, adapted and configured sufficient to support the fiber laden cementitious slurry and preferably withstand downward force exerted by the rigid horizontal top forming plate with deflection less than 0.03 inches, preferably less than 0.01 inches, preferably less than 0.003 inches, controlling thickness of the formed, but not yet set, fiber reinforced cementitious panel by contacting the facer covered formed, but not yet set, fiber reinforced cementitious panel comprising fiber laden cementitious slurry with a bottom surface of the rigid horizontal top forming plate;

the mounting frame for fixedly, but adjustably, maintaining height of the rigid horizontal top forming plate over the moving carrier web and maintaining the rigid horizontal top forming plate parallel relative to the moving carrier web, to fixedly locate the flat bottom surface at a height of 0.1 to 2 inches over the moving carrier web, wherein the upstream end of the flat bottom surface extends across the moving web transversely, relative to direction of travel of the moving web, wherein the downstream end of the flat bottom surface extends across the moving web transversely, relative to direction of travel of the moving web, and wherein the entire flat bottom surface contacting the facer on the fiber-laden slurry when carried on the moving carrier web.

The flat, rigid support bed under the rigid horizontal top forming plate may be under or over the carrier web. The carrier web is typically an endless belt.

If desired the invention provides an FRC panel production line and a method for FRC panel production which reduces thickness variation during formation of fiber reinforced cementitious panels, with the use of the above-described angled plate, the facer, such as a glass mat placed across the width of the forming top surface, and the horizontal forming plate. Such an FRC panel production line and method would contact the fiber laden slurry with the above-described angled plate and then apply a facer, such as glass mat, to the upper surface of the FRC panel during the forming process, and then run the facer covered fiber laden slurry under the rigid horizontal top forming plate. Optionally, the production line and method may also apply a facer, such as glass mat, to the lower surface of the structural panel upstream of the headbox during the forming process.

The invention also provides a process for using this production line.

This invention also provides embodiments in which a panel has a fabric facer on one or both flat surfaces of the panel. The facer provides the panel with a significantly flatter surface profile and even thickness. It has also been unexpectedly found that the fabric facer enhances the exterior weathering durability of the final composite. Distinctive features of FRC panels with fabric facers may include, among other things:

Superior exterior weathering durability performance
Improved aesthetics and dust free surface
Improved legibility/visibility of printing on panel surface
Ability to provide two distinct usable surfaces for various applications and uses—one surface with facer and the other surface without facer. For example, the surface without facer is most suitable for bonding various types of roofing membranes and foam plastics. The surface without facer is also suitable for applications where it is desirable to have a simple plain concrete appearance such as in interior walls and ceilings applications. On the other hand, the surface with facer is particularly suitable in those applications where superior bond is required to cementitious basecoats and other coating materials. Interior and exterior walls and subfloors are some applications where it may be desirable to have at least one panel surface with a facer.
Improved surface durability from impact loads
Superior bondable surface
Ability for product differentiation by virtue of utilizing fabrics with different colors and/or patterns
Enhanced flexibility for application of value-added functional coatings such as waterproof coatings, air and water barrier coatings, architectural coatings, etc.

Unless otherwise indicated all percentages in this specification, if any, are weight percent.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 10B shows a perspective view of an FRC panel made by the production line of FIG. 10A.

FIG. 10C shows a side cross-sectional view of a mat of polymer fibers that has a laminate composite structure of one spun bound layer of the fibers and a relatively impermeable melt blown layer of the fibers.

FIG. 10D depicts a top perspective view of an embodiment of a FRC panel that is encased in facer material mat, showing an edge of the panel that is covered by facer and showing an overlap of the back and front facers.

FIG. 11B schematically shows the formed sample panels of an example cut into eight pieces upon curing.

DETAILED DESCRIPTION OF THE INVENTION

Figure 1:
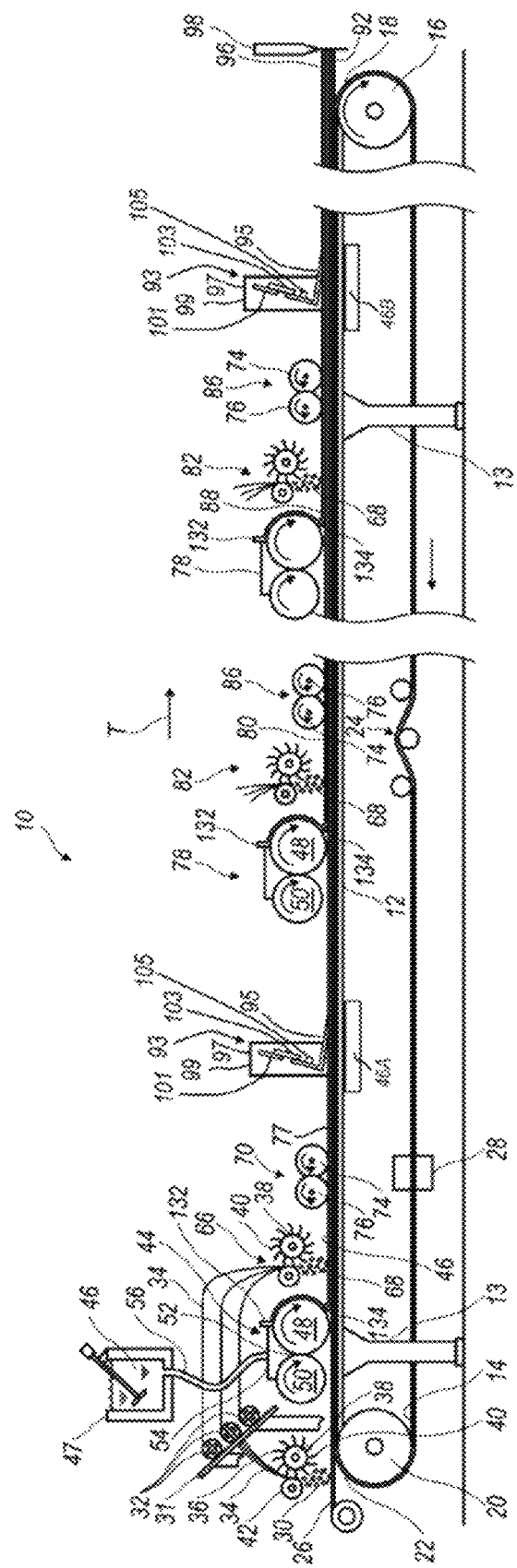
FIG. 1 is a diagrammatic elevational view of an FRC panel production line of the present invention for producing a multi-layer FRC panel with an angled plate.

I. Fiber-Cement Mixtures for the Present Invention

The invention works with a variety of fiber-cement mixtures which produced contain cement, water, and other cement additives.

The fiber-cement mixtures produced by the method and apparatus of this invention are aqueous slurries which may be from a variety of settable cementitious slurries. For example, such aqueous slurries may be compositions based on hydraulic cements. ASTM defines "hydraulic cement" as follows: a cement that sets and hardens by chemical interaction with water and is capable of doing so under water. Examples of suitable hydraulic cements are Portland cement, calcium aluminate cements (CAC), calcium sulfoaluminate cements (CSA), geopolymers, magnesium oxychloride cements (sorel cements), and magnesium phosphate cements. A preferred geopolymer is based on chemical activation of Class C fly ash.

While calcium sulfate hemihydrate sets and hardens by chemical interaction with water, it is not included within the broad definition of hydraulic cements in the context of this invention. However, calcium sulfate hemihydrate may be included in fiber-cement mixtures produced by the method and apparatus of this invention. Thus, also such aqueous slurries may be based on calcium sulfate cements such as gypsum cements or plaster of Paris. Gypsum cements are primarily calcined gypsum (calcium sulfate hemihydrate). It is customary in the industry to term calcined gypsum cements as gypsum cements.

The fiber-cement mixtures may contain pozzolanic material such as silica fume, a finely divided amorphous silica which is the product of silicon metal and ferro-silicon alloy manufacture. Characteristically, it has very high silica content and low alumina content. Various other natural and man-made materials have been referred to as having pozzolanic properties, including pumice, perlite, diatomaceous earth, tuff, trass, metakaolin, microsilica, and ground granulated blast furnace slag. Fly ash also has pozzolanic properties. The fiber-cement mixtures may contain Ceramic microspheres and/or Polymer microspheres and/or other lightweight fillers such as expanded perlite.

However, one use of the fiber-cement slurries made by the present method is to produce fiber reinforced concrete (FRC) panels having reinforcing fibers such as fiberglass, particularly alkali resistant glass fibers. As such, the cementitious slurry employed in the present invention is preferably comprised of varying amounts of Portland cement, gypsum, aggregate, water, accelerators, plasticizers, superplasticizers, foaming agents, fillers and/or other ingredients well known in the art, and described in the patents listed below which have been incorporated by reference. The relative amounts of these ingredients, including the elimination of some of the above or the addition of others, may vary to suit the intended use of the final product.

Water reducing admixture additives optionally can be included in the fiber-cement mixture, such as, for example, plasticizer or superplasticizer, to improve the fluidity of a hydraulic slurry. Such additives disperse the molecules in solution so they move more easily relative to each other, thereby improving the flowability of the entire slurry. Plasticizers are commonly manufactured from lignosulfonates, a by-product from the paper industry. Superplasticizers have generally been manufactured from sulfonated naphthalene condensate or sulfonated melamine formaldehyde or based on polycarboxylic ethers. Water reducing admixture additive can be present in an amount from 0% to 5%, preferably 0.5 to 5%, by weight of the wet finish fiber-slurry mixture.

U.S. Pat. No. 6,620,487 to Tonyan et al., incorporated herein by reference in its entirety, discloses a reinforced, lightweight, dimensionally stable structural cement panel (SCP) which employs a core of a continuous phase resulting from the curing of an aqueous mixture of calcium sulfate alpha hemihydrate, hydraulic cement, an active pozzolan and lime. The continuous phase is reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the SCP panels may include a cured continuous phase reinforced with glass fibers and containing sufficient polymer spheres to improve nailability or made with a water-to-reactive powders ratio to provide an effect similar to polymer spheres, or a combination thereof.

Various formulations for the composite slurry used in the current process are also shown in U.S. Pat. No. 7,841,148 to Tonyan et al incorporated herein by reference. A typical formulation would comprise as the reactive powder, on a dry basis, 35 to 75 wt. % (typically 45-65 or 55 to 65 wt. %) calcium sulfate alpha hemihydrate, 20 to 55 wt. % (typically 25-40 wt. %) hydraulic cement such as Portland cement, 0.2 to 3.5 wt. % lime, and 5 to 25 wt. % (typically 10-15 wt. %) of an active pozzolan. The continuous phase of the panel would be uniformly reinforced with alkali-resistant glass fibers and would contain 20-50% by weight of uniformly distributed lightweight filler particles selected from the group consisting of ceramic microspheres, glass microspheres, fly ash cenospheres and perlite. An example of a formulation for the composite slurry includes from 42 to 68 wt. % reactive powders, 23 to 43 wt. % ceramic microspheres, 0.2 to 1.0 wt. % polymer microspheres, and 5 to 15 wt. % alkali-resistant glass fibers, based on the total dry ingredients.

U.S. Pat. No. 8,038,790 to Dubey et al provides another example of a formulation for the composite slurry which includes an aqueous mixture of a cementitious composition comprising, on a dry basis, 50 to 95 wt % reactive powder, 1 to 20 wt % of coated hydrophobic expanded perlite particles uniformly distributed as lightweight filler therein, the coated hydrophobic perlite particles having a diameter in the range of about 1 to 500 microns (micrometers), a median diameter of 20 to 150 microns (micrometers) and an effective particle density (specific gravity) of less than about 0.50 g/cc, 0 to 25 wt % hollow ceramic microspheres, and 3 to 16 wt. % alkali-resistant glass fibers for uniformly distributed for reinforcement; wherein the reactive powder comprises: 25 to 75 wt. % calcium sulfate alpha hemihydrate, 10 to 75 wt. % hydraulic cement comprising Portland cement, 0 to 3.5 wt. % lime, and 5 to 30 wt. % of an active pozzolan; and the panel having a density of 50 to 100 pounds per cubic foot.

If desired the compositions employed in the single and multi-layer processes of the invention may have a weight ratio of water-to-reactive powder of 0.20/1 to 0.90/1, preferably 0.25/1 to 0.70/1, or 0.4/1 to 0.7/1.

The fibers can be discrete or chopped fibers made of different reinforcing fiber materials including fiberglass; polymeric materials such as polypropylene, polyethylene, polyvinyl alcohol, etc; carbon; graphite; aramid; ceramic; steel; cellulosic or natural fibers such as jute or sisal; or a combination thereof. The fiber length is about 2 inches or lower and more preferably 1.5 inches or lower.

For the single layer process the fiber-cement mixtures contain sufficient water to achieve the desired slump test value and viscosity in combination with the other ingredients of the fiber-cement mixtures.

Production Line and Method with Thickness Control Device Employing an Angled Plate II. First Version of a Production Line Referring now to FIG. 1, an FRC panel production line is diagrammatically shown and is generally designated 10. The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13 or other support structure. The support frame 12 also includes a main drive roll 16 at a distal end 18 of the frame, and an idler roll 20 at a proximal end 22 of the frame. Also, at least one belt tracking and/or tensioning device 24 is typically provided for maintaining a desired tension and positioning of the carrier 14 upon the rolls 16, 20. The FRC panels are produced continuously as the moving carrier 14 proceeds in a direction "T" from the proximal end 22 to the distal end 18.

In this production line 10, a carrier web 26 of Kraft paper, release paper, or a plastic carrier, for supporting a slurry prior to setting, may be provided and laid upon the web 14 to protect it and/or keep it clean.

However, it is also contemplated that, rather than the continuous carrier web 26, individual sheets (not shown) of a relatively rigid material, e.g., sheets of polymer plastic, may be placed on the carrier 14.

It is also contemplated that the FRC panels produced by the present line 10 are formed directly upon the carrier 14. In the latter situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 may vary to suit the product being made.

A. Chopper

In the present invention, production of fiber reinforced concrete (FRC) panel, also known as structural cement panel (SCP panel), is initiated by depositing a layer of loose, chopped fibers 30 of about one inch in size upon a plastic carrier on the carrier web 26. A variety of fiber depositing and chopping devices are contemplated by the present line 10. For example, a typical system employs a rack 31 holding several spools 32 of fiberglass cord, from each of which a length or string 34 of fiber is fed to a chopping station or apparatus, also referred to as a chopper 36. Typically a number of strands of fiberglass are fed at each of the chopper stations.

The chopper 36 includes a rotating bladed roll 38 from which project radially extending blades 40 extending transversely across the width of the carrier 14, and which is disposed in close, contacting, rotating relationship with an anvil roll 42. Preferably the bladed roll 38 and the anvil roll 42 are disposed in relatively close relationship such that the rotation of the bladed roll 38 also rotates the anvil roll 42, however the reverse is also contemplated. Also, the anvil roll 42 is preferably covered with a resilient support material against which the blades 40 chop the cords 34 into segments. The spacing of the blades 40 on the roll 38 determines the length of the chopped fibers. As is seen in FIG. 1, the chopper 36 is disposed above the carrier 14 near the proximal end 22 to maximize the productive use of the length of the production line 10. As the fiber strands 34 are chopped, the fibers fall loosely upon the carrier web 26.

B. Slurry Mixer

Figure 1A:
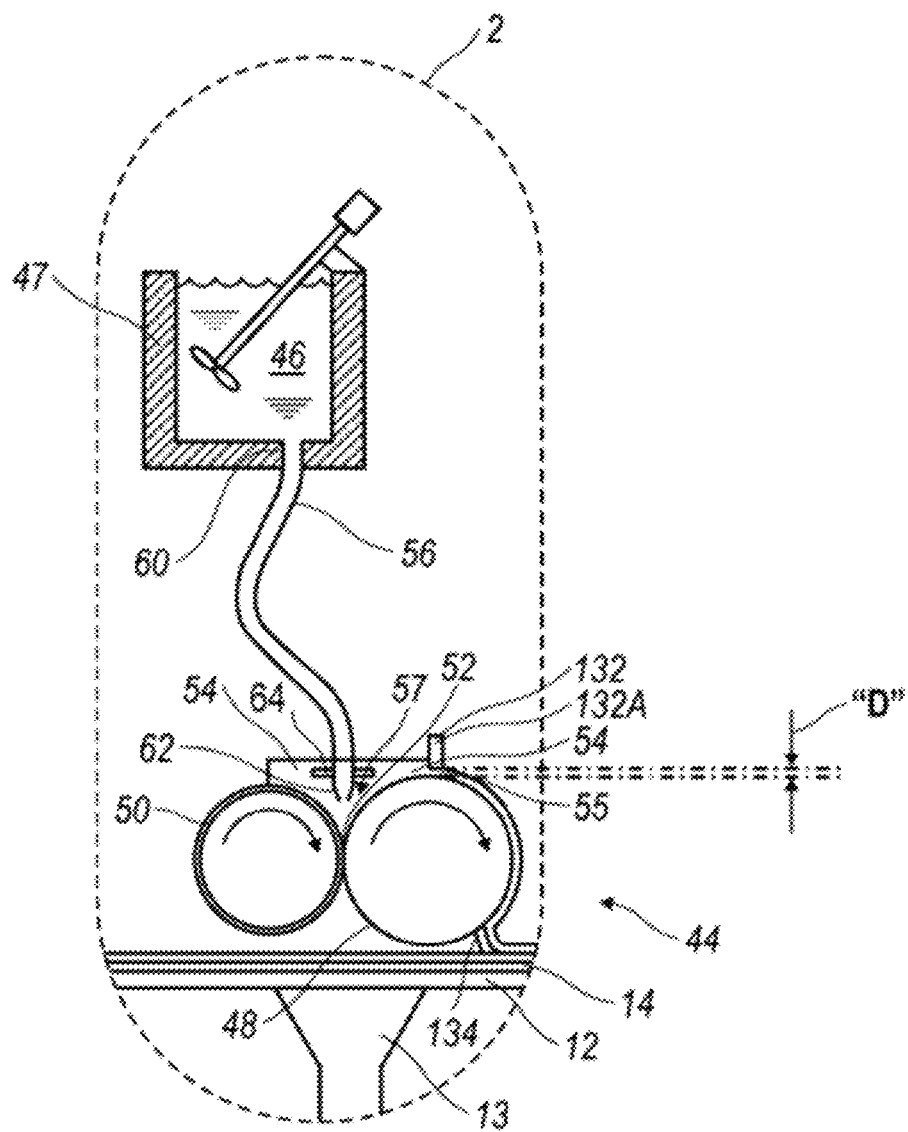
FIG. 1A is a schematic view of a mixer feeding a headbox of the FRC panel production line of FIG. 1.

The present production line 10 includes a slurry preparation and feeding section 2 (FIG. 1A). Slurry preparation and feeding section 2 includes a slurry feed station or slurry feeder or slurry headbox, generally designated 44 and a source of slurry, which is a wet mixer 47. The slurry feeder 44 receives a supply of slurry 46 from the wet mixer 47 for depositing the slurry 46 on chopped fibers on the carrier web 26. It is also contemplated that the process may begin with the initial deposition of slurry upon the carrier 14.

Examples of some suitable slurry mixers 47 are slurry mixers commonly used in the cement mortar and concrete industry may also be employed in the present invention. For example, the mortar mixers described in ICRI Guideline No. 320.5R-2014, Technical Guidelines, Pictorial Atlas of Concrete Repair Equipment, International Concrete Repair Institute, May 2014, incorporated by reference, can be used in this invention for preparing cementitious slurry. These include horizontal shaft mixers, tumble mortar mixers, rotating-drum stationary mixers, pan-type mixers, rotating-tub rotating paddle mixers, planetary paddle mixers, horizontal shaft mixer-pump combinations, and vertical shaft mixer-pump combinations. The horizontal shaft mixer-pump combinations and vertical shaft mixer-pump combinations are continuous mixers C. Slurry Feed Apparatus Referring now to FIGS. 1-1A, as mentioned above, an embodiment of a slurry feed apparatus, also referred to as a slurry feed station, a slurry feeder or slurry headbox, generally designated 44 receives a supply of slurry 46 from the wet mixer 47.

The slurry feeder 44 includes a main metering roll 48 disposed transversely to the direction of travel "T" of the carrier 14. A companion or back up roll 50 is disposed in close, parallel, rotational relationship to the metering roll 48. Slurry 46 is deposited in a nip 52 between the two rolls 48, 50.

The slurry feeder 44 also has a gate 132 mounted to sidewalls 54 of the slurry feed apparatus 44 to be mounted adjacent to the surface of the metering roll 48 to form a nip 55 therebetween. As seen in FIG. 1A, the gate 132 is above the metering roll 48 so that the nip 55 is between the gate 132 and an upper portion of the roll 48. The rolls 48, 50 and gate 132 are disposed in sufficiently close relationship that the nip 55 retains a supply of the slurry 46, at the same time the rolls 48, 50 rotate relative to each other. The gate 132 is provided with a vibrator (not shown). As seen in FIG. 1A, the metering roll 48 rotates from the nip 52 to the nip 55.

While other sizes are contemplated, typically the metering roll 48 has a larger diameter than the companion roll 50.

Also, typically one of the rolls 48, 50 has a smooth, stainless steel exterior, and the other, preferably the companion roll 50, has a resilient, non-stick material covering its exterior.

In particular, the gate 132 comprises a blade 132A mounted to a vibrating gate support shaft/bar (not shown) and, optionally a stiffening member (not shown) mounted to the vibrating gate support shaft/bar. The gate blade 132A is typically made of 16-12 gauge stainless sheet metal.

The gate 132 is vibrated by means of a rotary vibrator (not shown) mounted on the side opposite the blade of the stiffening member. The stiffening member being attached to the backside of the vibrating gate support shaft and vibrating gate 132. If the stiffening member is not provided then the rotary vibrator may be attached to the gate support shaft or other suitable portion of the gate 132. The vibrating means is typically a pneumatic rotary ball vibrator. The level of vibration can be controlled with a conventional air regulator (not shown).

The gate 132 may be mounted to the sidewalls 54 of the headbox 44 by a support system (not shown) to permit the position of the blade to be adjusted the horizontally, vertically as well. The support system includes a pivot pin attached, respectively, to each end of the gate support shaft and seated in an adjustable mount attached to a sidewall 54 of the slurry feed apparatus. A version of the adjustable mount has a pivot yoke seated in a U-shaped member. Screws pass through the upwardly extending legs of the U-shaped mount to permit forward and backwards adjustment of the position of the pivot yoke, and in turn the gate 132. Also, bolts are provided through holes of the U-shaped member for permitting up and down adjustment of the position of the pivot yoke, and in turn the gate 132.

Preferably, the vibrating gate 132 may be pivotally adjusted to vary the gap "D" (FIG. 1A) between the gate 132 and the metering roll 48 by means of an pivoting adjustment system (not shown).

The vibrating gate 132 helps to prevent significant build-up of slurry 46 on the gate 132 and controls the thickness of the slurry 46 deposited on the metering roll 48.

Typically the slurry feeder 44 has a pair of relatively rigid sidewalls 54 (one shown), preferably made of, or coated with non-stick material such as TEFLON® material or the like. The sidewalls 54 prevent slurry 46 poured into the nip 52 from escaping out the sides of the slurry feeder 44. The sidewalls 54, which are preferably secured to the support frame 12 (FIG. 1), are disposed in close relationship to ends of the rolls 48, 50 to retain the slurry 46. However, the sidewalls 54 are not excessively close to ends of the rolls to interfere with roll rotation.

The slurry feeder 44 deposits an even layer of the slurry 46 upon the moving carrier web 26. Suitable layer thicknesses range from about 0.05 inch to 0.35 inch (0.13 to 0.9 cm), for example about 0.08 inch to 0.3 inch. However, with four layers preferred in the structural panel produced by the production line 10, and a suitable building panel being approximately 0.75 inch, an especially preferred slurry layer thickness is in the range of 0.15 to 0.25 inch. However, for a target panel forming thickness is about 0.84 inch, the standard layer thickness is typically closer to about 0.21 inches at each of the 4 forming stations.

Thus, the relative distance "D" (FIG. 1A) between the vibrating gate 132 and the main metering roll 48 may be adjusted to vary the thickness of the slurry 46 deposited. The nip distance "D" between the gate 132 and the metering roll 48 is typically maintained at a distance of about ⅛ to about ⅜ inches (about 0.318 to about 0.953 cm). However, this can be adjusted based upon the viscosity and thickness of the slurry 46 and the desired thickness of the slurry to be deposited on the web 26.

The slurry 46 is delivered to the slurry feeder 44 through a hose 56 or similar conduit having a first end 60 (FIG. 1A) in fluid communication with the outlet of the slurry mixer or reservoir 47. A second end 62 of the hose 56 is connected to a laterally reciprocating, cable driven, fluid-powered dispenser 64 (FIG. 1A) of the type well known in the art. Slurry flowing from the hose 56 is thus poured into the feeder 44 in a laterally reciprocating motion to fill a reservoir 57 defined by the rolls 48, 50 and the sidewalls 54 of the slurry feeder 44. Rotation of the metering roll 48 draws a layer of slurry 46 from the reservoir 57.

Another feature of the present feeder apparatus 44 is that the main metering roll 48 and the companion roll 50 are both driven in the same direction which minimizes the opportunities for premature setting of slurry on the respective moving outer surfaces. A drive system (not shown), including a fluid-powered, electric or other suitable motor is connected to the main metering roll 48 or the companion roll 50 for driving the roll(s) in the same direction, which is clockwise when viewed in FIGS. 1 and 1A. As is well known in the art, either one of the rolls 48, 50 may be driven, and the other roll may be connected via pulleys, belts, chain and sprockets, gears or other known power transmission technology to maintain a positive and common rotational relationship.

The slurry feeder 44 has a doctor blade 134 (FIG. 1A) located between the main metering roll 48 and the carrier web 26 to ensure that the relatively thin slurry 46 is completely deposited as a continuous curtain or sheet of slurry is uniformly directed down to within a distance of about 1.0 to about 1.5 inches (2.54 to 3.81 cm.) of the carrier web 26. The doctor blade 134 ensures the slurry 46 uniformly covers the fiberglass fiber layer upon the carrier web 26 and does not proceed back up toward the nip 52 and the feeder reservoir 57. The doctor blade 134 also helps keep the main metering roll 50 free of prematurely setting slurry 46.

The doctor blade 134 is mounted on a doctor blade support shaft (not shown) mounted on a doctor blade tension arm pivotably mounted to adjustable pivot mount attached to the support frame or sidewall 54 of the slurry feeder 44. A shaft or bar is attached to the sidewalls 54 of the slurry feeder 44 above the metering roller 48. The doctor blade 134 is biased towards the roll 48 by a tensioning spring having a first end attached to the shaft or bar and a second end attached to the free end of the doctor blade tension arm. Thus, the doctor blade 134 is held in a position adjacent to the outer surface of the metering roll 48 by the tensioning arm and tensioning spring. The position of the doctor blade 134 can be adjusted by adjusting the adjustable pivot mount attached to the support frame or sidewall 54 of the slurry feeder 44.

The doctor blade 134 removes the slurry from the surface of the metering roll 48 and serves to collect the slurry 46 in a uniform layer or curtain and downwardly directs the slurry 46 in the direction of the movement of the web to a point about 1.0 to 1.5 inches (92.54 to 3.81 cm.) over the fiberglass layer on the web to uniformly cover the fiberglass layer with the slurry 46.

The reciprocating dispensing mechanism 64, the gate 132, and the doctor blade 134 are explained in greater detail in U.S. Pat. No. 7,754,052 to Frank, et al, entitled PROCESS AND APPARATUS FOR FEEDING CEMENTITIOUS SLURRY FOR FIBER-REINFORCED STRUCTURAL CEMENT PANELS and incorporated herein by reference in its entirety. Other embodiments of slurry feed apparatuses may be used as known in the art. One such apparatus is disclosed in U.S. Pat. No. 8,770,139 to Frank et al entitled APPARATUS FOR FEEDING CEMENTITIOUS SLURRY ONTO A MOVING WEB and incorporated herein by reference in its entirety.

D. Processing Downstream of the Slurry Feed Apparatus

Referring again to FIG. 1, the other operational components of the FRC panel production line will be described briefly, but they are described in more detail in the following documents all herein incorporated by reference in their entirety:

U.S. Pat. No. 6,986,812 to Dubey et al, entitled SLURRY FEED APPARATUS FOR FIBER-REINFORCED STRUCTURAL CEMENTITIOUS PANEL PRODUCTION;

U.S. Pat. No. 7,182,589 to Porter, entitled EMBEDMENT DEVICE FOR FIBER-ENHANCED SLURRY;

U.S. Pat. No. 7,445,738 to Dubey et al., entitled, MULTI-LAYER PROCESS AND APPARATUS FOR PRODUCING HIGH STRENGTH FIBER-REINFORCED STRUCTURAL CEMENTITIOUS PANELS;

U.S. Pat. No. 7,475,599 to Frank et al, entitled WET SLURRY THICKNESS GAUGE AND METHOD FOR USE OF SAME;

U.S. Pat. No. 7,513,768 to Porter et al, entitled EMBEDMENT ROLL DEVICE.

U.S. Pat. No. 7,513,963 to Frank et al, entitled METHOD FOR WET MIXING CEMENTITIOUS SLURRY FOR FIBER-REINFORCED STRUCTURAL CEMENT PANELS;

U.S. Pat. No. 7,524,386 to George et al, entitled METHOD FOR WET MIXING CEMENTITIOUS SLURRY FOR FIBER-REINFORCED STRUCTURAL CEMENT PANELS; and U.S. Pat. No. 7,670,520 to Dubey, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT.

E. Embedment Device

A variety of embedment devices are contemplated, including, but not limited to vibrators, sheep's foot rollers and the like. However, FIG. 1 shows the embedment device 70 includes at least a pair of generally parallel shafts 76 mounted transversely to the direction of travel of the carrier web 14 on the frame 12. Each shaft 76 is provided with a plurality of relatively large diameter disks 76 which are axially separated from each other on the shaft by small diameter disks (not shown).

During SCP panel (FRC panel) production, the shafts 76 and the disks 74 rotate together about the longitudinal axis of the shaft 76. As is well known in the art, either one or both of the shafts 76 may be powered, and if only one is powered, the other may be driven by belts, chains, gear drives or other known power transmission technologies to maintain a corresponding direction and speed to the driven shaft. The respective disks 74 of the adjacent, preferably parallel shafts 76 overlap and are intermeshed with each other for creating a "kneading" or "massaging" action in the slurry, which embeds the previously deposited fibers 68. In addition, the close, intermeshed and rotating relationship of the disks 74 prevents the buildup of slurry 46 on the disks, and in effect creates a "self-cleaning" action which significantly reduces production line downtime due to premature setting of clumps of slurry.

The intermeshed relationship of the disks 74 on the shafts 76 includes a closely adjacent disposition of opposing peripheries of the small diameter spacer disks (not shown) and the relatively large diameter main disks 74, which also facilitates the self-cleaning action. As the disks 74 rotate relative to each other in close proximity (but preferably in the same direction), it is difficult for particles of slurry to become caught in the apparatus and prematurely set. By providing two sets of disks 74 which are laterally offset relative to each other, the slurry 46 is subjected to multiple acts of disruption, creating a "kneading" action which further embeds the fibers 68 in the slurry 46.

F. Controlling Thickness

Once the fiber 68 has been embedded, a first layer 77 of the panel 92 is complete. Typically, the height or thickness of the first layer 77 is in the approximate range of about 0.05 inch to 0.35 inch (0.13 to 0.9 cm). Preferably, the height or thickness of the first layer 77 is in the approximate range of 0.08 to 0.3 inches. This range has been found to provide the desired strength and rigidity when combined with like layers in an FRC panel (SCP panel). However other thicknesses are contemplated depending on the final intended use of the FRC panel (SCP panel).

Then the first layer 77 is contacted with a thickness control device 93 of the present invention for controlling thickness of the formed, but not yet set, fiber reinforced cementitious panel layer first layer 77 comprising fiber laden cementitious slurry comprising cementitious material and embedded chopped fibers on the moving carrier web 26. The thickness control device 93 comprises an angled rigid plate 95 and a U-shaped mounting stand 97 for mounting the angled rigid plate 95 over the support frame or forming table 12 for the moving carrier web 26. The mounting stand 97 having opposed upright members 99 (one shown in FIG. 1 for clarity), a tiltable transverse mounting member 101 having opposed ends mounted to respective upright members 99 at a fixed but adjustable angle relative to the moving carrier web 26 and fixed but adjustable height above the moveable carrier web 26. The mounting frame 97 also having a connector plate 103 having an upper end portion attached to the transverse mounting member 101 and a lower end portion attached to a back wall of the angled rigid plate 95. A vibrator (vibration motor) 105 is also mounted to the back wall of the angled rigid plate 95.

FIG. 1 shows a forming table 12, endless belt 14, and a carrier web 26 and optional bottom support plates 46A, 46B. The production line 10 provides a flat, rigid support bed under each angled rigid plate 95 adapted and configured sufficient to support the fiber laden slurry and preferably withstand downward force exerted by the angled rigid plate 95 with deflection less than 0.03 inches, preferably less than 0.01 inches, preferably less than 0.003 inches.

The flat, rigid support bed is provided to counteract the downward force of the facer covered fiber-laden slurry passing under the rigid horizontal top forming plate 446 and, for example, may be any of the following:

the forming table 12 if sufficiently rigid, the forming table 12 further supported by the rigid bottom forming plate 46A, provided below the carrier belt 14, rigid panels used on the carrier belt 14 under or in place of carrier web 26, the endless belt 14 could be supported by sufficient rollers to be rigid, or there could be a break in the forming table 12 and the rigid bottom forming plate 46A is placed in the break directly under the portion of the endless belt under the top forming plate 446.

As mentioned above, it is also contemplated that, rather than the continuous carrier web 26, individual sheets (not shown) of a relatively rigid material, e.g., sheets of polymer plastic, may be placed on the carrier 14. These can also provide the flat, rigid support bed.

FIGS. 2, 3, 4 and 5 show details of the construction of the thickness control device 93.

Figure 2:
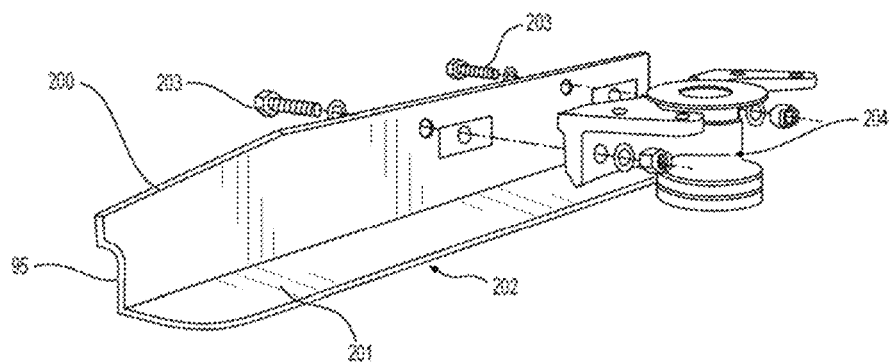
FIG. 2 shows the thickness control device as it used in contact with the slurry on the web.

FIG. 2 is a schematic of the angled vibrating plate 95, typically made of metal, with a coupling unit 204 to attach a vibrator (vibration motor) 105 (see FIG. 1) to impart vibration to the plate. The angled vibrating metal plate 95 has an angled cross-section, with a back wall 200, a bottom wall 201, and a functional downstream edge 202 that in operation is placed into the cementitious slurry at certain depth ("D1", see FIG. 4) and imparts vibrations to the slurry. Screws 203 are provided to attach the coupling unit 204 to the back wall 200 of the angled plate 95. The angled plate 95 is typically made of metal.

Figure 3:
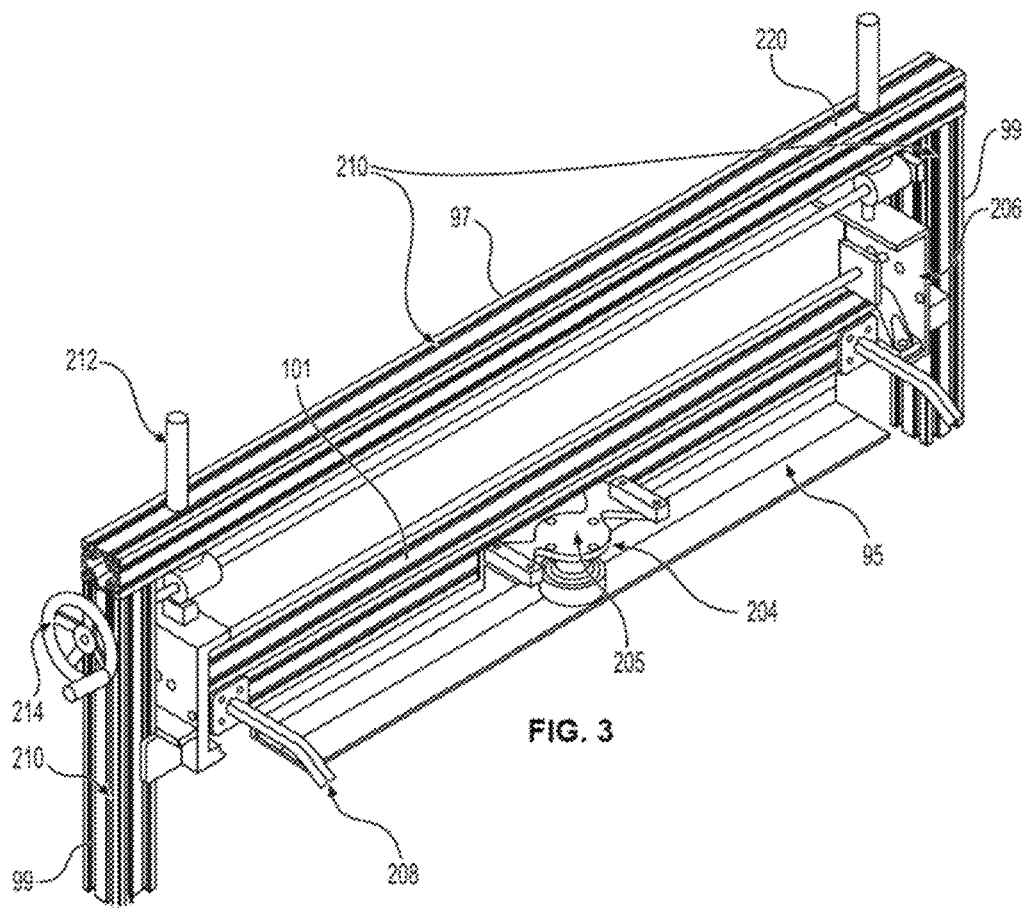
FIG. 3 shows a perspective view of the thickness control device in its operational position over the direction of travel of the web carrying the slurry panel.

FIG. 3 is a schematic drawing of a typical U-shaped mounting frame 97 of the thickness control device 93 to install the angled vibrating metal plate 95 and vibrator (vibration motor) 105 (see FIG. 1) on the production line 10 for fiber reinforced cementitious panels. The U-shaped mounting frame 97 has upright members 99 fixedly attached to a stationary frame crosspiece 220. The U-shaped mounting frame 97 also has the tiltable transverse mounting member 101 moveably attached to the upright members 99. The tiltable transverse mounting member 101 has opposed ends each rotatably mounted to a respective metal plate 206 with holes for angle adjustment.

The U-shaped metal mounting frame 97, typically rectangular, made of modular pieces of metal channels, typically 4 inch by 4 inch, that can be connected easily through slots and bolts or screws, is shown in FIG. 3. A pair of screw jacks 212 with individual turning wheels 214 and handles, installed on either side of the forming surface, to adjust the height of vibrating metal plate from the forming surface and level the plate parallel to the forming surface. A metal rod, typically 0.5 inch diameter, locked at specific angular position by holes on the metal plates 206 mounted on the two sides of the mounting frame 97 in a plane perpendicular to the forming surface, for adjustment of the angle of vibrating metal plate 95 with the forming surface, as shown in FIG. 3. Thus, each of the opposed ends of the tiltable transverse mounting member 101 is mated with a selected hole for angle adjustment of the plate 206 to fixedly set the angle of the tiltable transverse mounting member 101 relative to the moveable carrier web 26, as well as relative to the slurry on the moveable carrier web 26. When the tiltable transverse mounting member 101 angle is adjusted and set the angle of the tiltable transverse mounting member 101 angled vibrating metal plate 95 mounted to the tiltable transverse mounting member 101 angle "a" (alpha) is likewise adjusted and set. FIG. 3 also shows a location 205 on the coupling unit 204 to mount the vibration motor.

To assist in adjusting angle, the tiltable transverse mounting member 101 is provided with a handle 208 to lift up and down the vibrating plate. The handle 208 is typically metal in the form of a pipe or rod, typically rectangular and 1 inch by 1 inch in cross section, but can also be circular or other cross-sectional shape, attached to the central frame-piece crosspiece 101 allowing rotation in axis perpendicular to the forming direction in the forming plane, to disengage for replacement, cleaning or maintenance mechanism for lifting the plate from the manufacturing line, as shown in FIG. 3.

The mounting mechanism 97 described above typically keeps the vibrating plate at a set fixed height from the forming surface (belt/plate) across the width, such that the functional edge of the plate remains inside the surface of the slurry at a depth of 0.05 inches or more, and that the plate does not adjust in height itself with incoming flow of materials.

Figure 4:
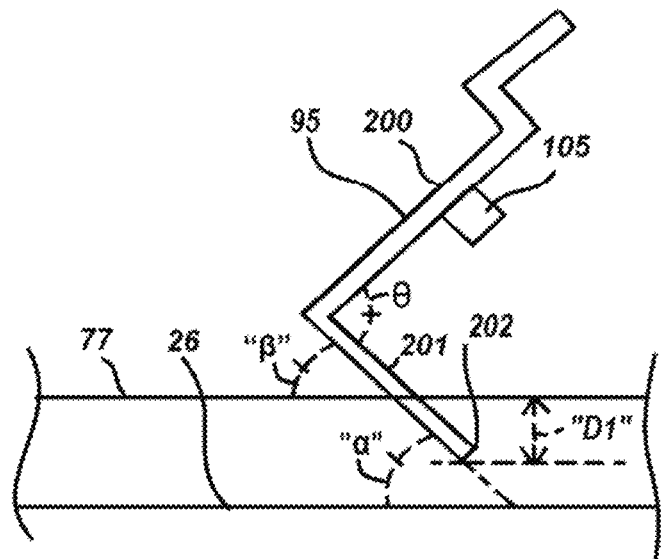
FIG. 4 shows the angled plate having a downstream end of the angled plate immersed into a slurry on a production line.

FIG. 4 shows the angle "$\alpha$" (alpha) of the bottom wall 201 of the angled rigid plate 95 relative to the surface of the moving carrier web 26. FIG. 4 shows the angle "$\beta$" (beta) of the bottom wall 201 of the angled rigid plate 95 relative to the surface of the slurry 77, if present, on the moving carrier web 26. For purposes of this specification the angle "$\alpha$" (alpha) and the angle "$\beta$" (beta) are equal. FIG. 4 also shows the depth "D1" the downstream end 202 of the bottom wall 201 of the angled rigid plate 95 is immersed into the surface of the slurry 77 on the moving carrier web 26. The angled plate angle "$\alpha$" (alpha) and the angle "$\beta$" (beta) are 5° to 30°, typically the angle "$\alpha$" (alpha) and the angle "$\beta$" (beta) are in the range of 10° to 25°.

The metal plates 206 travel vertically up and down the upright members 99 along channels 210 of the upright members 99 and stationary frame crosspiece 220 of the frame 97. When the metal plates 206 travel vertically, the tiltable transverse mounting member 101 travels vertically with the plates 206. To raise and lower the height of the tiltable transverse mounting member 101 the U-shaped mounting frame 97 has screw jacks 212 and turning wheels 214 (one shown) for moving the screw jacks 212. The angled vibrating metal plate 95 when mounted to the tiltable transverse mounting member 101 moves vertically with the tiltable transverse mounting member 101.

Figure 5:
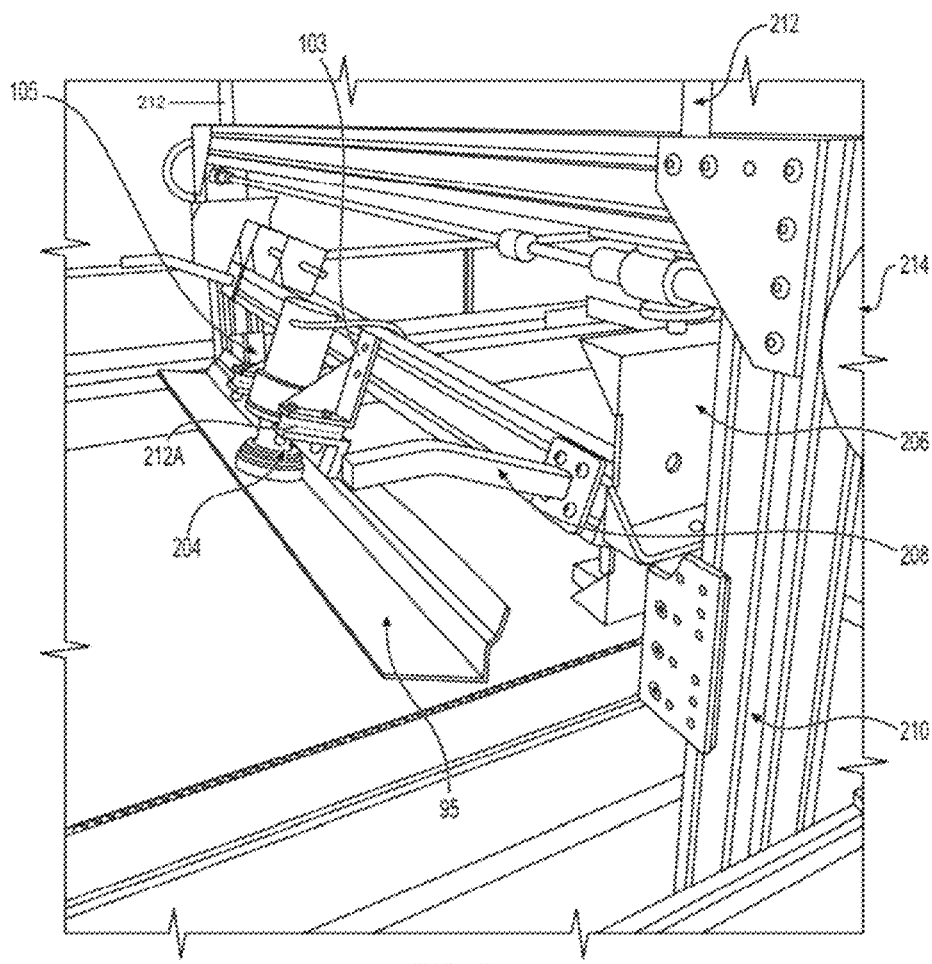
FIG. 5 shows another perspective view of the thickness control device in the upward position over the web line.

FIG. 5 shows a fixed, vibrating, lightweight metal plate set-up for reducing thickness variation during formation of fiber reinforced cementitious panels across the width of a forming surface. FIG. 5 shows the vibrator (vibration motor) 105 attached to the coupling unit 204. A rear end the coupling unit 204 is attached to the back wall of the angled vibrating metal plate 95. FIG. 4 shows the coupling unit top wall is attached to a connector plate 103 having an upper end portion attached to the transverse mounting member 101 and a lower end portion attached to a back wall of the angled rigid plate 95. An elastomeric shock absorber 212A is between the lower end of the connector plate 103 and the top wall of the coupling unit 204.

This inventive thickness control device 93 solves the problem of producing cementitious panels with reduced thickness variation so as to decrease processing steps during formation.

The inventive thickness control device 93 provides a mechanism that imparts vibrations to the forming slurry in a plane parallel to the forming surface (belt/plate) to uniformly spread the materials on the surface in a manner that would reduce thickness variations. The invention provides a method for reducing thickness variation during formation of fiber reinforced cementitious panels, with the use of fixed, vibrating, light metal plate across the width of the forming surface to impart vibrations by contact on surface or into the cementitious slurry containing fibers for reinforcement.

G. The Angled Plate

The angled vibrating plate 95 of the invention typically has the following characteristics:

The angled plate 95 is typically made of metal, preferably magnesium alloy, although, aluminum, titanium, steel and other metal alloys can also be used.

The cross-section of the angled plate 95 is generally angled, however, other cross-sections providing a flat or curved surface in contact with the slurry and offering structural rigidity can also be utilized.

The shape of the angled plate 95 may be an L-shape, but need not be a perfect L-shape, i.e., the angle between the back wall and the bottom wall may not necessarily be always 90°. The angle between the two walls may range from obtuse to acute. For example, the angle between the two walls may range from 60° to 120°, preferably from 70° to 110°, and most preferably from 80° to 100°. Furthermore, the transition geometry of the bent transition section between the back wall and the bottom wall can be sharp or curved.

Figure 4A:
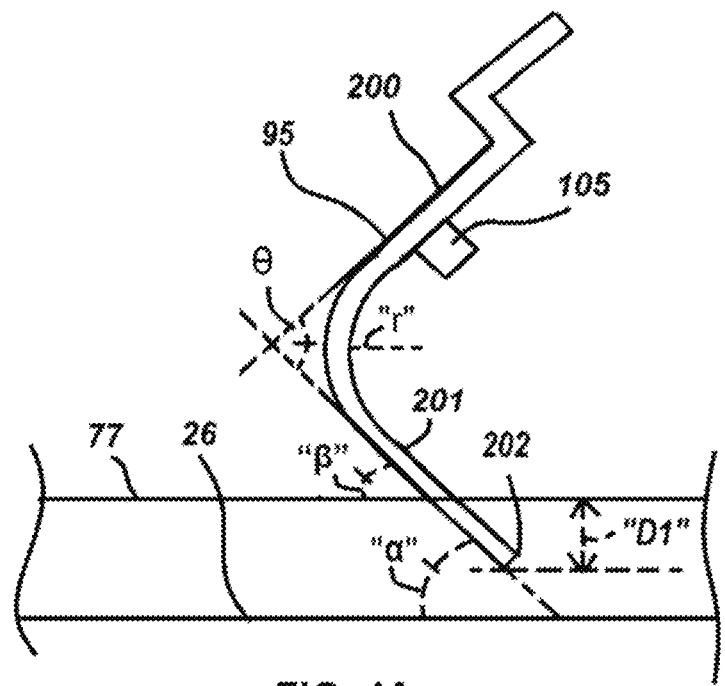
FIG. 4A shows the angled plate with a curved corner having a downstream end of the angled plate immersed into a slurry on a production line.

FIG. 4A shows angled rigid plate 195 which is a version of the angled rigid plate 95 modified to have the transition geometry between the back wall 200 and bottom wall 201 curved to a radius of curvature "r". The radius of curvature of the transition bent-section can range from 0.05 inches to 2 inches. In other respects the angled rigid plate 195 and the angled rigid plate 95 are the same.

Beyond the bent transition section, the thickness of the bottom wall can either be uniform or tapered with thickness decreasing from the end of the transition section to the lip of the bottom wall. Moreover, the bottom surface of the bottom wall beyond the end of the transition section and in contact with the cementitious slurry is in the form of a two-dimensional plane without any curvature. The top surface of the bottom wall beyond the end of the transition section can either be in the form of a two-dimensional plane or take any other curvilinear surface geometry such as a curved surface gradually tapering toward the lip of the bottom leg. Furthermore, the back wall and the bottom wall assembly can optionally be braced together either continuously or intermittently along the length of the assembly using cross-bracing elements. When the assembly is braced continuously, the bracing element can either be a single, externally add-on piece to the angled element, or alternatively, it can be cast, extruded, or formed monolithic to the said angled element. The continuous bracing element can take different geometries to impart desired stiffness to the vibrating assembly. Furthermore, the back wall of the assembly can either be in the form of a flat two-dimensional plane, or alternatively, it can be formed or bent to a three-dimensional shape to increase material rigidity.

The angled plate 95 has a face in contact with cementitious slurry and another face perpendicular or at an angle, to the slurry contact face, to which the vibrating motor is mounted or connected.

The length of the vibrating angled plate 95 (in the machine direction of travel "T") on the side in contact with the slurry is typically from about 2 inches to 24 inches. The preferred length of the plate on the side in contact with the slurry ranges from about 2 inches to 12 inches. The more preferred length of the plate on the side in contact with the slurry ranges from about 2 inches to 6 inches.

The width of the vibrating angled plate 95 (in the direction transverse to the machine direction of travel "T") can range from about 1 feet to 8 feet. The preferred width of the metal plate ranges from about 2 feet to 6 feet, or about 2 feet to 5 feet, or about 3 feet to 4 feet.

The thickness of the vibrating angled plate 95 on the side in contact with the slurry is typically from about $1/16$ inches to $1/4$ inches. The vibrating angled plate 95 may have a gradual taper from the side away from the slurry contact to the edge in contact with slurry. The preferred thickness of the plate on the side in contact with the slurry is about $1/8$ inches with a gradual taper from $1/4$ inches thick on the side away from the slurry contact to $1/16$ inches on the edge in contact with slurry.

The vibrating angled plate 95 is placed such that the functional edge of the plate remains in contact with the slurry, at a depth 0.05 inches or more into the slurry.

The vibrating angled plate 95 is vibrated by a vibrating motor 105 having a weight that is attached close to the metal plate so that the vibrations from motor and that of the plate remain in phase. The preferred distance of the rotating weight ranges from the metallic plate from about 0.50 to 8 inches, about 1 to 7 inches, or about 2 to 6 inches.

The speed of rotation of the eccentric weights are typically from about 100 rpm to about 4000 rpm. The vibrating motor is mounted for use such that the eccentric weight attached to the rotating shaft rotates in the plane parallel to the metal plate face in contact with the cementitious slurry.

The vibrating motor 105 is typically electrically driven but can also be pneumatic or gas powered mechanical device. The vibrations are typically produced from rapid circular motion of the rotating shaft, to which an eccentric weight is attached. Eccentricity of weight governs the amplitude of vibrations while the rotations per minute govern the frequency of the vibrations, and the magnitude of weight governs the power required by the motor and the vibration intensity.

The vibrator mounted on the top surface of the back wall of the angled rigid plate assembly imparts vibration in the plane parallel to the forming surface of the fiber reinforced cementitious panel. Vibration imparted in the plane perpendicular to the forming surface of the fiber reinforced cementitious panel has been found to yield less than optimal results.

Furthermore, the frequency, amplitude, and mode of vibration of the angled rigid plate assembly is controlled using a vibration controller. This vibration controller can either be electrically operated or pneumatic. When an electric vibrator is used, the extent and mode of vibration of the rigid plate assembly is effectively controlled by changing the RPM of the eccentric rotating weight inside the vibrator assembly. The type and amount of vibration applied is tailored based on the rheological properties of the fiber reinforced slurry and slurry layer thickness being employed to form the panel.

Quite unexpectedly it has been found that a more uniform panel surface profile across the panel width is obtained when the outer lip of the bottom wall of the angled rigid plate assembly is situated below the top surface of panel being formed. Accordingly, the outer lip of the bottom wall of the angled rigid plate assembly is situated from about 0.01 inches to 0.25 inches below the top surface of the panel being formed. For example, if the desired panel thickness is 0.75 inches, the outer lip of the bottom wall of the angled rigid plate assembly is situated from about 0.55 inches to 0.74 inches from the bottom cast surface of the panel, in other words about 0.55 inches to 0.74 inches from the moving web on which the cast surface of the panel travels. Preferably, the outer lip of the bottom wall of the angled rigid plate assembly is situated from about 0.02 inches to 0.15 inches below the top surface of the panel being formed. More preferably, the outer lip of the bottom wall of the angled rigid plate assembly is situated from about 0.03 inches to 0.10 inches below the top surface of the panel being formed. It is an unexpected finding that setting the rigid plate assembly below the target panel thickness does not have an effect of reducing the actual thickness of the formed panel.

H. Applying Additional Layers

To build a fiber reinforced concrete (FRC) panel (structural cementitious panel) of desired thickness, additional layers are typically added. To that end, a second slurry feeder 78, which is substantially identical to the feeder 44, is provided in operational relationship to the moving carrier 14, and is disposed for deposition of an additional layer 80 of the slurry 46 upon the existing layer 77.

Next, an additional chopper 82, substantially identical to the choppers 36 and 66, is provided in operational relationship to the frame 12 to deposit a third layer of fibers 68 provided from a rack (not shown) constructed and disposed relative to the frame 12 in similar fashion to the rack 31. The fibers 68 are deposited upon the slurry layer 80 and are embedded using a second embedment device 86. Similar in construction and arrangement to the embedment device 70, the second embedment device 86 is mounted slightly higher relative to the moving carrier web 14 so that the first layer 77 is not disturbed. In this manner, the second layer 80 of slurry and embedded fibers is created.

Figure 6:
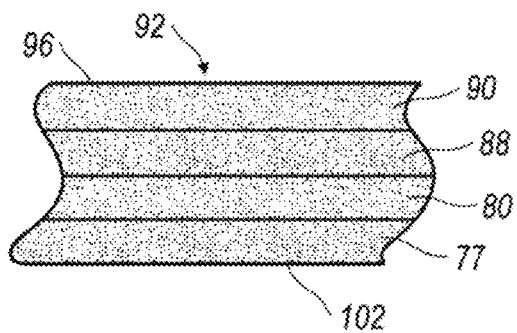
FIG. 6 is a fragmentary vertical section of a structural cementitious panel produced according to the present procedure.

Referring now to FIGS. 1 and 6, with each successive layer of settable slurry and fibers, an additional slurry feeder station 78 followed by a fiber chopper 82 and an embedment device 86 is provided on the production line 10. Preferably, four total layers 77, 80, 88, 90 are provided to form the SCP panel 92. For clarity additional mixers to feed the additional slurry feeder stations 78 may be used but are not necessary. They are not shown in the FIGS.

An important feature of the present invention is that the panel 92 has multiple layers 77, 80, 88, 90 which upon setting, form an integral, fiber-reinforced mass. Provided that the presence and placement of fibers in each layer are controlled by and maintained within certain desired parameters as is disclosed and described herein, it will be virtually impossible to delaminate the panel 92 produced by the present process.

I. Forming and Smoothing and Cutting

Upon the deposition of the four layers of fiber-embedded settable slurry as described above. If desired another thickness control device 93 having an angled plate 95 can be provided as a smoothing device downstream of the last embedment device 86.

After the layers of panel 92 have been smoothed by the thickness control device 93, they will begin to set. Once the layers are set, the respective panels 92 are separated from each other by a cutting device 98, which typically is a saw or water jet cutter. Other cutting devices, including moving blades, are considered suitable for this operation, provided they can create suitably sharp edges in the present panel composition. The cutting device 98 is disposed relative to the production line 10 and the frame 12 so panels, not shown, are produced having a desired length. Since the speed of the carrier 14 is relatively slow, the cutting device may be mounted to cut perpendicularly to the direction of travel of the carrier 14. With faster production speeds, such cutting devices are known to be mounted to the production line 10 on an angle to the direction of web travel. Upon cutting, the separated panels are stacked for further handling, packaging, storage and/or shipment as is well known in the art.

The production line 10 includes sufficient fiber chopping stations 36, 66, 82, slurry feeder stations 44, 78 and embedment devices 70, 86 to produce at least four layers 77, 80, 88 and 90 (FIG. 6). Additional layers may be created by repetition of stations as described above in relation to the production line 10.

Upon creation of the FRC panels 92, an underside 102 or bottom face of the panel may be smoother than the upper side or top face 96, even after being engaged by the forming device 94. In some cases, depending on the application of the panel 92, it may be preferable to have a smooth face and a relatively rough face. However, in other applications, it may be desirable to have a panel in which both faces 96, 102 are smooth. The smooth texture is generated by the contact of the slurry with the smooth carrier 14 or the carrier web 26.

Another feature of the present invention is that the resulting FRC panel 92 is constructed so that the fibers 30, 68 are uniformly distributed throughout the panel. This has been found to enable the production of relatively stronger panels with relatively less, more efficient use of fibers. The volume fraction of fibers relative to the volume of slurry in each layer preferably constitutes approximately in the range of 1% to 5% by volume, preferably 1.5% to 3% by volume, of the slurry layers 77, 80, 88, 90. If desired, the outer layers 77, 90 may have a higher volume fraction that either or both of inner layers 80, 88.

In the invention using multiple discrete fiber layers, a panel fiber volume fraction, $V_f$, is for example a percentage fiber volume content in each slurry layer of 1-5%, is desired. Preferred thickness of distinct slurry layers≤0.35 inches. More Preferred thickness of distinct slurry layers≤0.30 inches. Most preferred thickness of distinct slurry layers≤0.25 inches. Preferred fiber strand diameter≥30 tex. Most preferred fiber strand diameter≥70 tex.

Suitable layer thicknesses range from about 0.05 inch to 0.35 inch (0.13 to 0.9 cm). For instance, for manufacturing a nominal ¾ inch (1.9 cm) thick structural panel, four layers are preferred with an especially preferred slurry layer thickness less than approximately 0.25 inch (0.64 cm) in the preferred structural panel produced by the present process.

If desired there can be another thickness control device 93 having an angled plate 95 after each embedment roll 48 and/or headbox 78.

III. Second Version of a Production Line

The incorporation of a volume fraction of loose fibers distributed throughout the slurry 46 is an important factor in obtaining desired panel strength. Thus, improved efficiency in incorporating such fibers is desirable. It is believed the system depicted in FIGS. 1-6 in some cases requires excessive numbers of slurry layers to obtain an FRC panel having sufficient fiber volume fraction.

Figure 7:
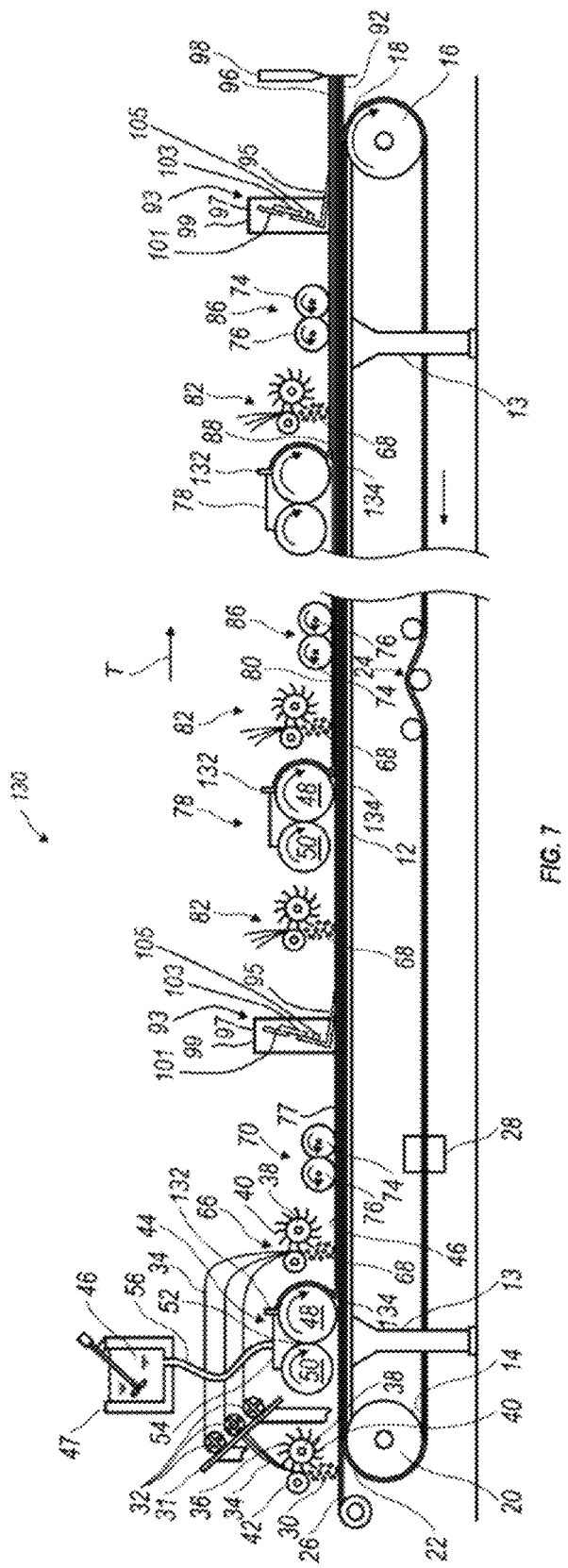
FIG. 7 is a diagrammatic elevational view of a second version of an FRC panel production line plate of the present invention for producing a multi-layer FRC panel with an angled plate.

Accordingly, an alternate FRC panel production line or system is illustrated in FIG. 7 and is generally designated 130 for producing high-performance, fiber reinforced FRC panels incorporating a relatively high volume of fibers per slurry layer. In many cases, increased levels of fibers per panel are obtained using this system. While the system of FIGS. 1-6 discloses depositing a single discrete layer of fibers into each subsequent discrete layer of slurry deposited after the initial layer, the production line 130 includes a method of building up multiple discrete reinforcing fiber layers in each discrete slurry layer to obtain the desired panel thickness. Most preferably, the disclosed system embeds at least two discrete layers of reinforcing fibers, in a single operation, into an individual discrete layer of slurry. The discrete reinforcing fibers are embedded into the discrete layer of slurry using a suitable fiber embedment device.

More specifically, as seen in FIG. 7, to implement the present system 130 of multiple layers of fibers 30, 68 for each layer of slurry 46, additional chopping stations 142 are provided between the embedment device 136 and subsequent slurry feeder boxes 78, so that for each layer of slurry 46, fibers 30, 68 are deposited before and after deposition of the slurry. This improvement has been found to enable the introduction of significantly more fibers into the slurry and accordingly increase the strength of the resulting SCP panel. Preferably, while only three layers are shown, four total layers of combined slurry and fiber are provided to form the SCP panel 92.

IV. Third Version of a Production Line which Deposits Fiber Laden Slurry from a Headbox to Make an FRC Panel from a Single Layer of Slurry The thickness control device of the invention can also be applied to a process for making fiber reinforced cementitious (FRC) panels in which, rather than adding fibers to slurry on the moving carrier web, the fibers are mixed with slurry upstream of the moving carrier web to form fiber laden cementitious slurry. Then this fiber laden cementitious slurry is fed to a headbox, and then deposited by the headbox onto the moving carrier web.

A. Panel Production

Figure 8:
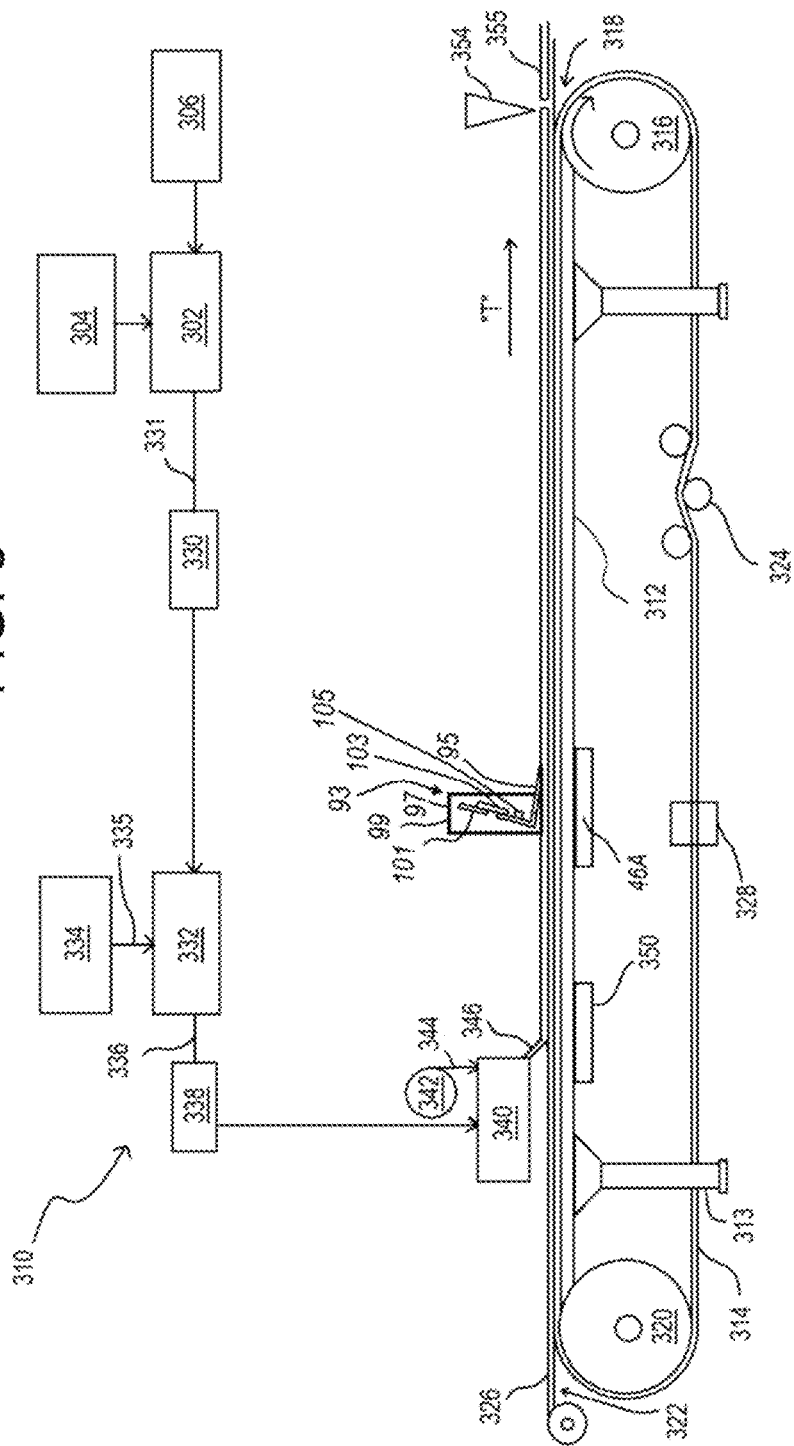
FIG. 8 is a diagrammatic elevational view of a third version of an FRC panel production line for producing single layer FRC panel with an angled plate of the present invention.

FIG. 8 diagrammatically shows a production line generally designated 310 to produce cementitious panel, for example to produce fiber reinforced concrete (FRC) panel. The production line 310 includes a support frame or forming table 312 having a plurality of legs 313 or other supports. Included on the support frame 312 is a moving carrier 314, such as an endless rubber-like conveyor belt with a smooth, water-impervious surface, however porous surfaces, such as a web, are contemplated. As is well known in the art, the support frame 312 may be made of at least one table-like segment, which may include designated legs 313 or other support structure. The support frame 312 also includes a main drive roll 316 at a distal end 318 of the frame, and an idler roll 320 at a proximal end 322 of the frame. Also, at least one belt tracking and/or tensioning device 324 is typically provided for maintaining a desired tension and positioning of the carrier 314 upon the rolls 316, 320. In this version, the cementitious panels are produced continuously as the moving carrier proceeds in a direction "T" from the proximal end 322 to the distal end 318.

In this version, a web 326 of Kraft paper, release paper, polymer film, plastic carrier, or nonwoven fiber mat for supporting a slurry prior to setting may be provided and laid upon the carrier belt 314 to protect it and/or keep it clean. However, it is also contemplated that, rather than the continuous web 326, individual sheets (not shown) of a relatively rigid material, e.g., sheets of polymer plastic, may be placed on the carrier 314. These carrier films or sheets may be removed from the produced panels at the end of the line or they may be incorporated as a permanent feature in the panel as part of the overall composite design. When these films or sheets are incorporated as a permanent feature in the panel they may provide enhanced attributes to the panel including improved aesthetics, enhanced tensile and flexural strengths, enhanced impact and blast resistance, enhanced environmental durability such as resistance to water and water vapor transmission, freeze-thaw resistance, salt-scaling resistance, and chemical resistance.

Production line 310 employs a thickness control device 93 having an angled plate 95, details of which are describe above.

FIG. 8 shows a forming table 312, carrier belt 314, and a carrier web 326 and optional bottom support plate 46A. The production line 310 provides a flat, rigid support bed under each angled rigid plate 95 adapted and configured sufficient to support the fiber laden slurry and preferably withstand downward force exerted by the angled rigid plate 95 with deflection less than 0.03 inches, preferably less than 0.01 inches, preferably less than 0.003 inches.

The flat, rigid support bed is provided to counteract the downward force of the facer covered fiber-laden slurry passing under the rigid horizontal top forming plate 446 and, for example, may be any of the following:

the forming table 312 if sufficiently rigid, the forming table 312 further supported by the rigid bottom forming plate 46A, provided below the carrier belt 314, rigid panels used on the carrier belt 314 under or in place of carrier web 326, the endless belt 314 could be supported by sufficient rollers to be rigid, or there could be a break in the forming table 312 and the rigid bottom forming plate 46A is placed in the break directly under the portion of the endless belt under the top forming plate 446.

As mentioned above, it is also contemplated that, rather than the continuous carrier web 326, individual sheets (not shown) of a relatively rigid material, e.g., sheets of polymer plastic, may be placed on the carrier 314. These can also provide the flat, rigid support bed.

In this version, continuous reinforcement 344 such as a roving, web of nonwoven fibers or a web of reinforcing scrim such as fiberglass scrim may be provided for embedding in the slurry prior to setting and reinforcing the resulting cementitious panels. The continuous rovings, web of nonwoven fibers, and/or reinforcing scrim 344 from roll 342 are fed through the headbox 340 to be laid upon the slurry on the carrier 314. However, it is also contemplated that, the continuous reinforcement 344 be employed after the headbox 340 or not be employed at all.

The continuous scrim or rovings can be made of different reinforcing fiber materials including fiberglass; polymeric materials such as polypropylene, polyethylene, polyvinyl alcohol, etc; carbon; graphite; aramid; ceramic; steel; cellulosic or natural fibers such as jute or sisal; or a combination thereof. A roving is an assemblage of continuous reinforcing monofilaments. Scrim is a web of continuous fibers running in the machine direction and the cross-direction. Reinforcement may also be provided as a non-woven web made of discrete reinforcement fibers. Bottom continuous reinforcement, if desired, is fed behind the headbox 340 and it rests directly on top of the conveying/forming belt. The bottom continuous reinforcement passes under the headbox and the slurry in the headbox 340 is poured directly on its top as the continuous reinforcement moves forward. For example, continuous reinforcement can be provided by web or a roll (not shown) upstream to the headbox in addition to that providing web 326 to lay the continuous reinforcement above web 326.

It is also contemplated that the cementitious panels produced by the present line 10 are formed directly upon the carrier 314. In the latter situation, at least one belt washing unit 328 is provided. The carrier 314 is moved along the support frame 312 by a combination of motors, pulleys, belts or chains which drive the main drive roll 316 as is known in the art. It is contemplated that the speed of the carrier 314 may vary to suit the product being made.

The present production line 310 includes a continuous slurry mixer 302. The slurry mixer may be a single shaft or dual shaft mixer. Dry powder feeder 304 feeds dry components of the cementitious composition, except for reinforcing fibers, to the slurry mixer 302. Liquid pump 306 feeds to the slurry mixer 302 aqueous medium, such as water, with liquid or water soluble additives. The slurry mixer 302 mixes the dry components and the aqueous medium to form a cementitious slurry 331. The cementitious slurry 331 feeds a first slurry accumulator and positive displacement pump 330 which pumps the slurry to a fiber-slurry mixer 332. A fiber feeder 334 feeds fibers 335 to the fiber-slurry mixer 332. Thus, in the fiber-slurry mixer 332 the fibers and slurry are mixed to form a fiber-slurry mixture 336. Fiber-slurry mixture 336 feeds a second slurry accumulator and positive displacement pump 338 which pumps the fiber-slurry mixture 336 to a headbox 340.

Headbox 340 deposits the fiber-slurry mixture 346 on the web 326 of release paper (if present) or, if present, continuous reinforcement 344 provided by rovings and/or scrim roll 342, traveling on the moving carrier 314. To assist in leveling the fiber-slurry mixture 346 a forming vibrating plate 350 may be provided under or slightly downstream on the location where the headbox 340 deposits the fiber-slurry mixture 346.

The headbox 340 will deposit a fiber-slurry mixture as a layer on a moving surface of a cementitious panel production line uniformly as a layer 0.125 to 2 inches thick, preferably 0.25 to 1 inches thick, typically 0.40 to 0.75 inches thick on the moving surface of the panel production line to produce a fiber reinforced cement panel. The fiber-slurry mixture has a viscosity less than 45000 centipoise, preferably less than 30000 centipoise, more preferably less than 15000 centipoise, and most preferably less than 10000 centipoise when measured using a Brookfield Viscometer, Model DV-II+ Pro with Spindle HA4 attachment running at 20 RPM speed. Typically, the resulting fiber-slurry mixtures have a viscosity of at least 1500 centipoise.

The resulting fiber-slurry mixture also has a slump according to the slump test using a 4 inch tall 2 inch diameter pipe which is from 4 to 11 inches. The fiber-slurry mixture is not suitable for extrusion manufacturing processes that typically rely on slurry mixture compositions have extremely high viscosity. The slump test used herein utilizes a hollow cylinder about 5.08 cm. (2 in.) diameter and about 10.16 cm. (4 in.) length held vertically with one open end resting on a smooth plastic surface. The cylinder is filled up to the top with the cementitious mixture followed by striking off the top surface to remove the excess slurry mixture. The cylinder is then gently lifted up vertically to allow the slurry to come out from the bottom and spread on the plastic surface to form a circular patty. The diameter of the patty is then measured and recorded as the slump of the material. As used herein, compositions with good flow behavior yield a larger slump value.

The headbox 340 is disposed transversely to the direction of travel "T" of the carrier web 314. The fiber-slurry mixture 346 is deposited in a cavity of the headbox 340 and discharges onto the moving carrier web 326 (or conveyor belt 314) through a discharge opening onto the moving carrier web 326.

The fiber reinforced cement slurry can be pumped through a hose and hose oscillator system into the headbox 340 or it may be dropped into the headbox 340 directly from the fiber-slurry mixer 332. The oscillator system would be used in either case to agitate the slurry. Thickness of the product formed using the headbox 340 is controlled by the slurry flow rate in the headbox 340, the amount of slurry elevation head in the headbox 340, and headbox discharge opening gap for a given line speed. Preferably the line speed is 1 to 100 feet per minute, more preferably 5 to 50 feet per minute. Other speeds above 100 feet per minute are also contemplated, as one skilled in the art would understand. The size (volume) of the slurry chamber of the headbox 340 is adjusted based on the line speed and product thickness being produced. Preferably the slurry is deposited in the headbox at a rate of about 0.10-25 cubic feet per minute.

The discharge opening gap of the headbox 340 is a transverse opening through which the fiber-slurry mixture discharges from the headbox 40 onto the moving carrier web 326. The fiber-slurry mixture from the headbox deposits onto the moving carrier web 326 in one step at close to the desired thickness and finish of the final panel 355.

Downstream of the headbox thickness control device 93 is provided to control the thickness of the deposited fiber laden slurry 346. It has the same parts and operation as described above for the headbox thickness control device 93 for the multi-layer processes and apparatus of FIG. 1.

In addition to the vibration provided by the angled plate 95 of the headbox thickness control device 93, additional vibration may be added to improve formation and different forms of continuous reinforcements such as scrims and rovings may be added to improve flexural strength of the formed product. For example, a vibration unit 350 may be located below the headbox 340 under the conveyor belt 314. The vibration unit 350 typically vibrates at rate of 500 to 3000 cycles per minute, preferably 1000 to 2000 cycles per minute. The vibration unit 350 is typically a single mass system of a table, springs, and two motors which direct forces directly into the deposited mat of fiber-cement slurry and cancel out in other directions. This unit 350 is placed under the headbox 340 and it extends about 3 to 6 inches beyond the headbox 340.

The slurry 346 sets as it travels along the moving carrier 326. At the distal end 318 of the support frame 312 a cutter 354 cuts the set slurry into FRC panels 355. The FRC panels (boards) 355 are then placed on an unloading and curing rack (not shown) and allowed to cure.

Although not shown in FIG. 8, the production line 310 employs edge formation and leakage prevention devices. These are edge belts, edge rails, (used singly or in combination).

The fiber-slurry mixtures 336 discharged from the fiber-slurry mixer 332 are suitable to make a fiber reinforced cement (FRC) building panel or board 355.

The fiber-slurry mixture discharged from the fiber-slurry mixer 332 has a slump of 4 to 11 inches, preferably 6 to 10 inches, as measured according to a slump test using a 4 inch tall and 2 inch diameter pipe and a viscosity less than 45000 centipoise, preferably less than 30000 centipoise, more preferably less than 15000 centipoise, and most preferably less than 10000 centipoise when measured using a Brookfield Viscometer, Model DV-II+ Pro with Spindle HA4 attachment running at 20 RPM speed. Typically, the resulting fiber-slurry mixtures have a viscosity of at least 1500 centipoise. The resulting fiber-slurry mixture also has a slump according to the slump test using a 4 inch tall 2 inch diameter pipe is from 4 to 11 inches. The resulting fiber-slurry mixture is not suitable for extrusion manufacturing processes that typically rely on slurry mixture compositions have extremely high viscosity. The resulting fiber-slurry mixture is a uniform fiber-slurry mixture that has a consistency that will allow the fiber-slurry mixture to be discharged from the horizontal fiber-slurry mixer and be suitable for being deposited as a continuous layer on a moving surface of a panel production line uniformly as a layer 0.25 to 2.00 inches thick, preferably 0.25 to 1 inches thick, more preferably 0.4 to 0.8 inches thick, typically 0.5 to 0.75 inches thick on the moving surface of the panel production line to produce a fiber reinforced cement panel.

The preferred fiber-slurry mixtures with favorable rheological properties processed through this headbox can beneficially be utilized as a workable slurry having a consistency which facilitates further processing and formation of panel products on a continuous forming line running at high line speeds.

The preferred fiber-slurry mixtures for use with the headbox of the single layer process distinguish over cementitious mixtures used in extrusion processes. Such cementitious mixtures used in extrusion processes have a slump of 2 to 3 inches as measured according to the slump test using a 4 inch tall and 2 inch diameter pipe and have a viscosity greater than 50000 centipoise, more typically greater than 100000 centipoise, and most typically greater than 200000 centipoise. The extrusion mixtures also do not include plasticizers and superplasticizers which are present in fiber-slurry mixtures of the present invention. As mentioned above plasticizers are commonly manufactured from lignosulfonates, a by-product from the paper industry. Superplasticizers have generally been manufactured from sulfonated naphthalene condensate or sulfonated melamine formaldehyde or based on polycarboxylic ethers.

B. Slurry Mixer for the Single Layer Process

Any of a variety of continuous or batch mixers may be employed as the slurry mixer 302. For example, the mortar mixers described in ICRI Guideline No. 320.5R-2014, Technical Guidelines, Pictorial Atlas of Concrete Repair Equipment, International Concrete Repair Institute, May 2014, incorporated by reference, can be used in this invention for preparing cementitious slurry 303. These include horizontal shaft mixers, tumble mortar mixers, rotating-drum stationary mixers, pan-type mixers, rotating-tub rotating paddle mixers, planetary paddle mixers, horizontal shaft mixer-pump combinations, and vertical shaft mixer-pump combinations. The horizontal shaft mixer-pump combinations and vertical shaft mixer-pump combinations are continuous mixers.

Continuous slurry mixers may also be used to prepare slurry in a continuous manner. Commercially available continuous mixers manufactured by the PFT GMBH and Co. KG, based in Iphofen, Germany, are suitable. These continuous mixers have the capability of mixing as well as pumping the slurry in a continuous manner to the point of application. These mixers have a mixing chamber where all solid dry materials are blended together with the liquid additives including water using a cage agitator rotating at a high speed. In the normal mode of operation, the blended cementitious slurry continuously exits the mixing chamber and is pumped forward by a progressive cavity pump (rotor-stator type pump) to the point of application. The preferred PFT mixer models for this invention include PFT Mixing Pump G4, PFT Mixing Pump G5, PFT MONOJET 2.13, PFT Mixing Pump T2E, PFT Mixing Pump MS1 and MS2. In addition, continuous slurry mixers disclosed in U.S. Pat. No. 7,513,963 B2 to George et al, incorporated by reference, may also be used in the present invention.

For example, the continuous slurry mixer 302 may be a single shaft or dual shaft horizontal mixer. The term horizontal, when used with mixers, means generally horizontal. Thus, a mixer oriented with a variation of plus or minus 20 degrees from horizontal would still be considered a horizontal mixer.

C. Horizontal Fiber-Slurry Continuous Mixer for the Single Layer Process

The fiber-slurry continuous mixer of the present invention is preferably a continuous horizontal mixer. An example of this is disclosed by US Published patent application no. 2018/0036912 to Dubey et al, incorporated herein by reference.

The cementitious slurry and fibers are mixed in the mixing chamber of the horizontal fiber-slurry mixer for an average mixing residence time of about 5 to about 240 seconds, preferably 10 to 180 seconds, more preferably 10 to 120 seconds, most preferably 10 to 60 seconds while the rotating paddles apply shear force, wherein the central rotating shaft rotates at 30 to 450 RPM, more preferably 40 to 300 RPM, and most preferably 50 to 250 RPM during mixing, to the fiber-slurry mixture.

Each horizontal shaft is externally connected to a drive mechanism and a drive motor, for example, powered by electricity, fuel gas, gasoline, or other hydrocarbon, to accomplish shaft rotation when the mixer is in operation. Typically an electrical motor and drive mechanism will drive the shaft(s) in the mixing chamber.

D. Inlet Ports for the Continuous Mixer

The size, location, and orientation of raw material inlets ports (inlet conduits) of the fiber-slurry mixer are configured to ease introduction of the raw material into the fiber-slurry mixer and also to minimize potential for blocking of ports from the slurry mixture in the mixer.

The cementitious slurry from the slurry mixer is preferably conveyed using a slurry hose to the fiber-slurry mixer and introduced into the fiber-slurry mixer through an inlet port setup to accept the slurry hose.

The fibers can be introduced into the fiber-slurry mixer gravimetrically or volumetrically using a variety of metering equipment such as screw feeders or vibratory feeders. Fibers can be conveyed from a fiber feeder to the fiber-slurry mixer by a variety of conveying devices. For example, fibers can be transferred using screws (augers), air conveying, or simple gravity deposition. The discrete or chopped fibers can be made of different reinforcing fiber materials including fiberglass; polymeric materials such as polypropylene, polyethylene, polyvinyl alcohol, etc; carbon; graphite; aramid; ceramic; steel; cellulosic or natural fibers such as jute or sisal; or a combination thereof. The fiber length is about 2 inches or lower and more preferably less than 1.5 inches or lower.

E. Forming and Cutting for the Single Layer Process

Upon the disposition of the layer of fiber-embedded settable slurry as described above, the frame 312 may have forming devices provided to shape an upper surface of the setting slurry-fiber mixture 346 traveling on the belt 314.

If desired an additional thickness control device 93 (not shown) may be provided downstream of the thickness control device 93 shown in FIG. 8.

After the one or more thickness control devices 93, the layer of slurry has begun to set, and the respective panels 355 are separated from each other by a cutting device 354, which is typically a water jet cutter or flying saw. The cutting device 354 is disposed relative to the line 310 and the frame 312 so panels are produced having a desired length. When the speed of the carrier web 14 is relatively slow, the cutting device 354 may be mounted to cut perpendicularly to the direction of travel of the web 314. With faster production speeds, such cutting devices are known to be mounted to the production line 310 on an angle to the direction of web travel. Upon cutting, the separated panels 355 are stacked for further handling, packaging, storage and/or shipment as is well known in the art.

Another feature of the present invention is that the resulting cementitious panel, for example, the fiber reinforced concrete (FRC) panel, 55 is constructed so the fibers 335 are uniformly distributed throughout the panel. This has been found to enable the production of relatively stronger panels with relatively less, more efficient use of fibers. The volume fraction of fibers relative to the volume of slurry in each layer preferably constitutes approximately in the range of 1% to 5% by volume, preferably 1.5% to 3% by volume, of the fiber-slurry mixture 46.

It is contemplated that like numbered elements shown in the figures of the present specification are the same, unless otherwise indicated.

Figure 9:
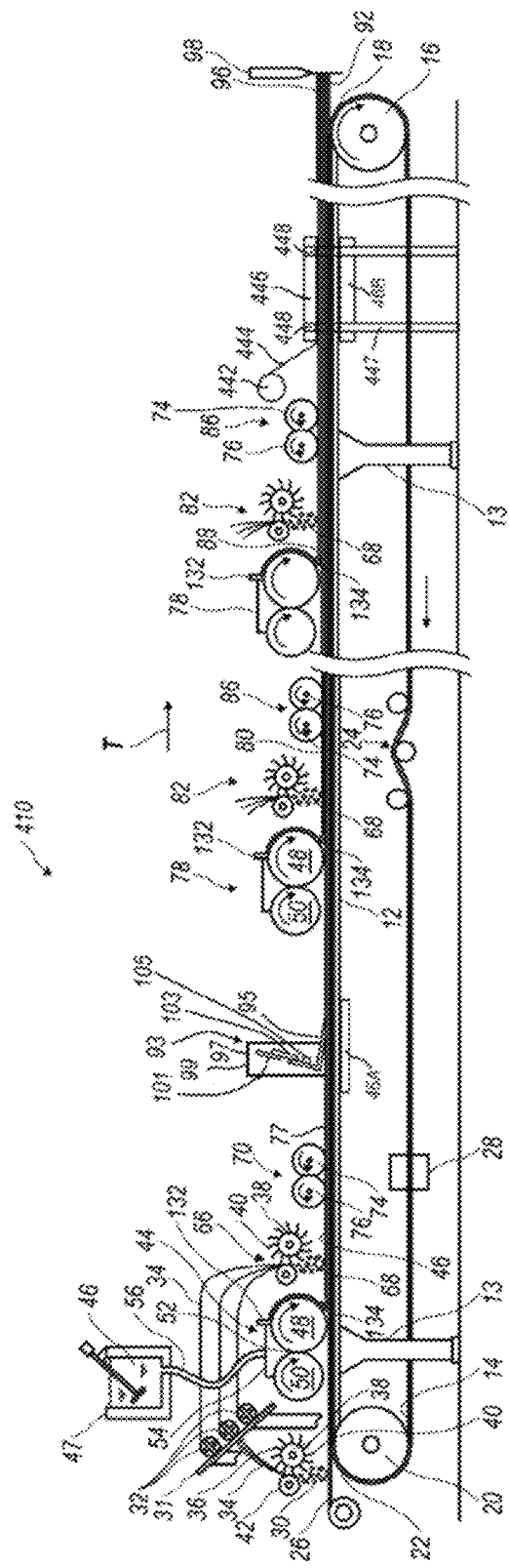
FIG. 9 is a diagrammatic elevational view of a fourth version of an FRC panel production line of the present invention which is the production line of FIG. 1 with an angled plate modified to apply a facer and employ a fixed forming plate.

Production Line and Method with Thickness Control Device Employing a Horizontal Fixed Forming Plate V. Fourth Version of a Production Line which Deposits Discrete Layers of Fiber and Slurry to Make a Multi-Layer FRC Panel FIG. 9 is a diagrammatic elevational view of a fourth version of an FRC panel production line 410 of the present invention which is the production line of FIG. 1 with an angled plate smoothing device 93 having the angled plate 95 but modified to apply a facer 444 and employ a fixed horizontal forming plate 446.

The height of the fixed horizontal forming plate 446 above the moving carrier web is adjustable for example, by jack screws or, for example, by linear actuator with servo control.

In FRC panel production line 410, the first layer 77 is contacted with the thickness control device 93 of the present invention for controlling thickness of the formed, but not yet set, fiber reinforced cementitious panel layer first layer 77 comprising fiber laden cementitious slurry comprising cementitious material and embedded chopped fibers on the moving carrier web 26. The thickness control device 93 comprises the angled rigid plate 95 and the U-shaped mounting stand 97 for mounting the angled rigid plate 95 over the support frame or forming table 12 for the moving carrier web 26.

Then downstream of the thickness control device 93 a facer sheet 444 from a roll 442 is applied over surface 77 of the traveling fiber laden slurry. Then the facer covered slurry layer passes under the fixed horizontal forming plate 446 held in place by supports 448.

Thus, the invention provides an FRC panel production line and a method for FRC panel production which reduces thickness variation during formation of fiber reinforced cementitious panels, with the use of a facer, such as a glass mat placed across the width of the forming surface and a rigid horizontal top forming plate. With the new invention, a facer, such as glass mat, is applied to one or both surfaces of the structural panel during the forming process. Then the rigid horizontal top forming plate 446 which is horizontally oriented is used to form the structural panel glass/cement slurry to the desired thickness. The position of the entire forming plate 446 is fixed to provide a fixed gap between the lower surface of the forming plate and the moving carrier web underneath. Thus, it is not a "floating" plate. Due to its horizontal orientation the entire lower surface of the forming plate 446, not merely the downstream end as in the above-described angled rigid plate 95, contacts the surface of the panel being formed as it passes underneath the forming plate. This process produces panels with less variation in thickness, which then allows the panels to be formed at a reduced average thickness, for example 0.80", without having local thin spots below 0.72". Most preferably, the fixed horizontal forming plate 446 when used in conjunction with the top facer 444 permits formation of a panel having the desired thickness such that there is no need for finishing operations such as surface sanding to bring the panel thickness down to the target panel thickness. Thus, it is possible to use less raw materials while making the same finished product. Additional savings will come from reduced waste handling costs, as well as items such as reduced equipment wear, and increased manufacturing speed. As mentioned, in this invention one or two faces may be used. Moreover, the one or more facers may be temporary, so that the facer(s) are removed prior to or during the Finishing operation, or the facer(s) may remain on the finished product.

The fixed horizontal forming plate 446 is placed at a height for the lower surface of the fixed horizontal forming plate 446 to contact the top facer 444. Typically in operation the fixed horizontal forming plate 446 is placed to locate the lower surface of the fixed horizontal forming plate 446 at a height 0.001 to 0.05 inch, for example 0.01 to 0.03 inch, lower or higher than the target thickness of the FRC panel. For example, for a 0.75 inch FRC panel the height of the fixed horizontal forming plate 446 may be set at 0.73 inch or at 0.77 inch. Most preferably, the fixed horizontal forming plate 446 is placed to locate the lower surface of the fixed horizontal forming plate 446 at a height that is same as target panel thickness. For instance, if the desired panel thickness is 0.75 inch, the height of the fixed horizontal forming plate is set at 0.75 inch.

As seen in FIG. 9 the invention may provide an FRC panel production line and a method for FRC panel production which reduces thickness variation during formation of fiber reinforced cementitious panels, with the use of the above-described angled plate 95 and with the use of the facer 444, such as a glass mat placed across the width of the forming surface, and the fixed horizontal forming plate 446. Such an FRC panel production line and method would contact the fiber laden slurry with the above-described angled plate 95, then apply the facer 444, such as glass mat to the upper surface of the structural panel during the forming process, and then run the facer covered fiber laden slurry under the rigid horizontal top forming plate 446.

To achieve the target panel thickness during the panel forming process using the fixed horizontal forming plate 446 and the facer 444, a head of slurry is continuously maintained right behind the fixed horizontal forming plate 446. This head of slurry is over and above the continuous and substantially flat ribbon of FRC slurry approaching the fixed horizontal forming plate 446. The presence of this excess slurry behind the fixed horizontal forming plate 446 ensures that the FRC slurry exiting the fixed horizontal forming plate 446 has the right volume and thickness. In the absence of a slurry head behind the fixed horizontal forming plate 446, any reduction and/or fluctuations in slurry volume occurring behind the fixed horizontal forming plate 446 could result in formation of panel having thickness lower than the target panel thickness. A continuous slurry head behind the fixed horizontal forming plate 446 is maintained by adjusting the volume output of one or more slurry pumps feeding the slurry onto the forming line. Optionally, a separate slurry pump can be provided that feeds the slurry directly and immediately behind the fixed horizontal forming plate 446. The volume of the slurry head immediately behind the fixed horizontal forming plate 446 is sufficient to counter any normal variations in slurry pump feed rates typically observed with industrial pumps feeding cementitious slurries. The actual volume of the slurry head required behind the fixed horizontal forming plate 446 is dependent upon several factors including the production line speed, distance between the slurry feed apparatuses 44 on the production line and the fixed horizontal forming plate 446 and the ability of the process to control slurry leakage and overflow behind and around the fixed horizontal forming plate 446. Preferably, the size and volume of slurry head is uniform across the panel width behind the fixed horizontal forming plate 446. The length of the slurry head extending in the machine direction behind the fixed horizontal forming plate 446 is preferably between 1 inch to 30 inches, more preferably 2 inches to 24 inches, and most preferably between 3 inches to 18 inches. A smaller length of slurry head such as between 4 inches to 12 inches is preferred because it minimizes static zones in the slurry head where slurry stiffening and set can prematurely occur causing problems with uniform formation of the fiber laden slurry as it passes under the fixed horizontal forming plate 446.

To facilitate continuous maintenance of slurry head behind the fixed horizontal forming plate 446, the distance between the last slurry feed apparatus 44 and the fixed horizontal forming plate 446 should be minimized. The distance between the last slurry feed apparatus 44 on the production line and the fixed horizontal forming plate 446 is preferably less than 100 feet, more preferably less than 50 feet, and most preferably less than 25 feet, for example, less than 10 feet.

However, when the horizontal forming plate 446 is employed in the production lines and methods of the present invention, use of the above-described angled plate 95 is optional.

Likewise, when the above-described angled plate 95 is employed in the production lines and methods of the present invention, use of the horizontal forming plate 446 is optional.

The production line and method may optionally also apply a facer, such as glass mat, to the lower surface of the structural panel upstream of the slurry headbox during the forming process.

In a preferred embodiment of this invention, a side wiper 500 also called a "slurry containment device" is installed to each side of the forming plate 446. The wipers 500 may be attached to the forming plate mounting frame 377 or other structural parts of the production line, as one skilled in the art would appreciate. The purpose of the side wipers 500 is to dam slurry at the edges of the panel being formed, thus preventing flow of excess slurry beyond the edges of the panel being formed, where it could seep between the top forming plate 446 and the top surface of the glass mat, creating unwanted appearance and/or thickness variation in the formed panel. The wipers 500 also function to stop slurry from leaking around the sides of the forming plate 446, thus preventing buildup of hardened slurry which could hinder continuous operations. A vibrator 502 may be attached to each of the wipers 500. The vibration keeps the slurry from setting on the wiper 500 itself and also prevents premature setting and/or solidification of the slurry behind the forming plate 446.

In another preferred embodiment of this invention, another vibrator 504 or a series of vibration means are mounted under the bedplate of the forming line just prior to, and/or under, the top forming plate 446. One purpose of this vibrator/s 502, 504 is to keep the slurry head active behind the forming plate preventing the slurry to set while it is behind the forming plate.

Thus, the invention provides a fiber reinforced cementitious panel production line comprising:

a moving carrier web, a support frame for supporting the moving carrier web, wherein the panel is transported on the moving carrier web having a direction of travel relative to the support frame, a means for applying a facer, such as a glass mat, on a fiber laden cementitious slurry on the moving carrier web, the means for applying the facer placed across the width of a forming surface of the moving carrier web, a horizontal thickness control device for controlling thickness of a formed, but not yet set, fiber reinforced cementitious panel comprising fiber laden cementitious slurry comprising cementitious material and embedded chopped fibers on the moving carrier web, wherein the horizontal thickness control device comprises a rigid horizontal top forming plate (for example horizontal top forming plate 446), wherein the rigid horizontal top forming plate has a flat bottom surface, an upstream end and a downstream end, and a forming plate mounting frame for mounting the rigid horizontal top forming plate in a horizontal orientation over the support frame for the moving carrier web, wherein the rigid horizontal top forming plate is mounted to the forming plate mounting frame, and a flat, rigid support bed under the rigid horizontal top forming plate, adapted and configured sufficient to support the fiber laden cementitious slurry and preferably withstand downward force exerted by the rigid horizontal top forming plate with deflection less than 0.03 inches, preferably less than 0.01 inches, preferably less than 0.003 inches, the forming plate mounting frame for fixedly, but adjustably, maintaining height of the rigid horizontal top forming plate over the moving carrier web and maintaining the rigid horizontal top forming plate parallel relative to the moving carrier web, to fixedly locate the flat bottom surface at a height of 0.1 to 2 inches, preferably 0.2 to 1.1 inches, more preferably 0.5 to 1.1 inches, over the moving carrier web, wherein the upstream end of the flat bottom surface extends across the moving web transversely, relative to direction of travel of the moving web, wherein the downstream end of the flat bottom surface extends across the moving web transversely, relative to direction of travel of the moving web, and wherein the entire flat bottom surface is adapted and configured for contacting the facer on the fiber-laden slurry when carried on the moving carrier web.

Thus, the invention also provides a process for making fiber reinforced cementitious panel comprising:

transporting a fiber laden slurry for a panel on a moving carrier web, the moving carrier web supported by a support frame, wherein the panel is transported on the moving carrier web having a direction of travel relative to the support frame, applying a facer, such as a glass mat, on a fiber laden cementitious slurry on the moving carrier web, across the width of a forming surface of the moving carrier web to cover the forming surface, passing the facer covered forming surface under a horizontal thickness control device for controlling thickness of a formed, but not yet set, fiber reinforced cementitious panel comprising fiber laden cementitious slurry comprising cementitious material and embedded chopped fibers on the moving carrier web, wherein the horizontal thickness control device comprises a rigid horizontal top forming plate (for example horizontal top forming plate 446), wherein the rigid horizontal top forming plate has a flat bottom surface, an upstream end and a downstream end, and a forming plate mounting frame for mounting the rigid horizontal top forming plate in a horizontal orientation over the support frame for the moving carrier web, wherein the rigid horizontal top forming plate is mounted to the forming plate mounting frame, and a flat, rigid support bed under the rigid horizontal top forming plate, adapted and configured sufficient to support the fiber laden cementitious slurry and preferably withstand downward force exerted by the rigid horizontal top forming plate with deflection less than 0.03 inches, preferably less than 0.01 inches, preferably less than 0.003 inches, controlling thickness of the formed, but not yet set, fiber reinforced cementitious panel by contacting the facer covered formed, but not yet set, fiber reinforced cementitious panel comprising fiber laden cementitious slurry with a bottom surface of the rigid horizontal top forming plate;

the mounting frame for fixedly, but adjustably, maintaining height of the angled plate over the moving carrier web and maintaining the rigid horizontal top forming plate parallel relative to the moving carrier web, to fixedly locate the flat bottom surface at a height of 0.1 to 2 inches over the moving carrier web, wherein the upstream end of the flat bottom surface extends across the moving web transversely, relative to direction of travel of the moving web, wherein the downstream end of the flat bottom surface extends across the moving web transversely, relative to direction of travel of the moving web, and wherein the entire flat bottom surface contacting the facer on the fiber-laden slurry when carried on the moving carrier web.

FIG. 9 shows a forming table 12, endless belt 14, and a carrier web 26 and optional bottom support plates 46A, 46B. The production line 410 provides a flat, rigid support bed under the rigid horizontal top forming plate 446 adapted and configured sufficient to support the fiber laden slurry and preferably withstand downward force exerted by the rigid horizontal top forming plate 446 with deflection less than 0.03 inches, preferably less than 0.01 inches, preferably less than 0.003 inches.

The flat, rigid support bed is provided to counteract the downward force of the facer covered fiber-laden slurry passing under the rigid horizontal top forming plate 446 and, for example, may be any of the following:

the forming table 12 if sufficiently rigid, the forming table 12 further supported by the rigid bottom forming plate 46A, provided below the carrier belt 14, rigid panels used on the carrier belt 14 under or in place of carrier web 26, the endless belt 14 could be supported by sufficient rollers to be rigid, or there could be a break in the forming table 12 and the rigid bottom forming plate 46A is placed in the break directly under the portion of the endless belt under the top forming plate 446.

Figure 9A:
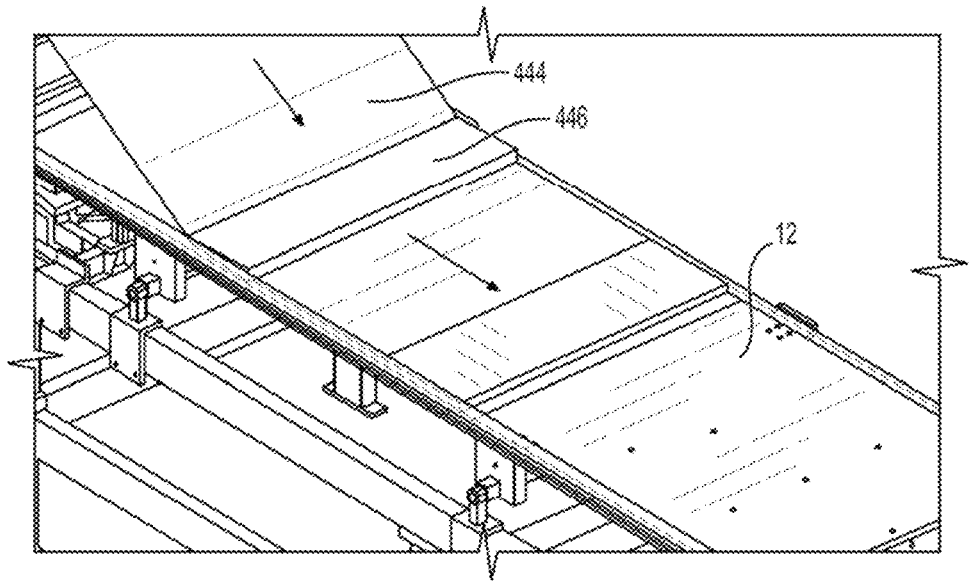
FIG. 9A shows a first enlarged perspective view of a portion of the FRC panel production line of FIG. 9 to apply the facer and employ the fixed forming plate.

FIG. 9A shows a first enlarged perspective view of a portion of the FRC panel production line 410 of FIG. 9 to apply the facer 444 and employ a fixed horizontal top forming plate 446. For clarity, the mounting frame is not shown.

Figure 9B:
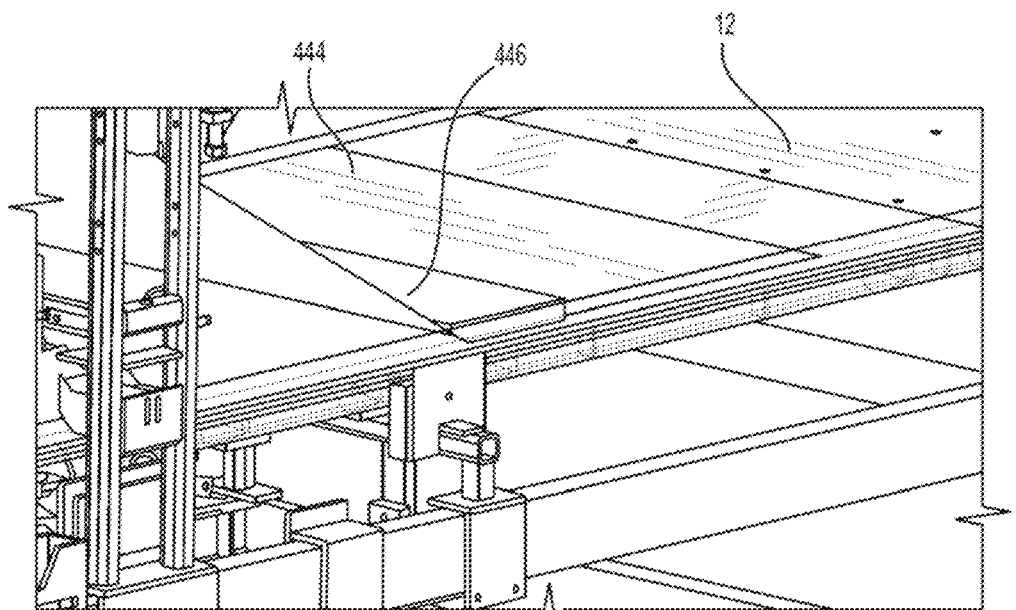
FIG. 9B shows a second enlarged perspective view of a portion of the FRC panel production line of FIG. 9 to apply the facer and employ the fixed forming plate.

FIG. 9B shows a second enlarged perspective view of a portion of the FRC panel production line of FIG. 9 to apply the facer and employ a fixed forming plate. For clarity, the mounting frame is not shown.

Figure 9C:
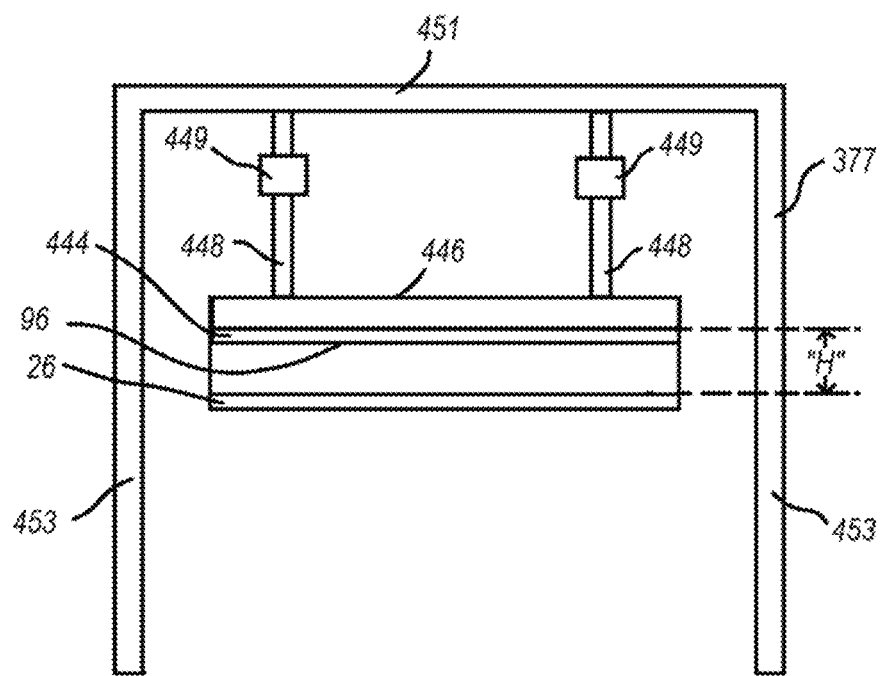
FIG. 9C shows a forming plate mounting frame for mounting the rigid horizontal top forming plate in a horizontal orientation over the support frame for the moving carrier web for the fixed forming plate of the FRC panel production line of FIG. 9.

FIG. 9C shows a forming plate U-shaped mounting frame 377 for mounting the rigid horizontal top forming plate 446 in a horizontal orientation over the support frame 12 for the moving carrier web 26 and a facer 444 of the FRC panel production line 410 of FIG. 9. The U-shaped mounting frame 377 having a cross bar 451 and legs 453 and supports 448 provided with actuators with servo control 449 extending downwardly from the cross bar 451. The actuators with servo control 449 are provided to adjust and control the height "H" of the rigid horizontal top forming plate 446 in the horizontal orientation over the moving carrier web 26 such that the horizontal forming plate 446 contacts the facer 444 on top face 96.

Figure 9D:
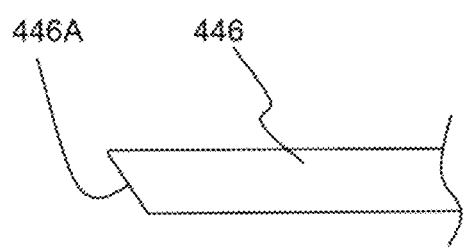
FIG. 9D shows a beveled upstream edge of the horizontal forming plate.

The upstream edge 446A (FIG. 9D) of the horizontal forming plate 446 is preferably beveled, where it first comes in contact with the facer 444, to avoid damage to the facer 444 which might otherwise occur.

Figure 10:
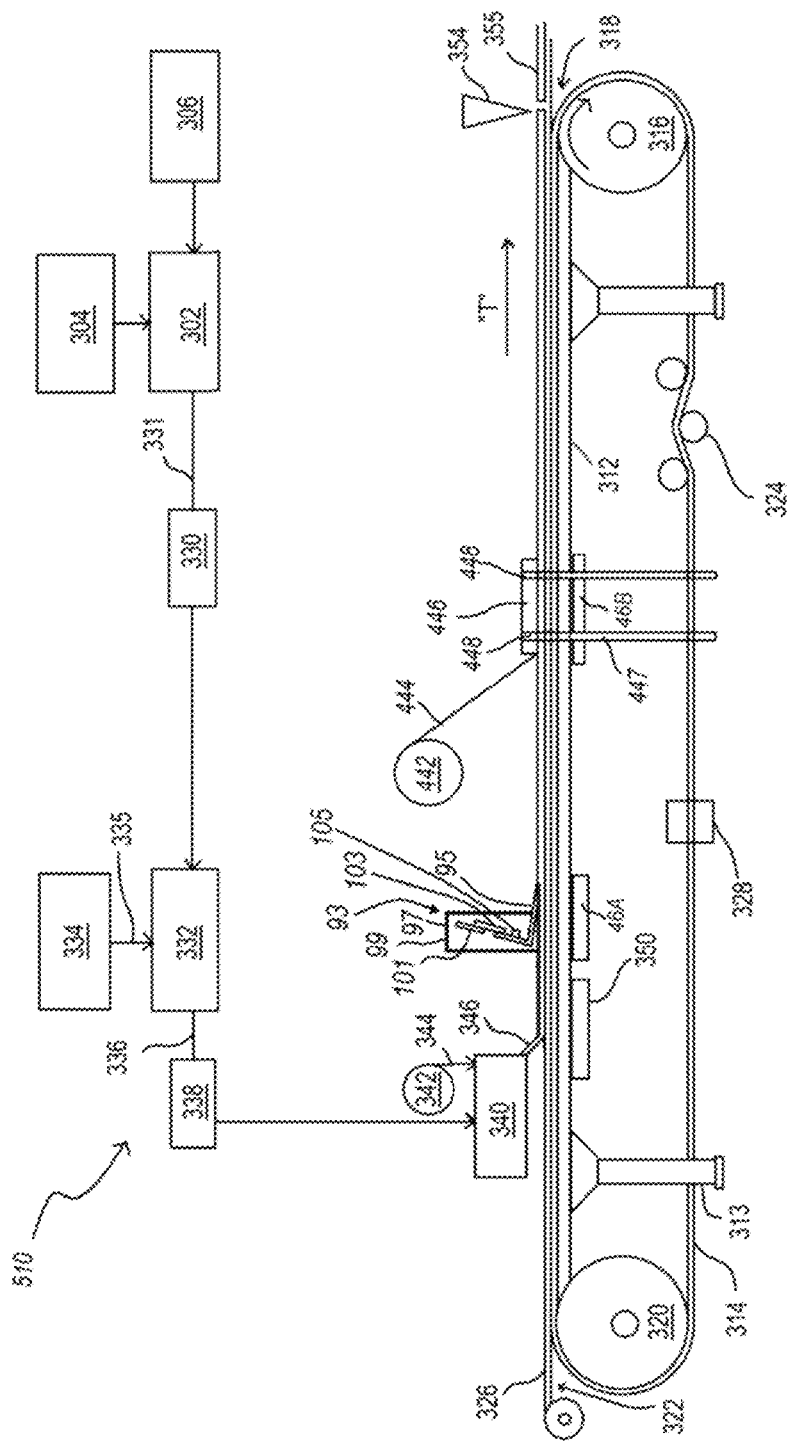
FIG. 10 is a diagrammatic elevational view of a fifth version of an FRC panel production line with an angled plate of the present invention modified to apply a facer and employ a fixed forming plate.

VI. Fifth Version of a Production Line which Deposits Fiber Laden Slurry from a Headbox to Make an FRC Panel from a Single Layer of Slurry FIG. 10 is a diagrammatic elevational view of a fifth version of an FRC panel production line 510 with an angled plate 95 of the present invention modified to apply a facer 444 and employ a fixed forming plate 446 and optionally bottom support plate 46B. This is the production line 310 of FIG. 8 modified to apply the facer 444 from a roll 442 and employ the fixed forming plate 446 supported by supports 448. It may optionally also employ bottom support plates 46A, 46B. Like numbered elements in FIG. 10 and other figures of the present specification are the same elements and operate the same way unless otherwise indicated.

If desired an additional fixed forming plate 446 (not shown) may be supplied and applied to the facer 444 upstream or downstream of the fixed forming plate 446 shown in FIG. 10.

Wrapping a Fiber Reinforced Concrete (FRC) Panel in Nonwoven Fiber Layers

The invention also encompasses to make a board wrapped in nonwoven fiber mat, typically a nonwoven polymer fiber mat such as a polypropylene mat or a substantially inorganic nonwoven fiber mat such as a fiberglass mat, on the panel production line. The inorganic nonwoven fiber mat may optionally be coated with a variety of coating materials that impart handling characteristics to the continuous web and enhance physical and chemical durability. The nonwoven fiber mat is preferably applied on the both major faces of the panel but optionally may be applied only on one of the major faces of the panel.

Figure 10A:
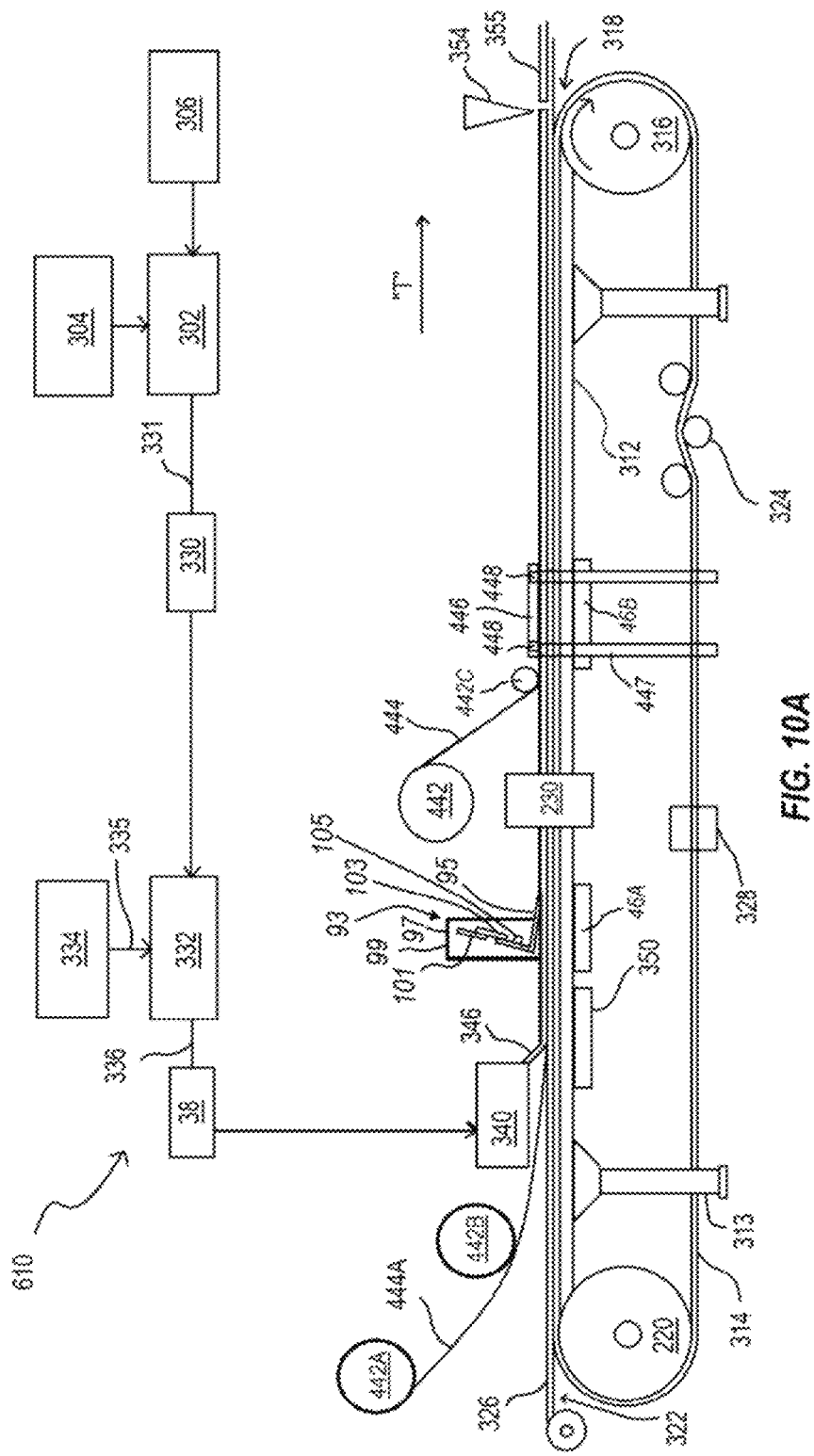
FIG. 10A is a diagrammatic elevational view of a sixth version of an FRC panel production line with an angled plate of the present invention modified to apply a facer and employ a fixed forming plate and fold edges of a lower facer under edges of an upper facer to wrap the FRC panel.
Figure 10E:
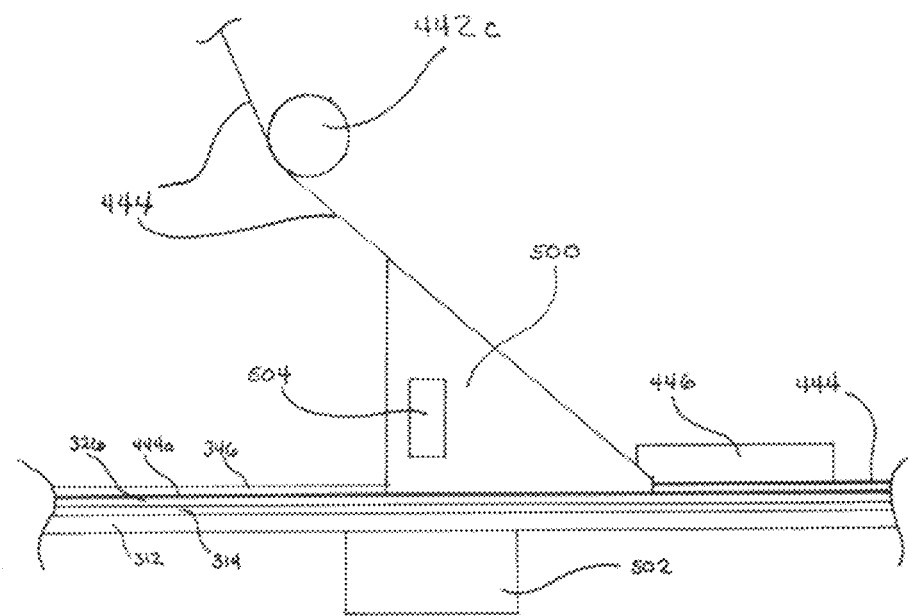
FIG. 10E shows a side view of a portion of a representative production line with side wipers installed on each side of the line and before the forming plate to prevent slurry leakage. An optional vibrator attached to the side of a wiper is also shown. An optional vibrator installed under the bed plate of the forming line just behind the forming plate to keep the slurry head active and fluid is shown as well.

FIG. 10A shows the cementitous panel production line 610 for use with the present fiber-slurry mixing device. It is production line 510 of FIG. 10 modified for applying nonwoven fiber mat 444A below the fiber-slurry mixture and applying nonwoven fiber mat 444 above the fiber-slurry mixture 346 to wrap the produced board 355. (However, this modification could also be used to modify any version of the present invention, for example, the versions of the invention to make the multi-layer FRC panels). In FIG. 10A like reference numbers from FIG. 10 or other figures of the present specification are employed to represent like elements operating in like manner.

Both the above-described angled plate 95 and horizontal forming plate 446 are shown as employed in the cementitous panel production line 610. It may optionally also employ bottom support plates 46A, 46B. In this and other the production lines and methods of the present invention using the horizontal forming plate 446, use of the above-described angled plate 95 is optional.

Likewise, when the above-described angled plate 95 is employed in the production lines and methods of the present invention, use of the horizontal forming plate 446 is optional.

FIG. 10A shows a first continuous mat of nonwoven (preferably fiberglass or multi-layer polyolefin) fiber 444A from a feed roller 442A passes under a roller 442B onto the surface of the moving belt 314. Then the fiber reinforced cementitious slurry mixture 346 produced with the fiber-slurry mixer is deposited on the first mat of nonwoven fiber 444A using the forming headbox 340. The mat of nonwoven fiber 444A on the moving surface of the panel production line 610 extends from the right and left sides of the setting fiber-slurry mixture 346 for board 355. The mat 444A may optionally be wider than the width of the subsequent formed panel, with edges 444B and 444C folded to an upright position prior to passing under the headbox 340.

Then the surface of the deposited fiber laden slurry 346 is smoothed by passing the deposited fiber laden slurry 346 under the angled plate 95 to contact the surface of the deposited fiber laden slurry 346 with the downstream end of the angled plate 95 as described above.

In the case where mat 444A is wider than the subsequently formed panel, an optional folding unit 230 may optionally further fold the upright edges 444B, 444C (see FIG. 10B) of the mat 444A to not only wrap around the right and left sides of the setting fiber-slurry mixture 346 for board 355, but also optionally fold the upright portions again to provide an overlap area with mat 444. Thus, the mat 444A can be wrapped around the setting fiber-slurry mixture 346 of board 355 to wrap the right and left edges 444B, 444C (FIG. 10B) of the mat 444A and optionally provide an overlap area with mat 444, when the board 355 is not entirely set.

Then the invention feeds the top mat (web) 444 of nonwoven fiber material from the feed roll 442, then under an optional application roll 442C onto the upper surface of the fiber-slurry mixture. Optionally, glue may be applied to the top mat (web) 444 and/or to the folded over edges of mat 444A where they overlap. Then the fiber-slurry mixture 346 covered by the nonwoven fiber mat 444 passes under the horizontal forming plate 446 to smooth the surface of the panel 355.

Thus, the method may comprise:

applying a first web 444A of nonwoven fibers on the moving surface of a panel production line, the first web 444A is sufficiently impermeable to prevent seepage of the fiber-slurry mixture on the panel production line; the first web 444A being wider than the cement board 355 being made; forming a continuous trough by bending outer portions of the first web 444A upright;

continuously depositing the fiber-slurry mixture 346 from the headbox 340 on the first web 444A and distributing the fiber-slurry mixture 346 laterally to fill the trough to a substantially uniform depth;

passing the fiber-slurry mixture 346 under the angled plate 95 to contact the downstream end of the angled plate 95 to smooth the surface of the fiber-slurry mixture 346;

then in folding station 230 folding edges of the lower facer 444A to provide an overlap area with the upper facer 444; and applying the second web 444 of nonwoven fibers to an upper surface of the setting fiber-slurry mixture 346 on the panel production line 610;

then contacting the second web 444 of nonwoven fibers on the upper surface of the setting fiber-slurry mixture 346 with the fixed forming plate 446; and then cutting the setting panel 355 with cutting device 354 to form FRC panels 355.

Folding unit 230 may optionally be located downstream of the fixed top forming plate 446. In this case, the upright edges 444B and 444C may not pass under the top forming plate 446 but instead adjacent to its edges. The folding unit 230 would then further fold the upright edges 444B and 444C so that the overlap is formed with these portions of mat 444A located over mat 444. Folding unit 230 may be any suitable folding unit. For example, U.S. Pat. No. 5,221,386 to EnsmingerEnsminger et al, incorporated herein by reference, describes an apparatus for wrapping bare surfaces of setting cement panel with woven mesh of reinforcing fibers underlying the top, bottom, and longitudinal edge surfaces (in other words, embedded). The Ensminger et al apparatus can be adapted to be folding unit 230 by replacing its cement and woven mesh with setting fiber-slurry mixture 346 for board 355 and nonwoven fiber mats 444, 444A (which do not embed). The Ensminger et al apparatus includes a pair of edger rails which slidably rest on a conveyor belt and define the path of the cement board being made on the conveyor belt and a means for folding and pressing outer margins of its bottom mesh comprising first pair of flexed spatulas mounted over the conveyor belt on a cross bar transverse to the direction of travel of the moving fiber-slurry mixture Thus, to achieve the folding the present invention may employ a first pair of flexed spatulas (not shown) mounted over the fiber-slurry mixture 346. For example, the spatulas can be mounted on a cross bar (not shown, but disclosed in U.S. Pat. No. 5,221,386 to Ensminger et al) transverse to the direction of travel of the moving fiber-slurry mixture. As the trough of fiber-slurry mixture 346 approaches the first pair of flexed spatulas the margins of the first mat 444A and the walls of the trough they form contact the spatulas to be tucked under the spatulas to initiate the folding over of the continuously approaching mat 444A.

Preferably, the mats are not substantially embedded in the cementitious core. Preferably, less than about 50% of the thickness of each mat is embedded in the cementitious core, more preferably less than about 30% is embedded in the cementitious core, furthermore preferably less than about 15%, less than about 5% is embedded in the cementitious core.

In this production line 210, an optional web 326 of release paper, polymer film or a plastic carrier, for supporting a slurry prior to setting, may be provided and laid upon the carrier 314 to protect it and/or keep it clean. It is also contemplated that, rather than the continuous web 326, individual sheets (not shown) of a relatively rigid material, e.g., sheets of polymer plastic, may be placed on the carrier 314. These carrier films or sheets may be removed from the produced panels at the end of the line or they may be incorporated as a permanent feature of the panel as part of the overall composite design. When these films or sheets are incorporated as a permanent feature in the panel they may provide enhanced attributes to the panel including improved aesthetics, enhanced tensile and flexural strengths, enhanced impact and blast resistance, enhanced environmental durability such as resistance to water and water vapor transmission, freeze-thaw resistance, salt-scaling resistance, and chemical resistance.

The nonwoven fiber mat 444, 444A may optionally be used in conjunction with a continuous web 326 (for instance the continuous web 326 could be a release paper that prevents any permeated slurry through the nonwoven fiber mat 444A to reach the forming belt). When employing web 326 as a permanent feature of the panel and employing the relatively impermeable nonwoven fiber mat 444, 444A, the web 326 may be affixed to the nonwoven fiber mat 444, 444A with adhesive (for example web 326 may be provided with pressure sensitive adhesive). However, the web 326 or individual sheets of relatively rigid material (not shown) are optional and preferably not employed in this production line 610 of FIG. 10A (old42) when the relatively impermeable mats 444A, 444 are employed. Or preferably the continuous web 326 is the relatively impermeable nonwoven fiber mat and in that event the relatively impermeable nonwoven fiber mat 444A is not employed.

FIG. 10B is a schematic perspective view of an FRC panel 355 of FIG. 10A wrapped in nonwoven fiber mat made according to production line 610. The non-woven fiber mat covering includes a core of set fiber-slurry mixture 346, a front mat 444, and a rear mat 444A having right and left edges wrapped around the right and left sides of the panel 355 to the front of the panel. Mats 444 and 444A preferably are of the same material but can optionally be made of different materials depending on the product application requirements. In some embodiments, the nonwoven fiber mat may be used only on one of the major faces of the panel.

In production line 610 the upright portions of the first facer (mat) 444A are folded before applying the top web to make a panel such as that of FIG. 10B.

In an alternative (not shown) the folding unit 230 is moved from upstream of the forming plate 446 to be downstream of the horizontal forming plate 446. The fiber-slurry mixture 346 covered by the nonwoven fiber facer mat 444 passes under the horizontal forming plate 446 to smooth the surface of the panel upstream of folding unit 230. Then folding unit 230 folds edges of a lower facer 444A over edges of an upper facer 444 to wrap the FRC panel 355. In particular, the right and left edges 444B, 444C are wrapped and optionally glued where they overlap the upper facer 444. Then the wrapped setting fiber-slurry mixture 346 for board 355 is processed as described above for production line 310 of FIG. 8.

Materials and Structures for Nonwoven Fiber Mats which do not Fully Embed

These nonwoven fiber mats in the invention designed for not fully embedding into the fiber-slurry mixture, such as for example mats 444, 444A of FIG. 10A, comprise any suitable type of polymer fiber, glass fiber, or combination thereof. Preferably, the majority of fibers in the nonwoven fiber mat are glass fibers or polymeric fibers. Non-limiting examples of suitable fibers include glass fibers, polyamide fibers, polyaramide fibers, polypropylene fibers, polyester fibers (e.g., polyethylene terephthalate (PET)), polyvinyl alcohol (PVOH), polyvinyl acetate (PVAc), cellulosic fibers (e.g., cotton, rayon, etc.), and combinations thereof, preferably glass fibers. Furthermore, the fibers of the mat can be hydrophobic or hydrophilic, coated or uncoated.

These nonwoven fiber mats are not permeable to the fiber-slurry mixture or they are at most slightly permeable to the fiber-slurry mixture. In particular, the non-woven fiber mats provide sufficient impermeability to not let fiber-slurry mixture of the invention seep through even when the fiber-slurry mixture of the invention is vibrated and/or goes under forming plates on the production line. Fiber-slurry mixture of the invention can undergo a shear thinning when vibrated or spread on the panel production line. This makes the selection of the proper nonwoven sheet to prevent seepage important. If mats are nonwoven fiber glass mats they are coated nonwoven fiberglass mats so they do not completely embed into the fiber reinforced cementitious slurry material. This aspect of the invention with mats that do not embed does not use woven glass mat because woven glass mat is not tight enough to prevent seepage of the slurry through it. The invention contemplates using upper and/or lower meshes and scrims, for example, woven glass mats, when embedding is desired.

In the alternative the nonwoven fiber mats are preferably made of polyolefin (preferably polypropylene and/or polyethylene).

The nonwoven fiber mats can each be a single layer. For example, the preferred coated fiberglass mats are single layers. However, polymer mats are preferably made of more than one layer. For example, FIG. 10C shows a side cross-sectional view of a mat of polymer fibers that has a laminate composite structure of one spun bound layer of the fibers and a relatively impermeable melt blown layer of the fibers. More preferably the mat 444 is a polyolefin mat having two spun bound layers 446A, 446C of the fibers and a melt blown layer 446B of the fibers sandwiched in-between the spun bound layers. The melt blown layer provides sufficient impermeability to not let fiber-slurry mixture of the invention seep through even when the fiber-slurry mixture of the invention is vibrated and/or goes under forming plates on the production line.

The fibers used in the nonwoven glass mat should be at least 0.25 inch long or longer, more preferably at least one half inch or three quarters inch long and most preferably at least about one inch long, but mixtures of fibers of different lengths and/or fiber diameters can be used as is known. It is preferred that these fibers be coated with a silane containing size composition as is well known in the industry. A preferred continuous glass fiber for fibrous web is at least one member selected from the group consisting of E, C, and T type and sodium borosilicate glasses, and mixtures thereof. As is known in the glass art, C glass typically has a soda-lime-borosilicate composition that provides it with enhanced chemical stability in corrosive environments, and T glass usually has a magnesium aluminosilicate composition and especially high tensile strength in filament form. The present mat is preferably composed of E glass, which is also known as electrical glass and typically has a calcium aluminoborosilicate composition and a maximum alkali content of 2.0%. E glass fiber is commonly used to reinforce various articles. The chopped fibers of the major portion can have varying lengths, but more commonly are substantially of similar length. E glass fiber has sufficiently high strength and other mechanical properties to produce acceptable mats and is relatively low in cost and widely available. Most preferred is E glass having an average fiber diameter of about 11+/−1.5 µm and a length ranging from about 6 to 12 mm.

The non-woven fiber mats generally comprise fibers bound together by a binder, solvent treatment, or heat. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and combinations thereof. Typical polymeric fibers are any of nylon, polyester, polyethylene, or polypropylene. Any suitable amount of binder can be used. However, melt blown nonwoven fiber mats do not need binder.

Typically the fibrous mat can have any suitable weight effective to prevent bleed through during manufacturing. Typically, for glass mat the basis weight will be about 18 lbs/1000 ft$^2$ or greater (e.g., about 18-30 lbs/1000 ft$^2$), equivalent to about 88 g/m$^2$ or greater (e.g., about 88-147 g/m$^2$). In one embodiment, the fibrous mat, especially a glass fiber mat, has a basis weight of about 20 lbs/1000 ft$^2$ or greater (e.g., about 20-26 lbs/1000 ft$^2$, or about 23-26 lbs/1000 ft$^2$), equivalent to about 98 g/m$^2$ or greater (e.g., about 98-127 g/m$^2$ or greater).

Typically, for polymer mat the basis weight will be about 8 lbs/1000 ft$^2$ or greater (e.g., about 8-30 lbs/1000 ft$^2$), equivalent to about 39 g/m$^2$ or greater (e.g., about 39-147 g/m$^2$), preferably a basis weight of about 15 lbs/1000 ft$^2$ or greater (e.g., about 15-20 lbs/1000 ft$^2$), equivalent to about 73 g/m$^2$ or greater (e.g., about 73-98 g/m$^2$ or greater).

The mats are preferably each made of a single layer nonwoven fiberglass. In the alternative, preferably they are each made of nonwoven polymer (preferably polyolefin) mat having a multi-layer laminate structure. FIG. 44 is a schematic view of a front mat 44 of nonwoven polymer having a preferred multi-layer structure of three layers 46A, 46B, 46C. This polymer mat 44 has two spun bound layers 46A, 46C of the fibers and a melt blown layer 46B of the fibers sandwiched in-between the spun bound layers 46A, 46C. The melt blown layer provides sufficient impermeability to not let fiber-slurry mixture of the invention seep through even when the fiber-slurry mixture of the invention is vibrated and/or goes under forming plates on the production line.

The nonwoven fiber mats applied to the panel surfaces provide a smooth surface to the finish product and also help with the stacking of the fiber reinforced concrete panels during manufacturing. Rather than having to stack the panels in a rack separately during curing, if the panels are sufficiently set, the wrapped panels can be put directly on one another while curing. Casting fiber reinforced concrete panels edges in a nonwoven fiber mat will ease edge formation and clean up. The panel cast with a back, sides and front made of the sufficiently impermeable mat will have the benefit of a better surface, easier clean-up, and simplified board stacking (during manufacturing). This process will also yield an FRC panel that requires little to no surface finishing. The use of nonwoven glass mat has the advantage of a better bond over nonwoven polymer mats. The use of nonwoven polymer mats has the advantage of better alkali resistance over the nonwoven glass mats.

EXAMPLES

Example 1—Data from Plant Trials and Pilot Plant Trial

Production Trial 1 using electrical vibration motor of Type 1 with controller at various vibration settings and gap between the metal plate and the forming surface. Vibrating Plate Mounting Angle with forming surface=20 degrees (approximately). A Type 1 vibrator refers to a DC powered and regulated motor for generating desired vibration characteristics. Type 1 vibrator assembly includes a Lithium iron Phosphate battery pack (36 V and 10 Ampere-Hour capacity), a control box, a throttle assembly to regulate vibration intensity and a DC motor with a gear box and rotating eccentric weight(s). TABLE 1 shows the experimental conditions.

Figure 11:
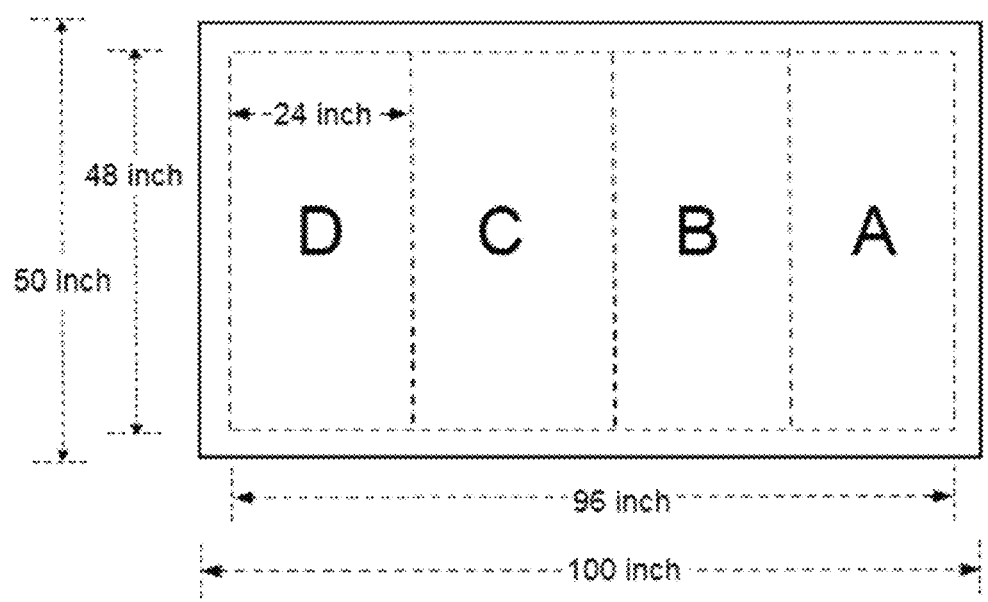
FIG. 11 schematically shows formed sample panels of an example cut into four pieces upon curing.

The vibrating plate and motor were installed on the production line using the mounting frame as earlier described. The gap between the forming surface and vibrating plate was set and measured using the gauge blocks and the vibration settings adjusted with throttle assembly as per the trial conditions. The vibrating plate was engaged after stable production conditions were obtained, at desired experimental settings. Sample panels produced with the vibrating plate invention were marked and collected for curing. Similarly, samples at other experimental conditions as in Table 1 were also marked and collected for curing. The regular vibrating plates remained engaged or were disengaged as per the experimental conditions and sample panels collected accordingly. Upon curing, the formed sample panels were cut into four pieces A, B, C and D as schematically seen in FIG. 11, piece A having formed before piece D and thickness measured at an interval of 1 inch across all the edges of the pieces. FIG. 11 shows dimensions in inches. FIG. 11 is a cut diagram for sample panels for experimental conditions. Thickness measurements were made along the edges of these pieces and integrated to estimate standard deviation in machine and cross machine directions. Thickness data measurements obtained along the forming direction (along the length of the panel on the longer edge) was used to estimate standard deviation of thickness in machine direction. Thickness data measurements obtained along the direction perpendicular to the forming direction (along the width of the panel on the shorter edge) was used to estimate standard deviation of thickness in cross-machine direction. Similarly, difference between maximum and minimum thickness of panels in each direction was estimated.

TABLE 1

Experimental Conditions with electrical vibration motor of Type 1

| Conditions | Regular Plate Gap Inches | Regular Plate | Current Invention | Vibration Setting Intensity | Gap inches |
|---|---|---|---|---|---|
| VS1 #1 | 0.75 | Y | Y | Low | 0.75 |
| VS1 #2 | 0.75 | N | Y | Low | 0.75 |
| VS1 #3 | 0.75 | N | Y | Low | 0.75 |
| VS1 #4 | 0.75 | N | Y | Low | 0.724 |
| VS1 #5 | 0.75 | N | Y | Low | 0.701 |
| VS1 #6 | 0.75 | Y | Y | Low | 0.701 |
| VS1 #7 | 0.75 | Y | Y | Low | 0.701 |
| VS2 #1 | 0.75 | N | Y | Medium | 0.75 |
| Control #1 | 0.75 | Y | N | — | 0.75 |
| Control #2 | 0.75 | Y | N | — | 0.75 |

Figure 11A:
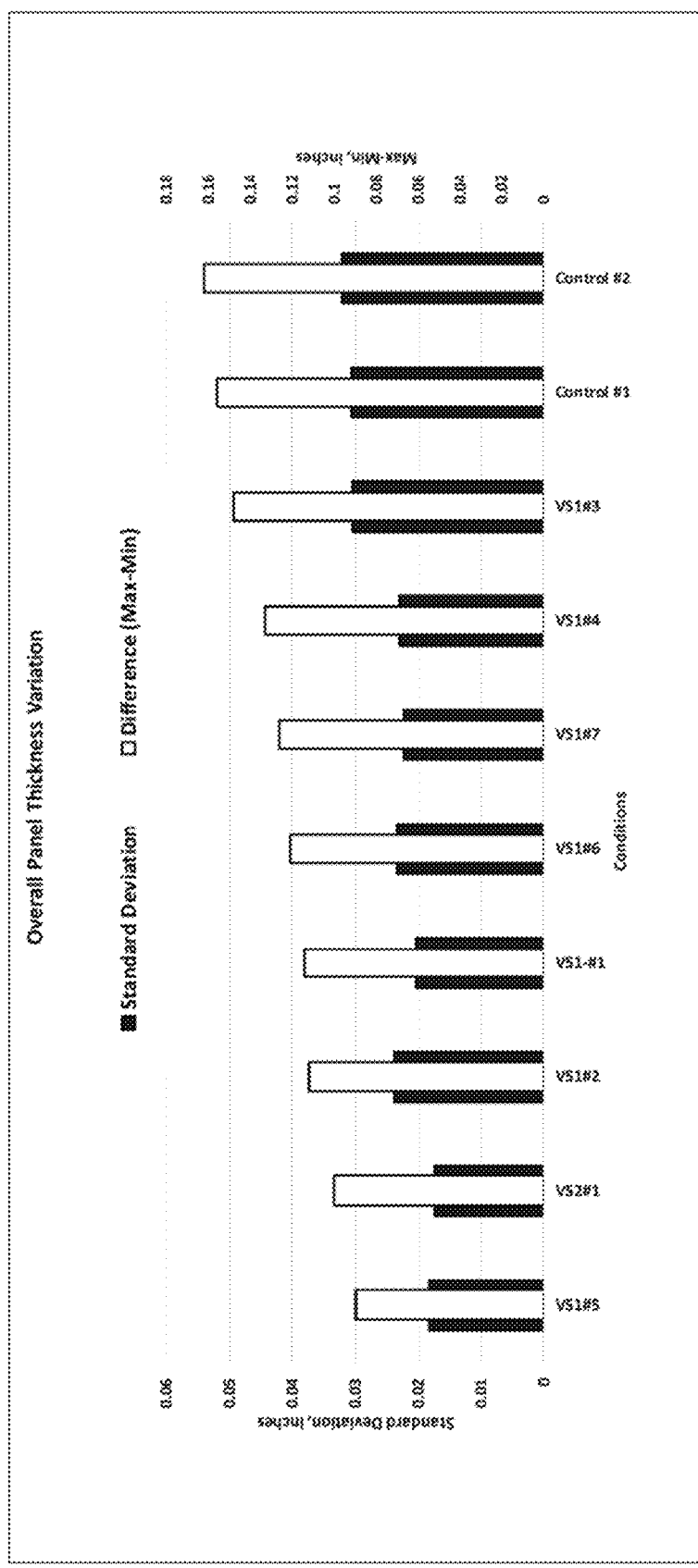
FIG. 11A shows standard deviation in inches and difference of maximum and minimum thickness in inches of formed panels at different experimental conditions in samples measured in cross machine direction with and without the angled plate thickness control device of the present invention. Control #1 and #2 are experimental conditions without the present invention for an example of the present specification.

FIG. 11A shows standard deviation in inches and difference of maximum and minimum thickness in inches of formed panels at different experimental conditions of TABLE 1. Control #1 and Control #2 are experimental conditions without the angled plate thickness control device of the present invention.

Figure 12:
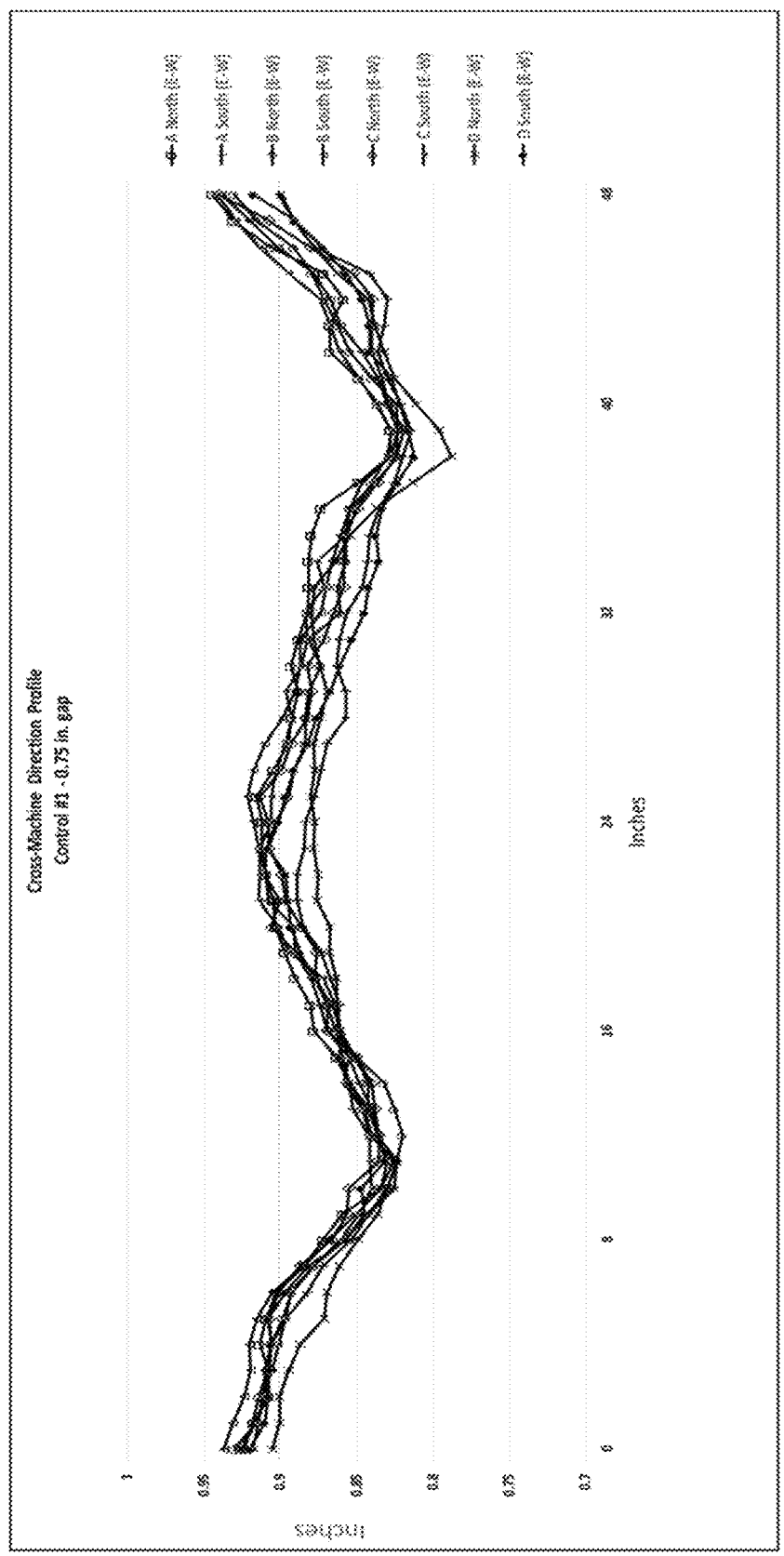
FIG. 12 shows cross-section thickness profile in inches of a formed cementitious panel in the cross-machine direction without use of the angled plate thickness control device of the present invention.

FIG. 12 shows a cross-section thickness profile in inches of a formed cementitious panel from FIG. 11 in the cross-machine direction without use of the angled plate thickness control device of the present invention.

Figure 13:
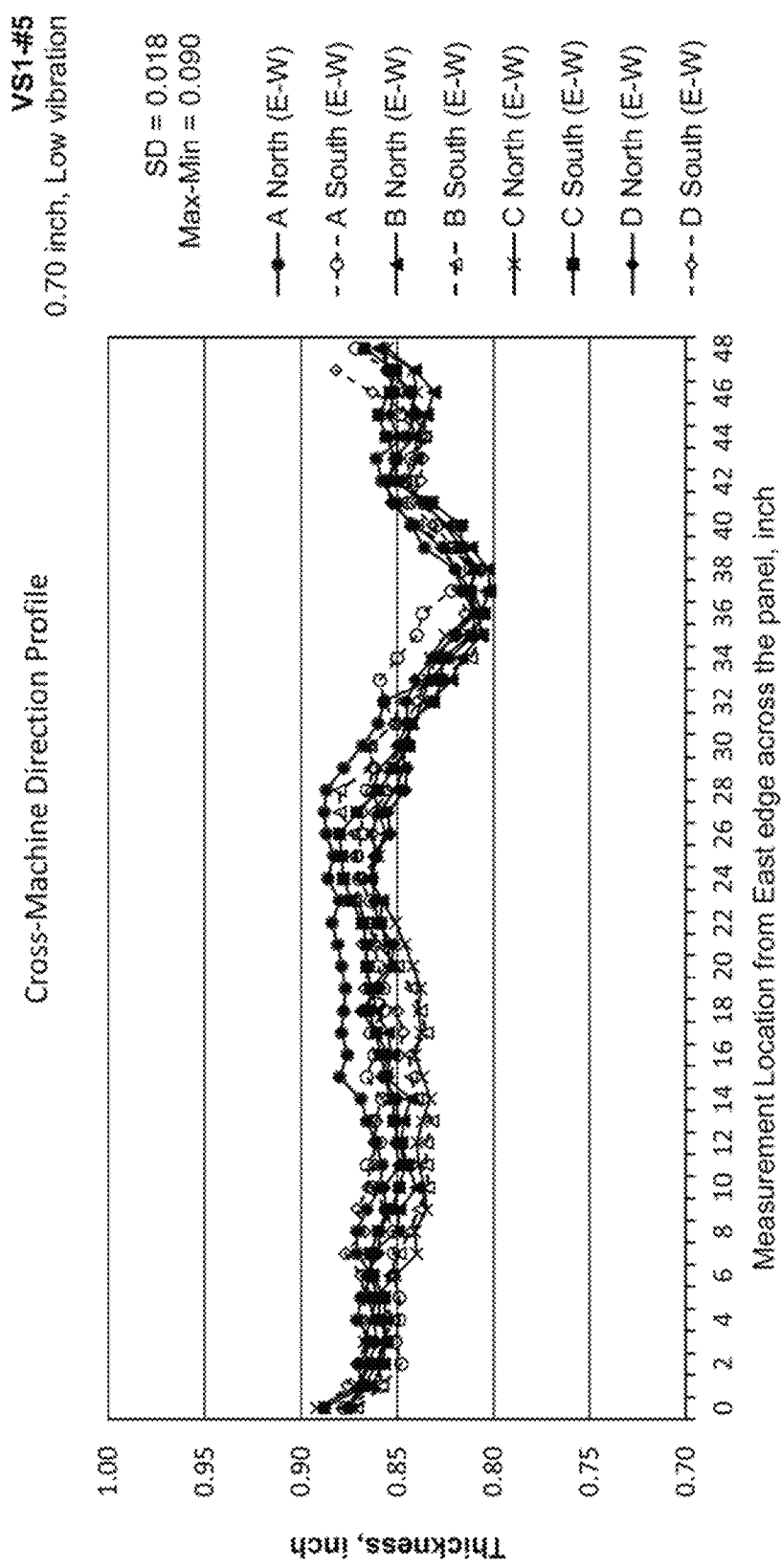
FIG. 13 shows cross-section thickness profile in inches of a formed cementitious panel in the cross-machine direction using the angled plate thickness control device of the present invention.

FIG. 13 shows a cross-section thickness profile in inches of a formed cementitious panel from FIG. 11 in the cross-machine direction using the angled plate thickness control device of the present invention.

Example 2—Data from Plant Trials and Pilot Plant Trial Testing Angled Plate Thickness Control Device Production Trial 2 using electrical vibration motor of Type 2 with controller at various vibration settings and gap between the metal plate and the forming surface. The Vibrating angled plate mounting angle with the forming surface of the fiber laden slurry was 20 degrees (approximately). A Type 2 vibrator refers to AC powered and regulated motor for generating desired vibration characteristics. Type 2 vibrator assembly included an AC powered electrical control box (110-120 V and 1.3 Ampere) with a rotating knob/dial to regulate vibration intensity and a motor with a gear box and rotating eccentric weight(s). TABLE 2 shows the experimental conditions.

The vibrating plate and motor were installed on the production line using the mounting frame as earlier described. The gap between the forming surface and vibrating plate was set and measured using the gauge blocks and the vibration settings adjusted with rotating knob/dial on the electrical control box as per the trial conditions. The vibrating plate was engaged after stable production conditions were obtained, at desired experimental settings. Sample panels produced with the vibrating plate invention were marked and collected for curing. Similarly, samples at other experimental conditions as in Table 2 were also marked and collected for curing. The regular vibrating plates remained engaged or were disengaged as per the experimental conditions and sample panels collected accordingly. Upon curing, the formed sample panels were cut into eight pieces A1, A2, B1, B2, C1, C2, D1, and D2 as in FIG. 11B, piece A1 & A2 having formed before piece D1 & D2 and thickness measured at an interval of 1 inch across all the edges of the pieces. FIG. 11B is a cut diagram for sample panels for experimental conditions. Thickness measurements were made along the edges of these pieces and integrated to estimate standard deviation in machine and cross machine directions. Thickness data measurements obtained along the forming direction (along the length of the panel on the longer edge) was used to estimate standard deviation of thickness in machine direction. Thickness data measurements obtained along the direction perpendicular to the forming direction (along the width of the panel on the shorter edge) was used to estimate standard deviation of thickness in cross-machine direction. Similarly, difference between maximum and minimum thickness of panels in each direction was estimated.

TABLE 2

Experimental Conditions with electrical vibration motor of Type 2

| Panel # | Conditions | Regular Plate | | Current Invention | | |
|---|---|---|---|---|---|---|
| | | Gap, Inches | In Use, Y/N | Gap, Inches | In Use, Y/N | Vibration Setting, % |
| 1 | Control (SP5) −1 | 0.85 | Y | — | N | — |
| 2 | Control (SP5) −1 | 0.85 | Y | — | N | — |
| 3 | NoSP5 | — | N | — | N | — |

TABLE 2-continued

Experimental Conditions with electrical vibration motor of Type 2

| | | Regular Plate | | Current Invention | | |
|---|---|---|---|---|---|---|
| Panel # | Conditions | Gap, Inches | In Use, Y/N | Gap, Inches | In Use, Y/N | Vibration Setting, % |
| | MS (50%, 0.7) + | | | | | |
| 4 | SP5 | 0.85 | Y | 0.70 | Y | 50 |
| 5 | MS(50%, 0.7) | 0.85 | N | 0.70 | Y | 50 |
| 6 | MS(50%, 0.7) | 0.85 | N | 0.70 | Y | 50 |
| 7 | MS(50%, 0.68) | 0.85 | N | 0.68 | Y | 50 |
| 8 | MS(50%, 0.68) | 0.85 | N | 0.68 | Y | 50 |
| 9 | MS(70%, 0.68) | 0.85 | N | 0.68 | Y | 70 |
| 10 | MS(50%, 0.68) | 0.85 | N | 0.68 | Y | 50 |
| | MS (50%, 0.68) + | | | | | |
| 11 | SP5 | 0.85 | Y | 0.68 | Y | 50 |
| 12 | Control (SP5) −2 | 0.85 | Y | — | N | — |
| 13 | Control (SP5) −2 | 0.85 | Y | — | N | — |

Figure 14:
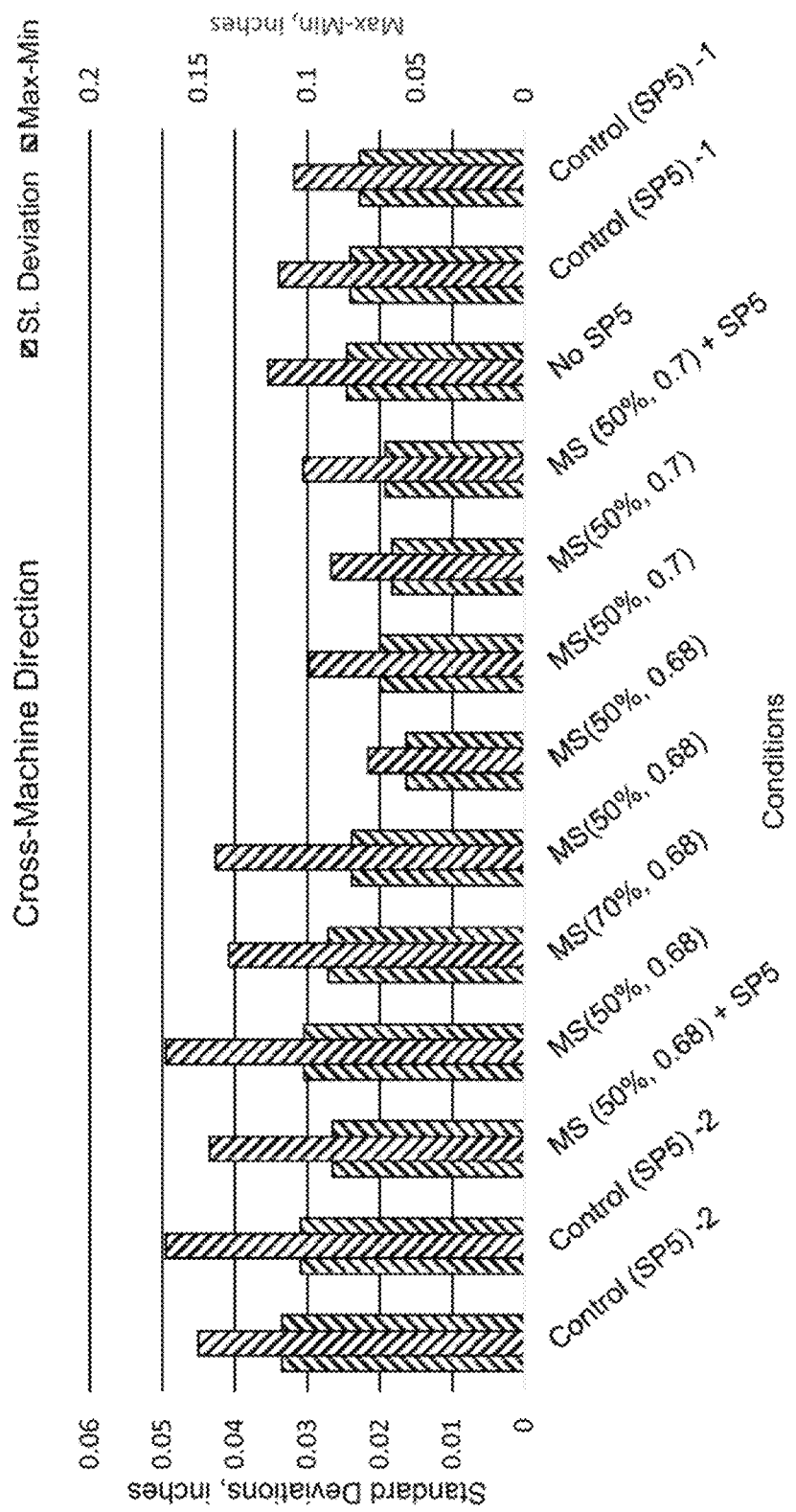
FIG. 14 has information about panel thickness measurements in inches across the cross machine direction to show standard deviation and difference of maximum and minimum thickness of formed panels at different experimental conditions in samples measured in cross machine direction with and without the angled plate thickness control device of the present invention, wherein Control #1 and #2 are experimental conditions without the angled plate thickness control device of the present invention.
Figure 15:
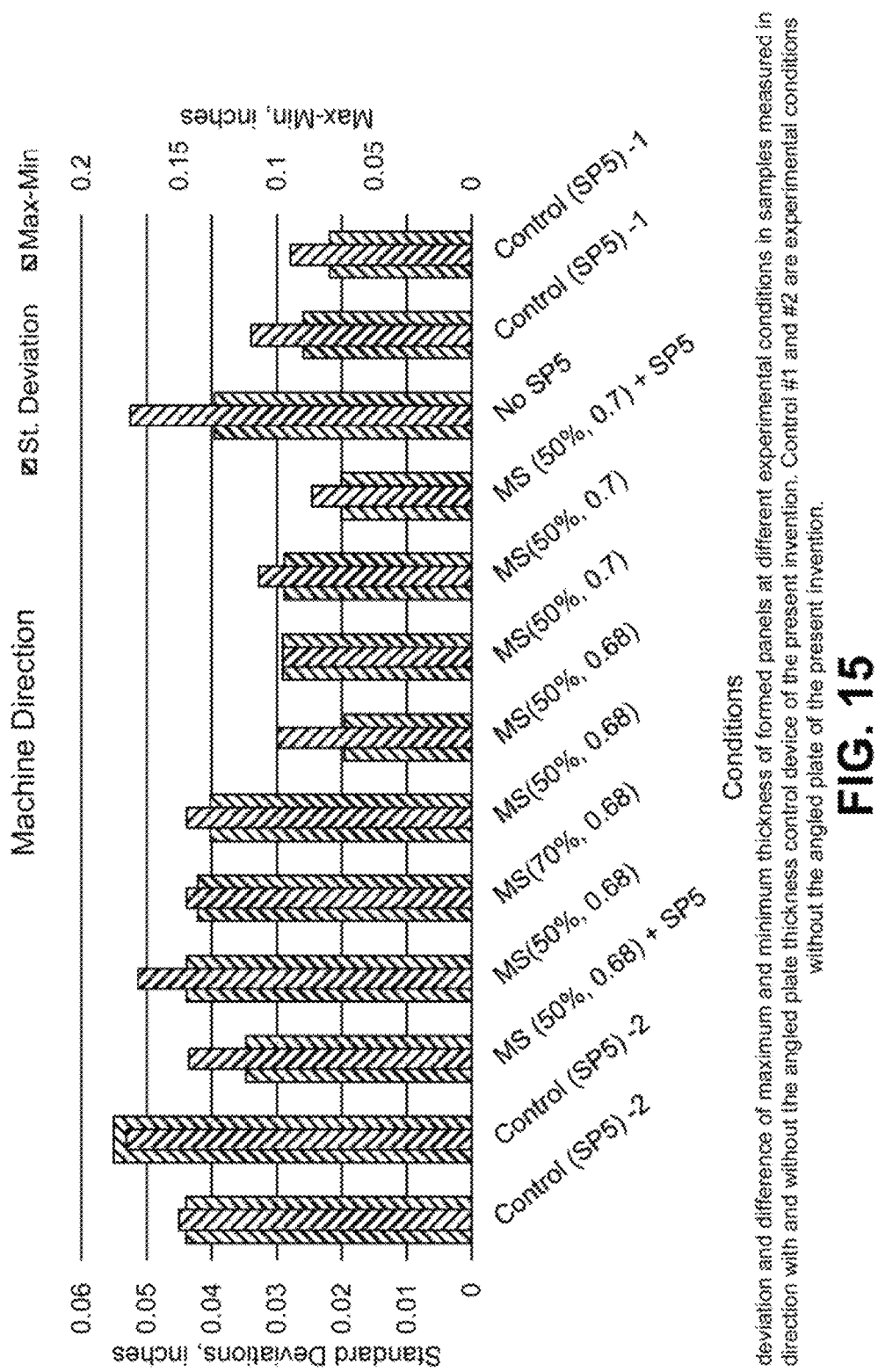
FIG. 15 has information about panel thickness measurements in inches along the machine direction to show standard deviation and difference of maximum and minimum thickness of formed panels at different experimental conditions of Table 1 for an example of the present specification with and without the angled plate thickness control device of the present invention, wherein Control #1 and Control #2 are experimental conditions without the angled plate thickness control device of the present invention.

FIG. 14 shows standard deviation in inches and difference of maximum and minimum thickness of formed panels at different experimental conditions of TABLE 2. Control #1 and Control #2 are experimental conditions without the angled plate thickness control device of the present invention. FIG. 15 shows standard deviation and difference of maximum and minimum thickness in inches of formed panels at different experimental conditions of TABLE 2. Control #1 and Control #2 are experimental conditions without the angled plate thickness control device of the present invention. FIG. 14 has information about panel thickness measurements across Cross Machine Direction (XMD) while FIG. 15 has information about panel thickness measurements along Machine Direction (MD). The purpose is to demonstrate variation reduction in both XMD and MD.

The units in FIGS. 11-17 are inches. The tested panel was 4 foot by 8 foot. Thus, measurements in the cross-machine direction were across 48 inches and measurements in the machine direction were across 96 inches.

Figure 16:
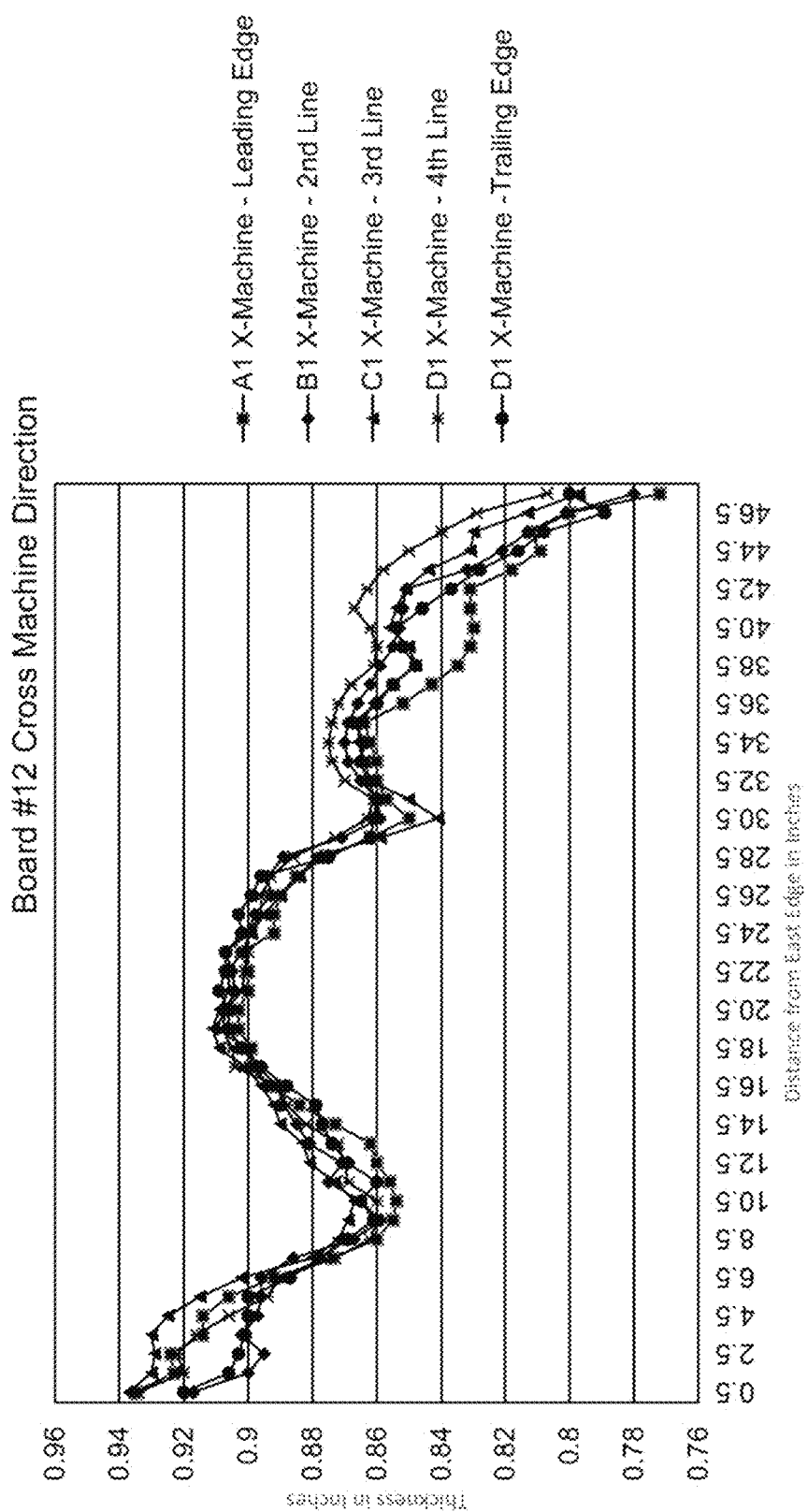
FIG. 16 shows cross-section thickness profile in inches in the cross machine direction of a formed cementitious panel without use of the angled plate thickness control device of the present invention.

FIG. 16 shows a cross-section thickness profile in inches of a formed cementitious panels without use of the angled plate thickness control device of the present invention.

Figure 17:
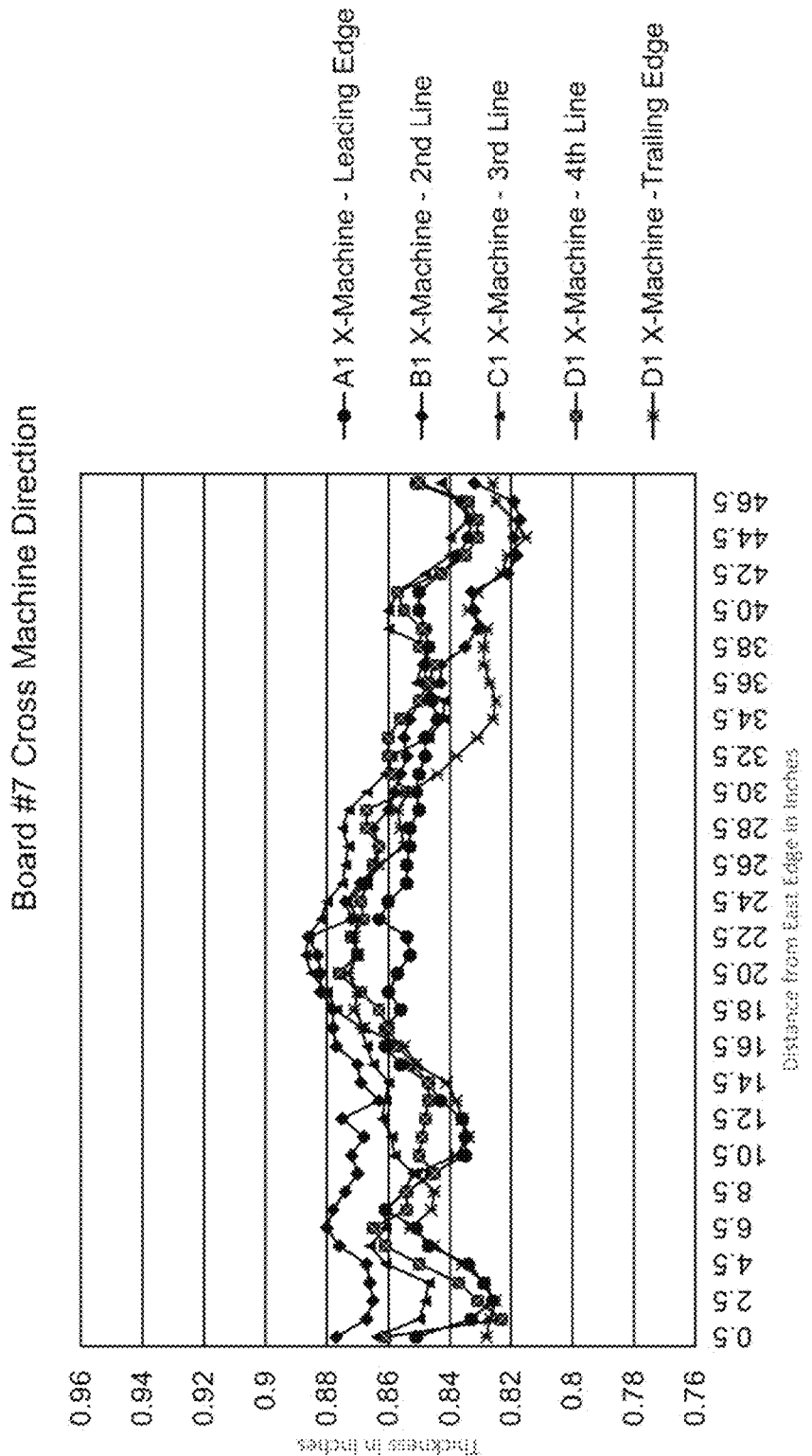
FIG. 17 shows cross-section profile of a formed cementitious panel using the angled plate thickness control device of the present invention for an example #R3 of the present specification of a control sample, made in an FRC panel production line with a normal method with no thickness control device comprising the fixed horizontal forming plate.

FIG. 17 shows a cross-section thickness profile in inches of a formed cementitious panels using the angled plate thickness control device of the present invention.

TABLES 3A and 3B provides a comparison of forming thickness variation in inches for cementitious panels formed with and without use of the angled plate thickness control device of the present invention.

TABLE 3A

| | Production Trial 1 | | | | | |
|---|---|---|---|---|---|---|
| | Control 1 Without Current Invention | | | Control 2 Without Current Invention | | |
| | XMD | MD | Overall | XMD | MD | Overall |
| Max-Min | 0.156 | 0.087 | 0.156 | 0.162 | 0.142 | 0.195 |
| Standard Deviation | 0.031 | 0.018 | 0.030 | 0.032 | 0.024 | 0.035 |
| Mean | 0.872 | 0.898 | 0.881 | 0.861 | 0.902 | 0.875 |

TABLE 3A-continued

| | Production Trial 2 | | | | | |
|---|---|---|---|---|---|---|
| | Control 1 (average) Without Current Invention | | | Control 2 (average) Without Current Invention | | |
| | XMD | MD | Overall | XMD | MD | Overall |
| Max-Min | 0.110 | 0.103 | 0.116 | 0.158 | 0.164 | 0.168 |
| Standard Deviation | 0.023 | 0.024 | 0.024 | 0.032 | 0.049 | 0.042 |
| Mean | 0.885 | 0.897 | 0.891 | 0.879 | 0.884 | 0.882 |

TABLE 3B

| | Production Trial 1 With Motor Type 1 Low Vibration, 0.70 inch Gap | | | Production Trial 2 With Motor Type 2 50% setting, 0.70 inch Gap (average) | | |
|---|---|---|---|---|---|---|
| | XMD | MD | Overall | XMD | MD | Overall |
| Max-Min | 0.090 | 0.093 | 0.110 | 0.094 | 0.103 | 0.108 |
| Standard Deviation | 0.018 | 0.017 | 0.018 | 0.019 | 0.029 | 0.025 |
| Mean | 0.851 | 0.860 | 0.854 | 0.869 | 0.875 | 0.873 |

Example 3—Data when Applying a Facer and Employing the Thickness Control Device Comprising the Fixed Horizontal Forming Plate The following TABLE 4 shows thickness data in inches when applying a facer and employing a horizontal forming plate at a fixed height above the moving carrier web of the FRC single layer panel production line. The data was based on pilot scale production using a pilot line.

Board composition was consistent with that described above for the single layer process. The boards were made using a gypsum-cement binder composition. The cementitious binder comprised a composite blend of calcium sulfate alpha hemihydrate, portland cement, silica fume, and hydrated lime added in the following proportions 62:25:12:1, respectively. Expanded perlite was used as a lightweight filler. The perlite particles were chemically coated with a silicone-based hydrophobic chemical coating to reduce particle water absorption. The perlite to cementitious binder weight ratio was 0.09. Water and chemical processing aids were added in sufficient quantities to obtain an aqueous mixture of workable consistency required for the process. Alkali-resistant glass fibers were used as structural reinforcement in the panel.

The pilot scale production line comprises equipment to mix a cement blend, water, and glass fiber, as well as equipment to deliver the mixture to a forming area over a belt conveyor, as shown in FIG. 10. A ribbon of board is thus formed on the conveyor. A facer and top forming plate were used to control thickness of the formed board, as described in this invention. In this example, an experimental horizontal forming plate was constructed of stiffened plywood, and height adjustment was accomplished with jack screws. The experimental mounting frame was constructed of extruded aluminum. Although the experimental horizontal forming plate assembly was not industrially robust, formed board thickness results showed surprising improvement versus normal production results.

TABLE 4

|  | Inventive Examples | | | | | Comparative Examples | | | |
| --- | --- | --- | --- | --- | --- | --- | --- | --- | --- |
|  | Panel #1 | Panel #2 | Panel #3 | Panel #4 | Avg. | Panel #C-1 | Panel #C-2 | Panel #C-3 | Panel #C-4 |
| Max Thickness (inches) | 0.585 | 0.584 | 0.564 | 0.554 | 0.563 | 0.995 | 0.932 | 0.944 | 0.933 |
| Minimum Thickness (inches) | 0.522 | 0.509 | 0.500 | 0.469 | 0.500 | 0.792 | 0.758 | 0.788 | 0.771 |
| Range (Max-Min) (inches) | 0.063 | 0.039 | 0.064 | 0.085 | 0.063 | 0.203 | 0.174 | 0.156 | 0.162 |
| Standard Deviation (inches) | 0.015 | 0.008 | 0.009 | 0.014 | 0.012 | 0.300 | 0.028 | 0.301 | 0.032 |

Example 4—Data from Plant Trials Testing the Thickness Control Device Comprising the Fixed Horizontal Forming Plate Data was generated from a trial in a full-scale manufacturing plant.

In the following TABLE 5, Samples indicated with "R" are control samples, made in an FRC panel production line with a normal method with no thickness control device comprising the fixed horizontal forming plate. Samples beginning with "T" are trial samples, made in a production line with the thickness control device comprising the fixed horizontal forming plate of the invention. Each "R" or "T" sample is a 4'×8' panel.

Board composition was consistent with that described above for the single layer process. The boards were made using a gypsum-cement binder composition. The cementitious binder comprised a composite blend of calcium sulfate alpha hemihydrate, portland cement, silica fume, and hydrated lime added in the following proportions 62:25:12:1, respectively. Expanded perlite was used as a lightweight filler. The perlite particles were chemically coated with a silicone-based hydrophobic chemical coating to reduce particle water absorption. The perlite to cementitious binder weight ratio was 0.09. Water and chemical processing aids were added in sufficient quantities to obtain an aqueous mixture of workable consistency required for the process. Alkali-resistant glass fibers were used as structural reinforcement in the panel.

The experimental forming plate system described in Example 3 was removed from the pilot scale line and installed on a production line, similar to FIG. 8. Again, the formed board thickness results showed surprising improvement versus normal production results.

TABLE 5

|  | #R3 | #R4 | #2R1 | T1 | T2 | T4 |
| --- | --- | --- | --- | --- | --- | --- |
| Standard Deviation (inches) | 0.022 | 0.016 | 0.028 | 0.012 | 0.012 | 0.010 |
| Range (inches) |  | 0.101 | 0.092 | 0.131 | 0.057 | 0.061 | 0.050 |

The standard deviation and range are from approximately 500 data points per 4 foot×8 foot panel. Sampling pattern was developed by marking sample lines on a 2 foot×2 foot grid, and individual thickness measurements were located every inch along the grid lines.

The data is also shown graphically by FIGS. 18-29 showing the cross-sectional profiles measured in cross machine direction and the machine direction in a multilayer FRC panel production process. In these figures the solid upper and lower straight lines with no markings for data points are +1-0.03 inches from the actual average thickness of each FRC panel. Data lines in FIGS. 18-29 are the individual thickness measurements, every inch in the machine direction (8 foot), and cross-machine direction (4 foot). Thus, in FIGS. 18-29 the Y-axis is thickness in inches. In the figures for the cross-sectional profiles measured in cross machine direction, the X-axis is each of the 48 inches across the four foot cross-machine direction of the FRC panel. In the figures for the cross-sectional profiles measured in machine direction, the X-axis is each of the 96 inches across the eight foot machine direction of the FRC panel.

Figure 18:
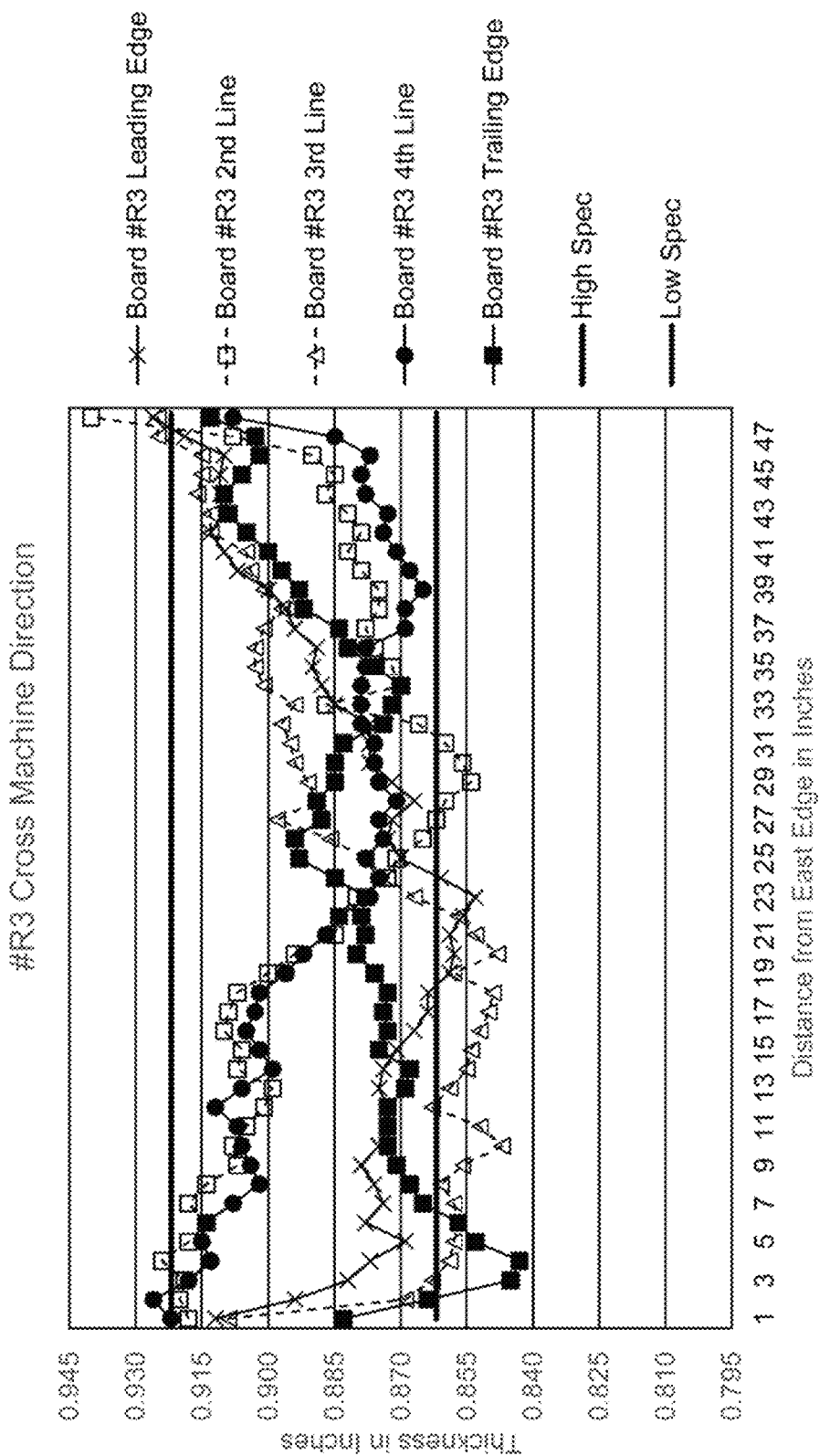
FIG. 18 shows cross-section profile of a formed cementitious panel for an example #R3 of the present specification measured in cross machine direction of a control sample, made in an FRC panel production line with a normal method with no thickness control device comprising the fixed horizontal forming plate.

FIG. 18 shows a cross-sectional profile of a formed cementitious panel for an example #R3 of the present specification measured in cross machine direction of a control sample, made in an FRC panel production line with a normal method with no thickness control device comprising the fixed horizontal forming plate.

Figure 19:
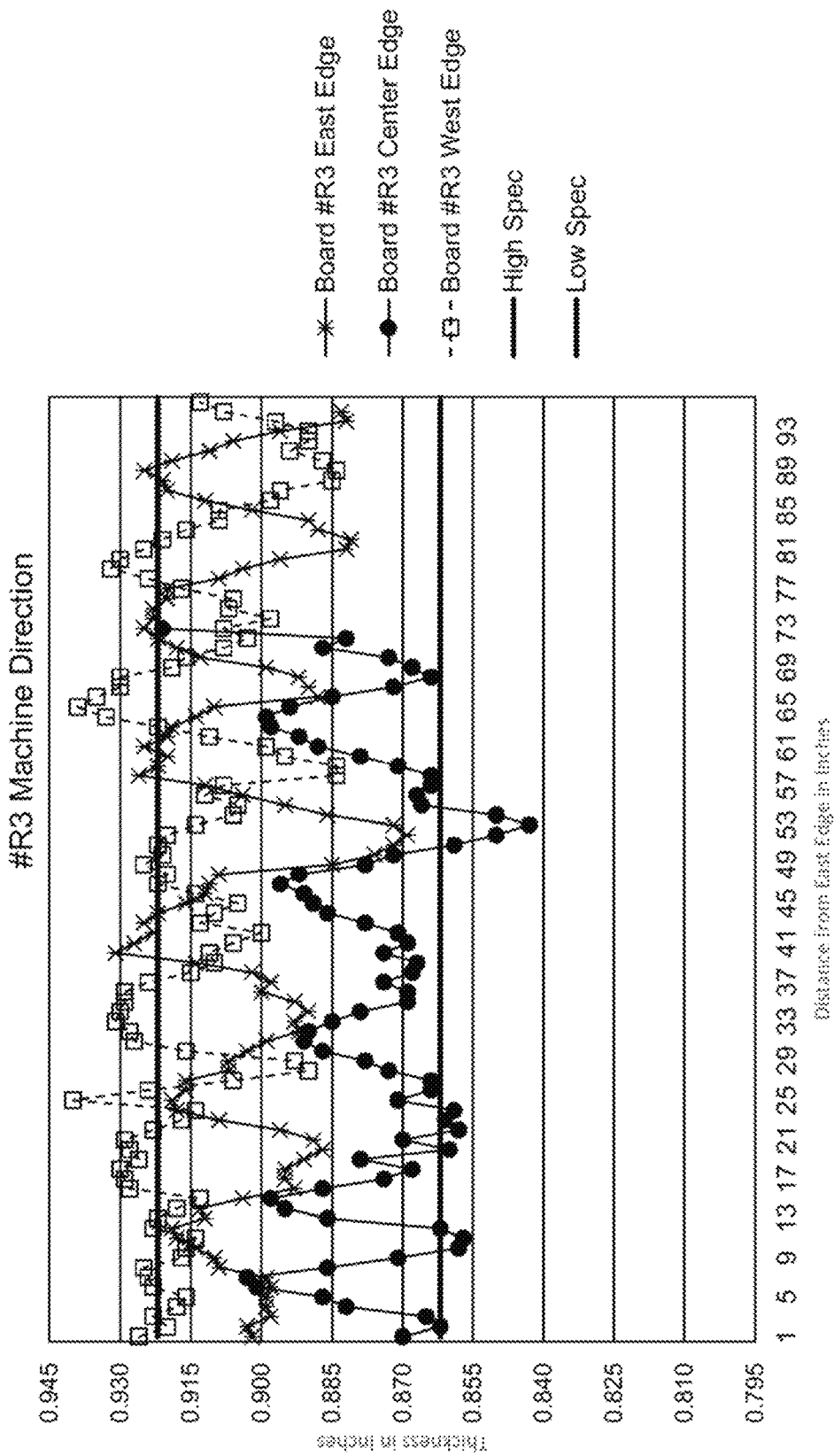
FIG. 19 shows cross-section profile of a formed cementitious panel for an example #R3 of the present specification measured in machine direction of a control sample, made in an FRC panel production line with a normal method with no thickness control device comprising the fixed horizontal forming plate.

FIG. 19 shows a cross-sectional profile of a formed cementitious panel for an example #R3 of the present specification measured in machine direction of a control sample, made in an FRC panel production line with a normal method with no thickness control device comprising the fixed horizontal forming plate.

Figure 20:
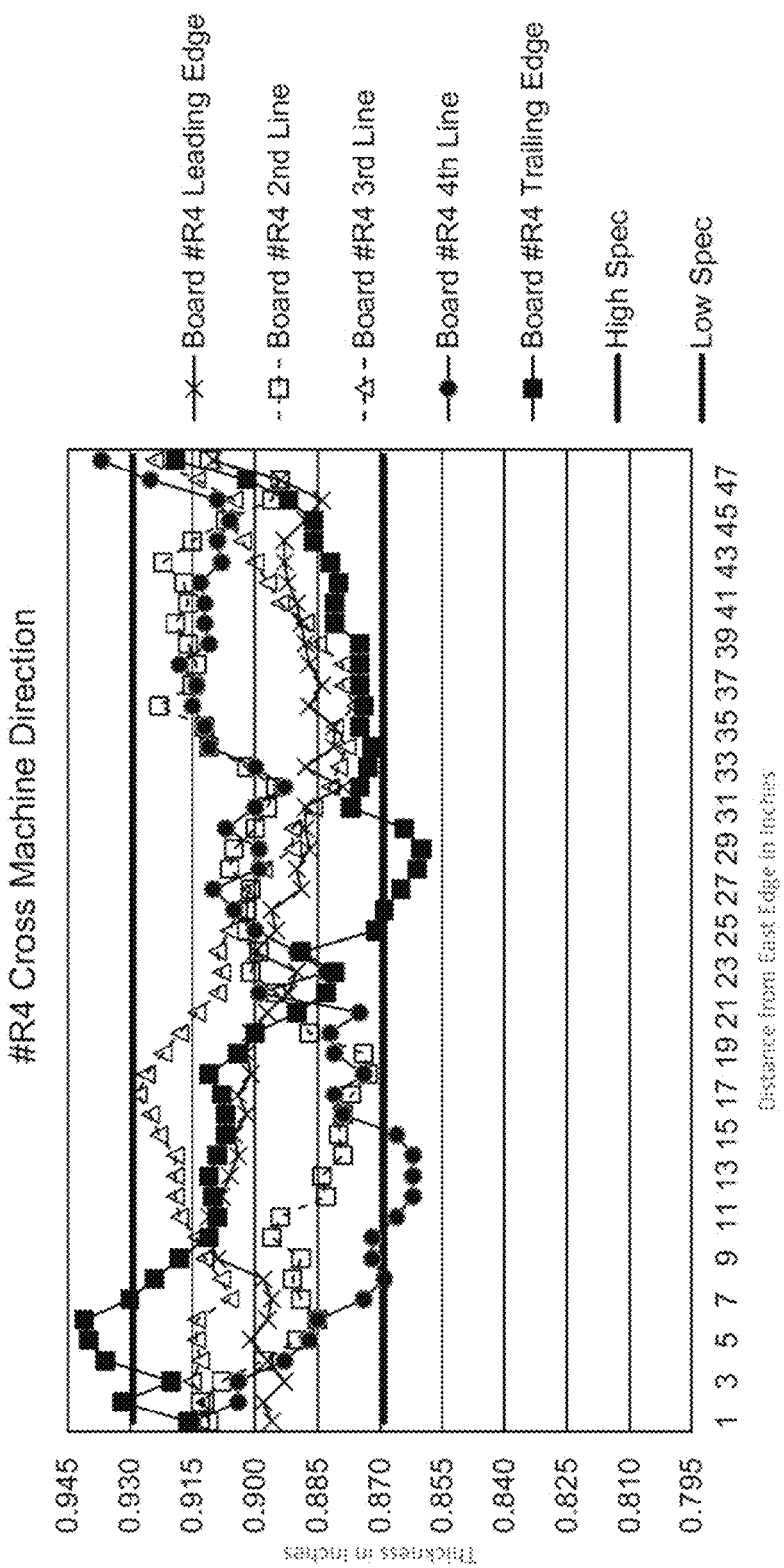
FIG. 20 shows cross-section profile of a formed cementitious panel for an example #R4 of the present specification measured in cross machine direction of a control sample, made in an FRC panel production line with a normal method with no thickness control device comprising the fixed horizontal forming plate.

FIG. 20 shows a cross-sectional profile of a formed cementitious panel for an example #R4 of the present specification measured in cross machine direction of a control sample, made in an FRC panel production line with a normal method with no thickness control device comprising the fixed horizontal forming plate.

Figure 21:
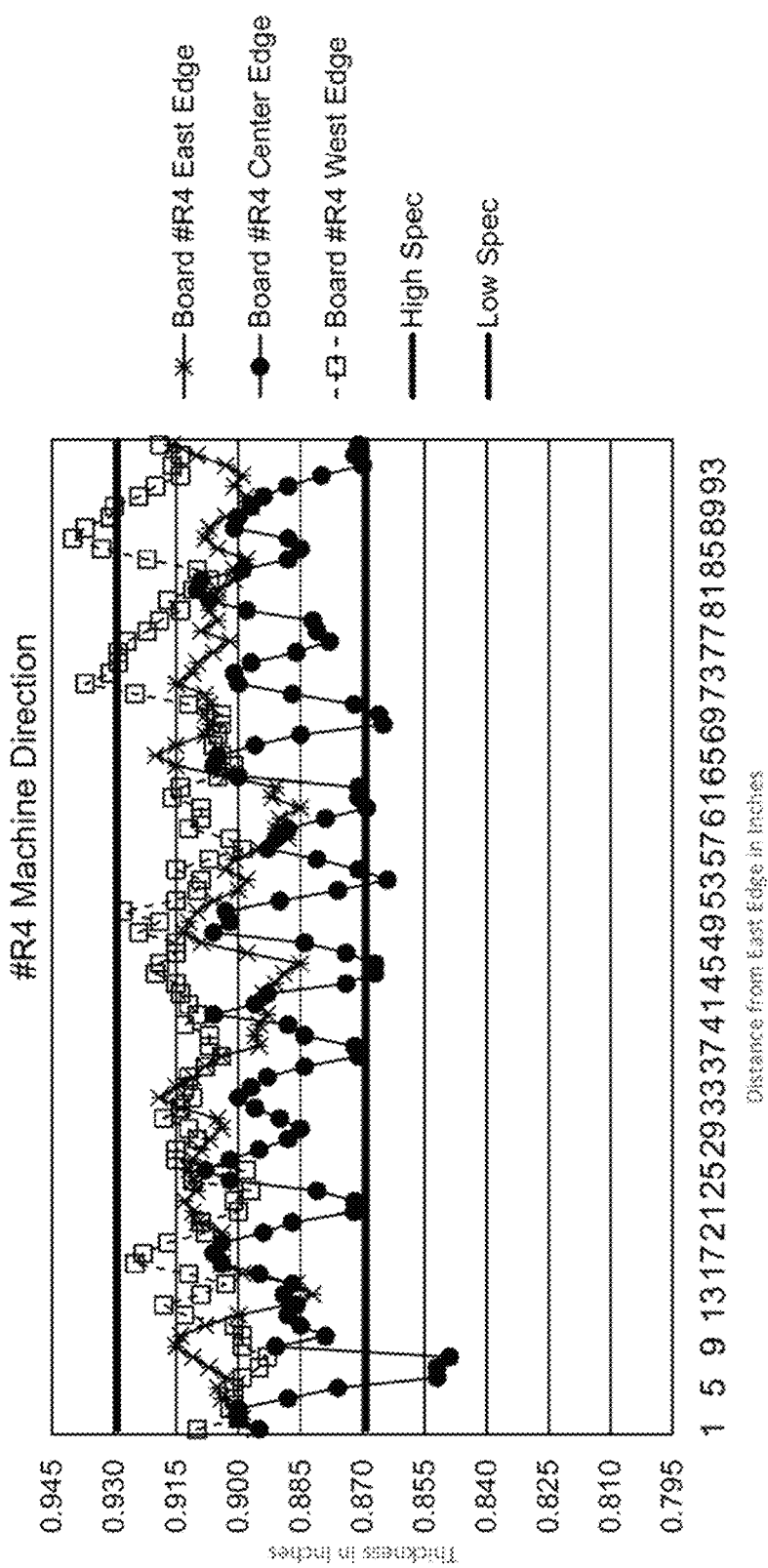
FIG. 21 shows cross-section profile of a formed cementitious panel for an example #R4 of the present specification measured in machine direction of a control sample, made in an FRC panel production line with a normal method with no thickness control device comprising the fixed horizontal forming plate.

FIG. 21 shows a cross-sectional profile of a formed cementitious panel for an example #R4 of the present specification measured in machine direction of a control sample, made in an FRC panel production line with a normal method with no thickness control device comprising the fixed horizontal forming plate.

Figure 22:
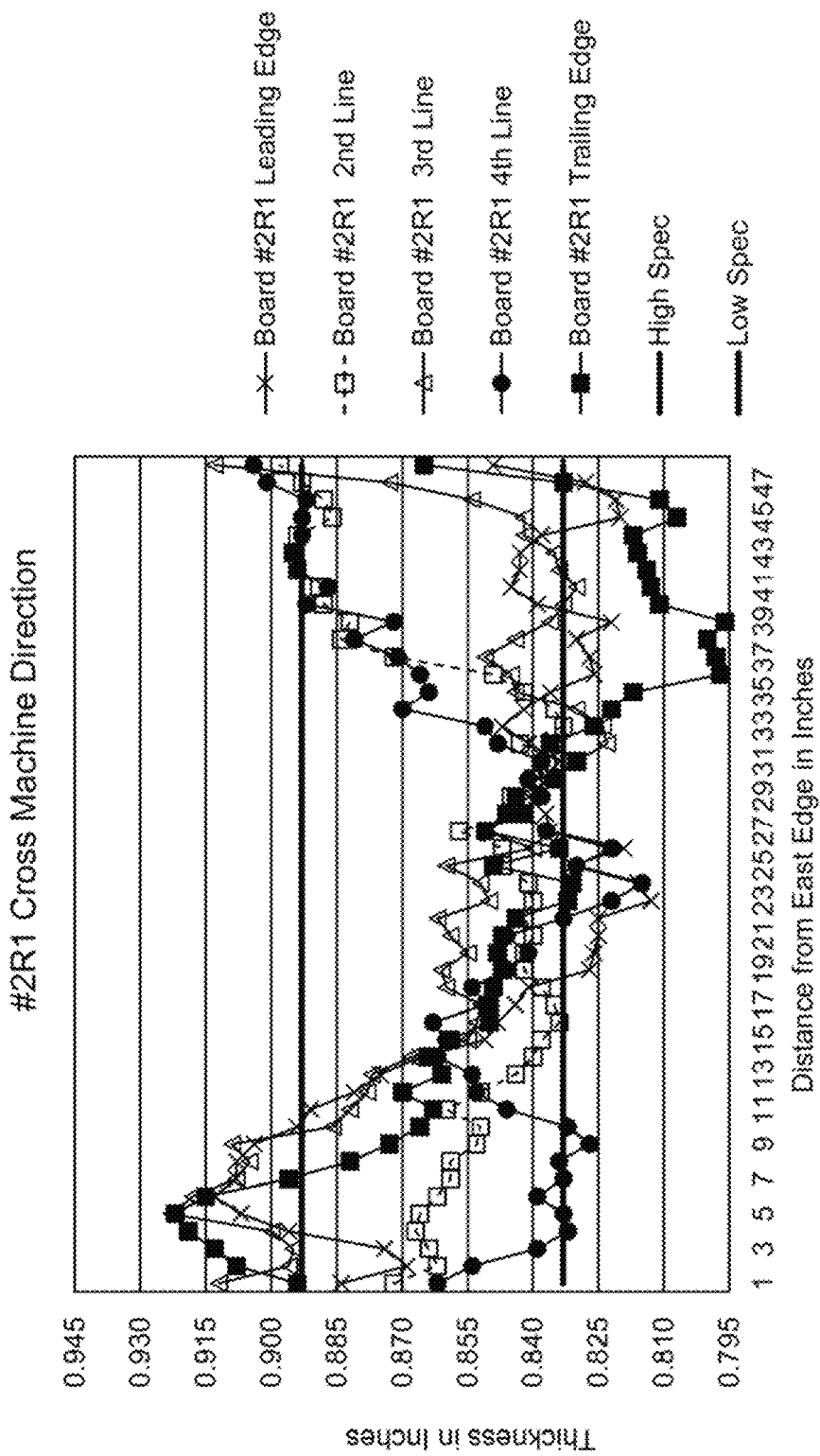
FIG. 22 shows cross-section profile of a formed cementitious panel for an example #R1 of the present specification measured in cross machine direction of a control sample, made in an FRC panel production line with a normal method with no thickness control device comprising the fixed horizontal forming plate.

FIG. 22 shows a cross-sectional profile of a formed cementitious panel for an example #2R1 of the present specification measured in cross machine direction of a control sample, made in an FRC panel production line with a normal method with no thickness control device comprising the fixed horizontal forming plate.

Figure 23:
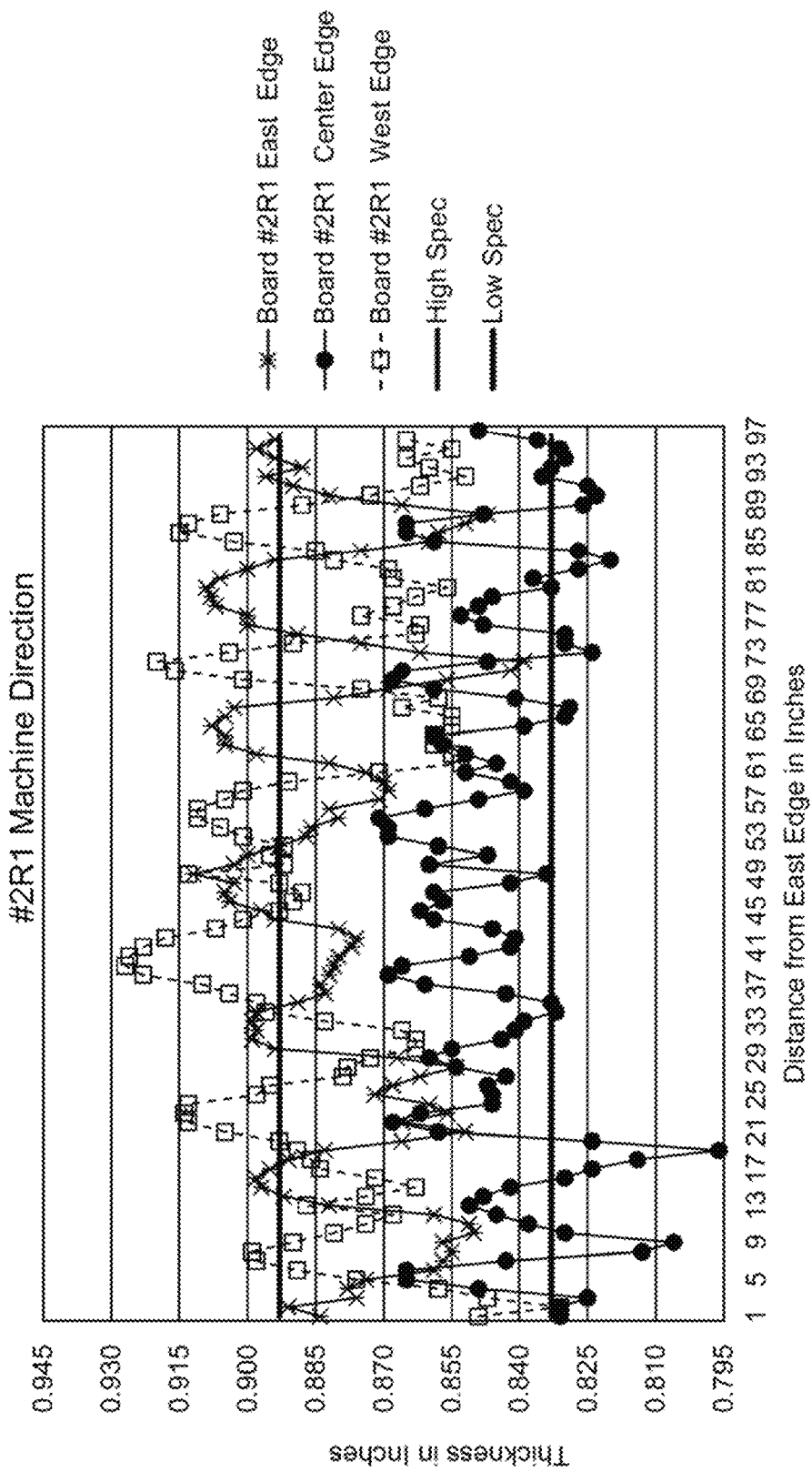
FIG. 23 shows cross-section profile of a formed cementitious panel for an example #R1 of the present specification measured in machine direction of a control sample, made in an FRC panel production line with a normal method with no thickness control device comprising the fixed horizontal forming plate.

FIG. 23 shows a cross-sectional profile of a formed cementitious panel for an example #2R1 of the present specification measured in machine direction of a control sample, made in an FRC panel production line with a normal method with no thickness control device comprising the fixed horizontal forming plate.

Figure 24:
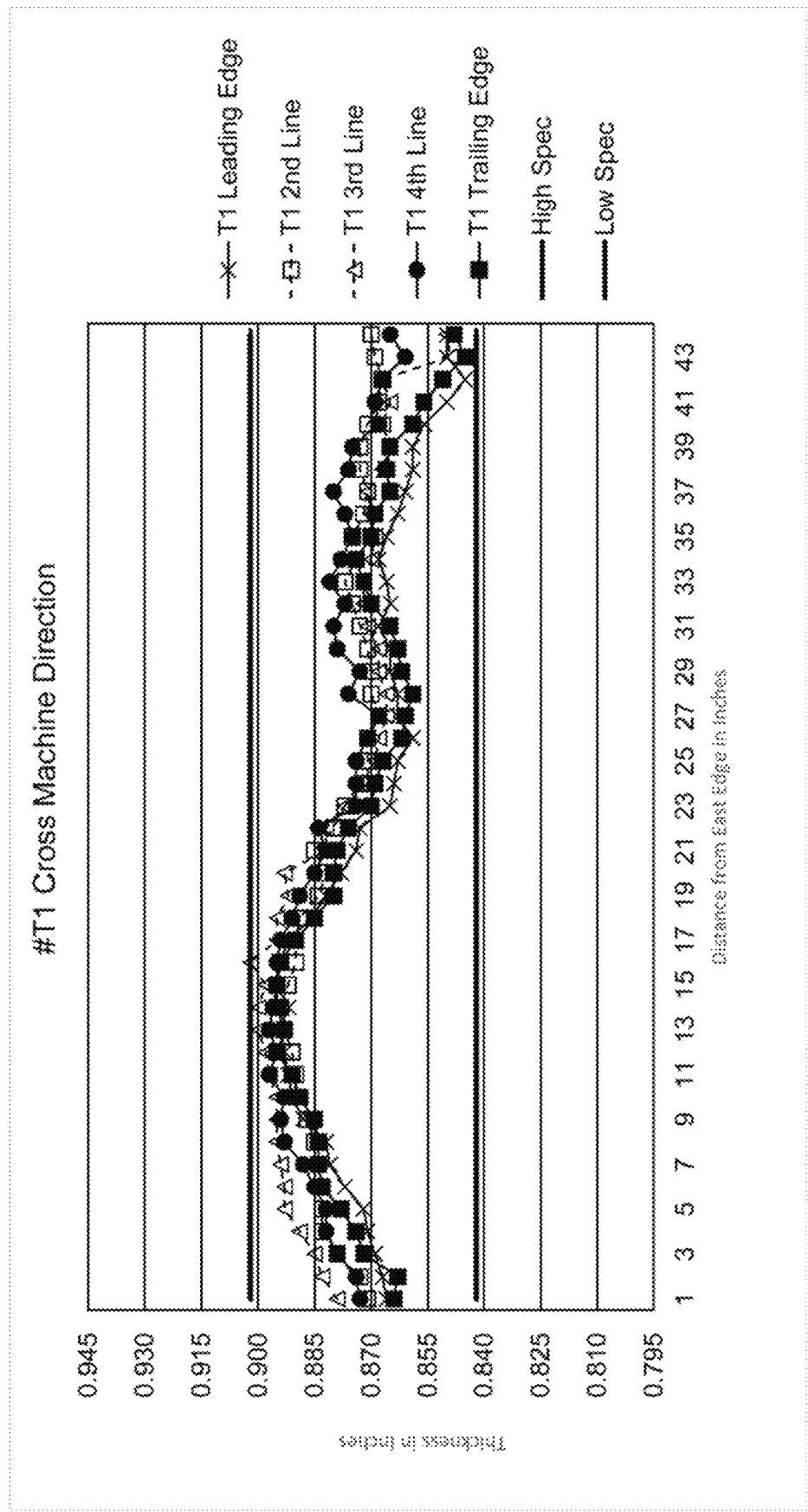
FIG. 24 shows cross-section profile of a formed cementitious panel for an example #T1 of the present specification measured in cross machine direction of a trial samples made in a production line with the thickness control device comprising the fixed horizontal forming plate of the invention.

FIG. 24 shows a cross-sectional profile of a formed cementitious panel for an example #T1 of the present specification measured in cross machine direction of a trial samples made in a production line with the thickness control device comprising the fixed horizontal forming plate of the invention.

Figure 25:
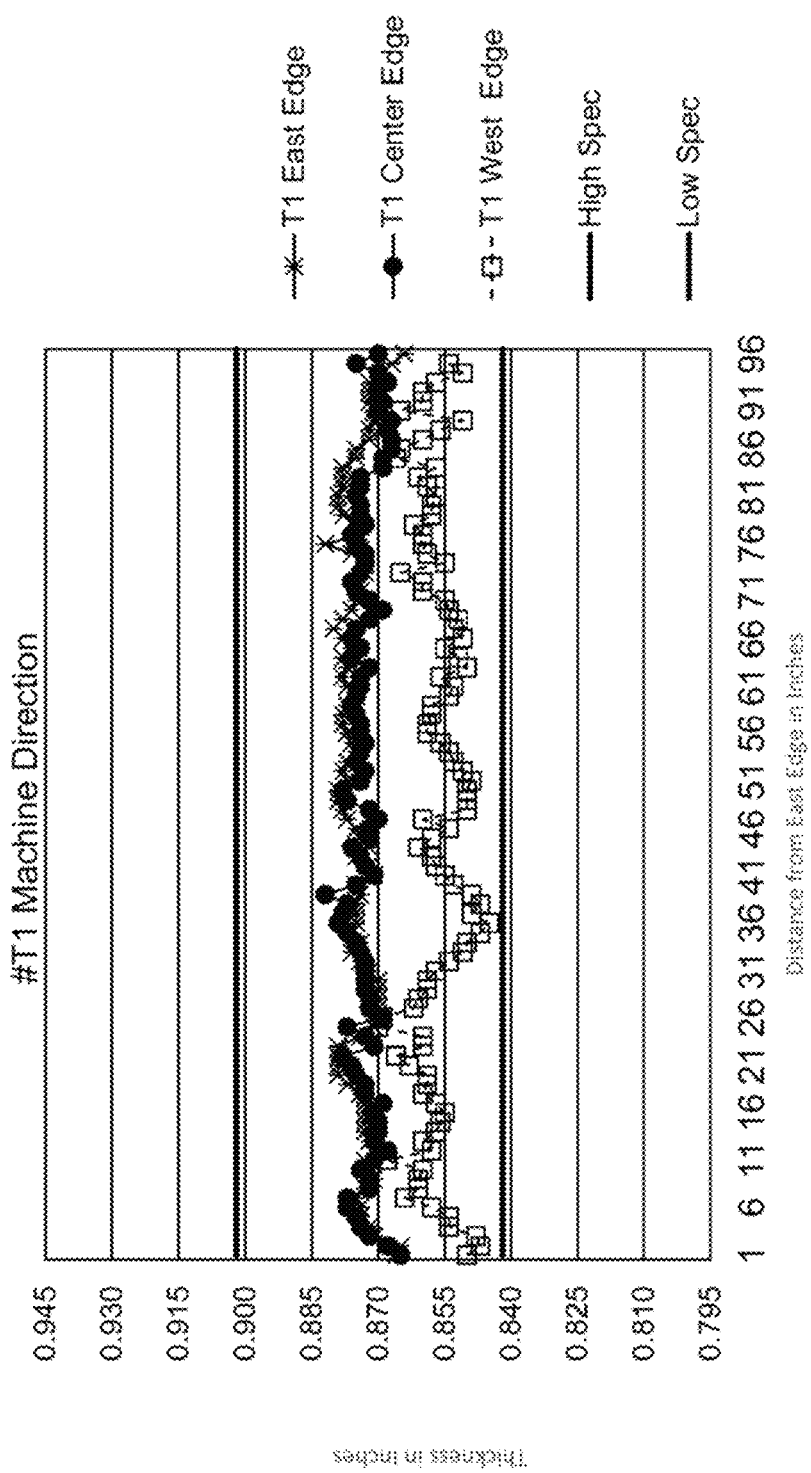
FIG. 25 shows cross-section profile of a formed cementitious panel for an example #T1 of the present specification measured in machine direction of a trial samples made in a production line with the thickness control device comprising the fixed horizontal forming plate of the invention.

FIG. 25 shows a cross-sectional profile of a formed cementitious panel for an example #T1 of the present specification measured in machine direction of a trial samples made in a production line with the thickness control device comprising the fixed horizontal forming plate of the invention.

Figure 26:
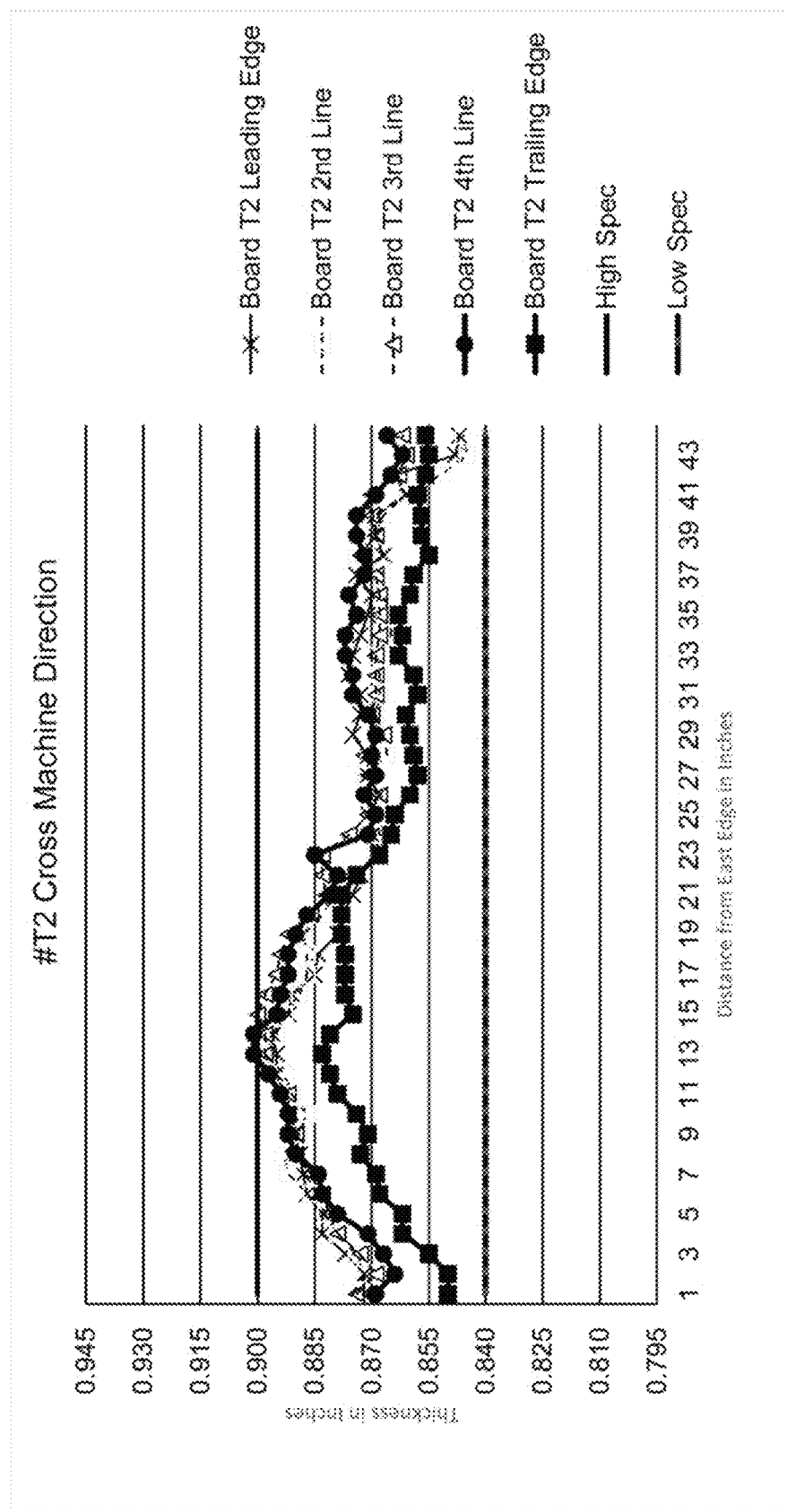
FIG. 26 shows cross-section profile of a formed cementitious panel for an example #T2 of the present specification measured in cross machine direction.

FIG. 26 shows a cross-sectional profile of a formed cementitious panel for an example #T2 of the present specification measured in cross machine direction of a trial samples made in a production line with the thickness control device comprising the fixed horizontal forming plate of the invention.

Figure 27:
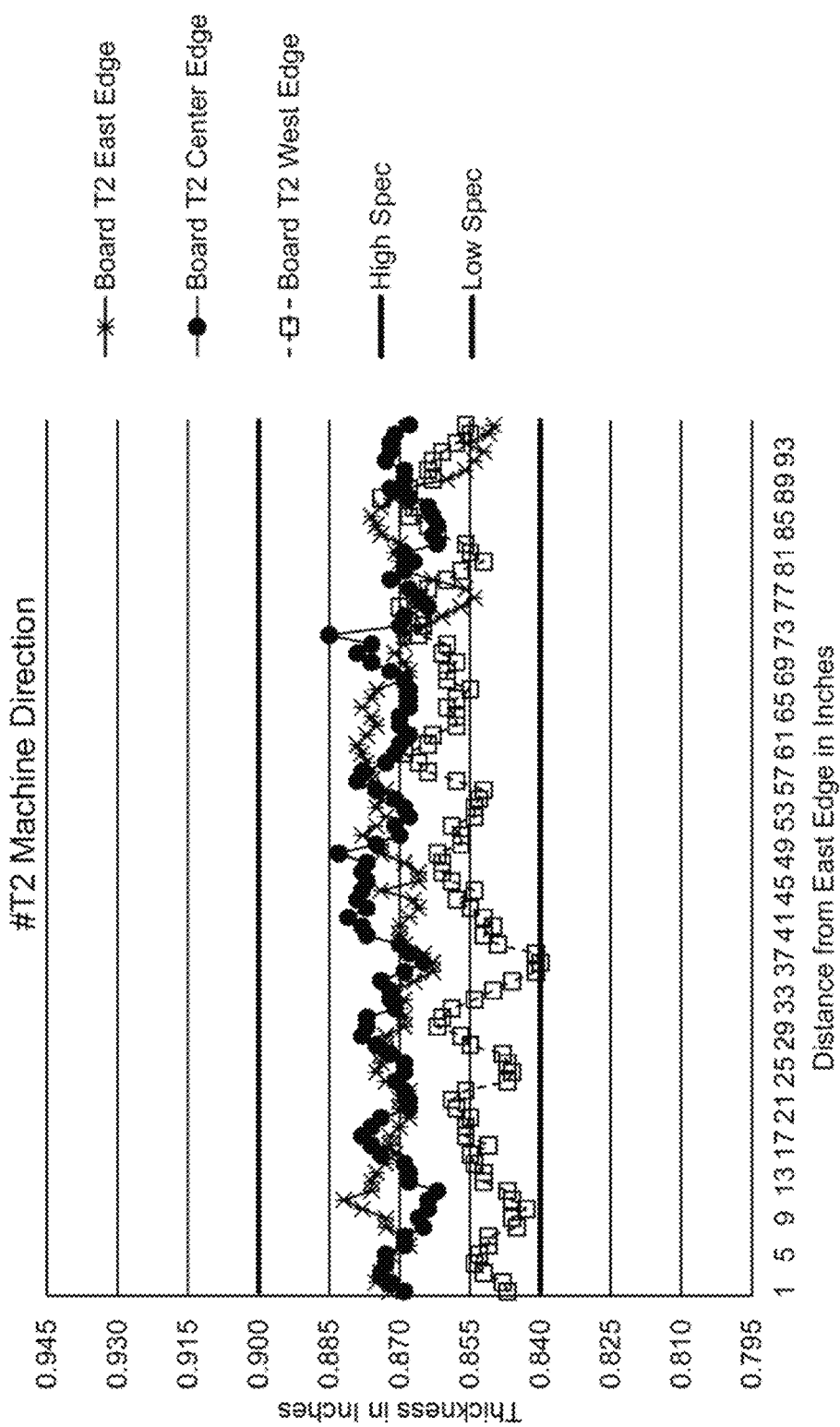
FIG. 27 shows cross-section profile of a formed cementitious panel for an example #T2 of the present specification measured in machine direction of a trial samples made in a production line with the thickness control device comprising the fixed horizontal forming plate of the invention.

FIG. 27 shows a cross-sectional profile of a formed cementitious panel for an example #T2 of the present specification measured in machine direction of a trial samples made in a production line with the thickness control device comprising the fixed horizontal forming plate of the invention.

Figure 28:
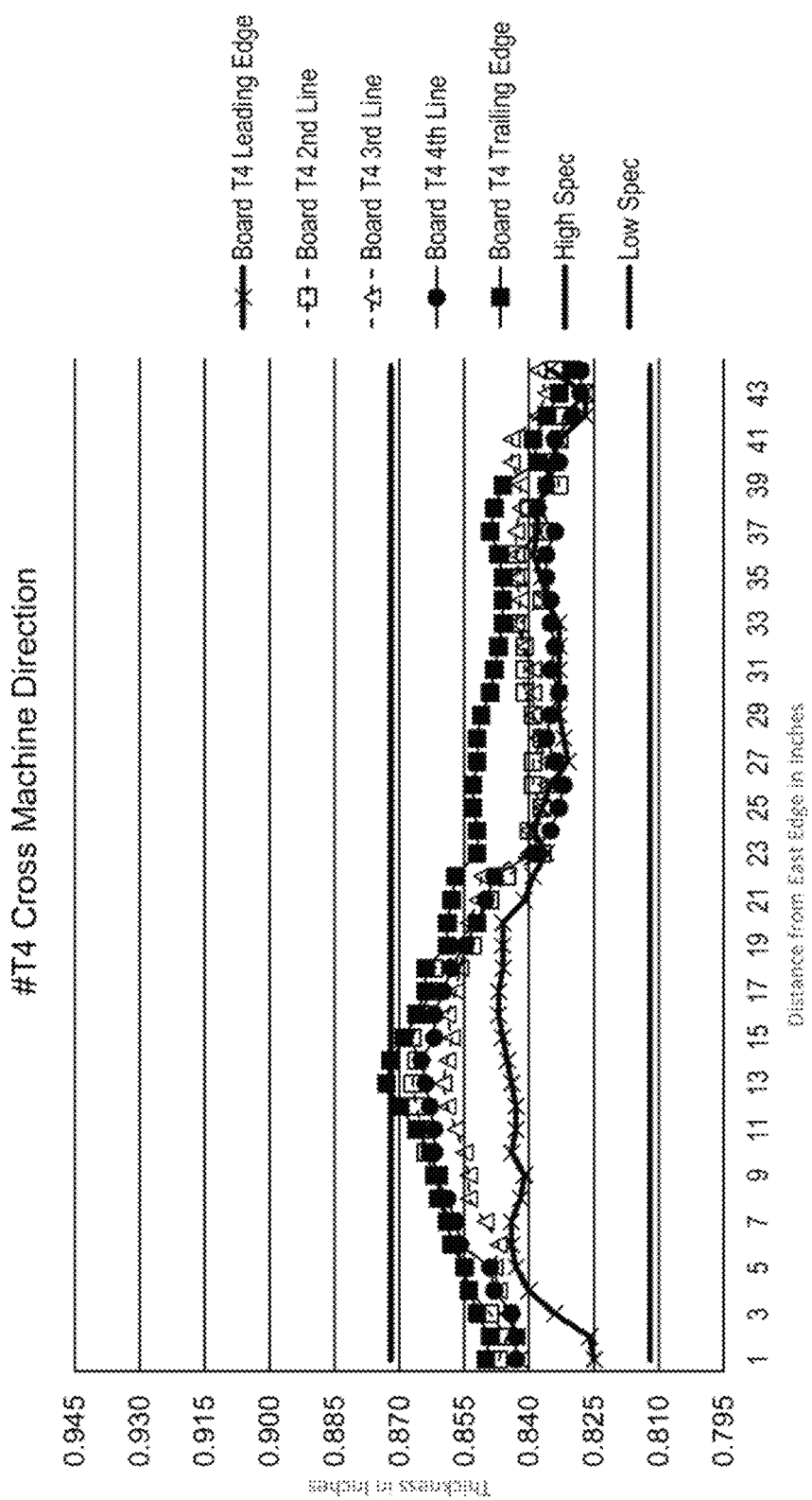
FIG. 28 shows cross-section profile of a formed cementitious panel for an example #T4 of the present specification measured in cross machine direction of a trial samples made in a production line with the thickness control device comprising the fixed horizontal forming plate of the invention.

FIG. 28 shows a cross-sectional profile of a formed cementitious panel for an example #T4 of the present specification measured in cross machine direction of a trial samples made in a production line with the thickness control device comprising the fixed horizontal forming plate of the invention.

Figure 29:
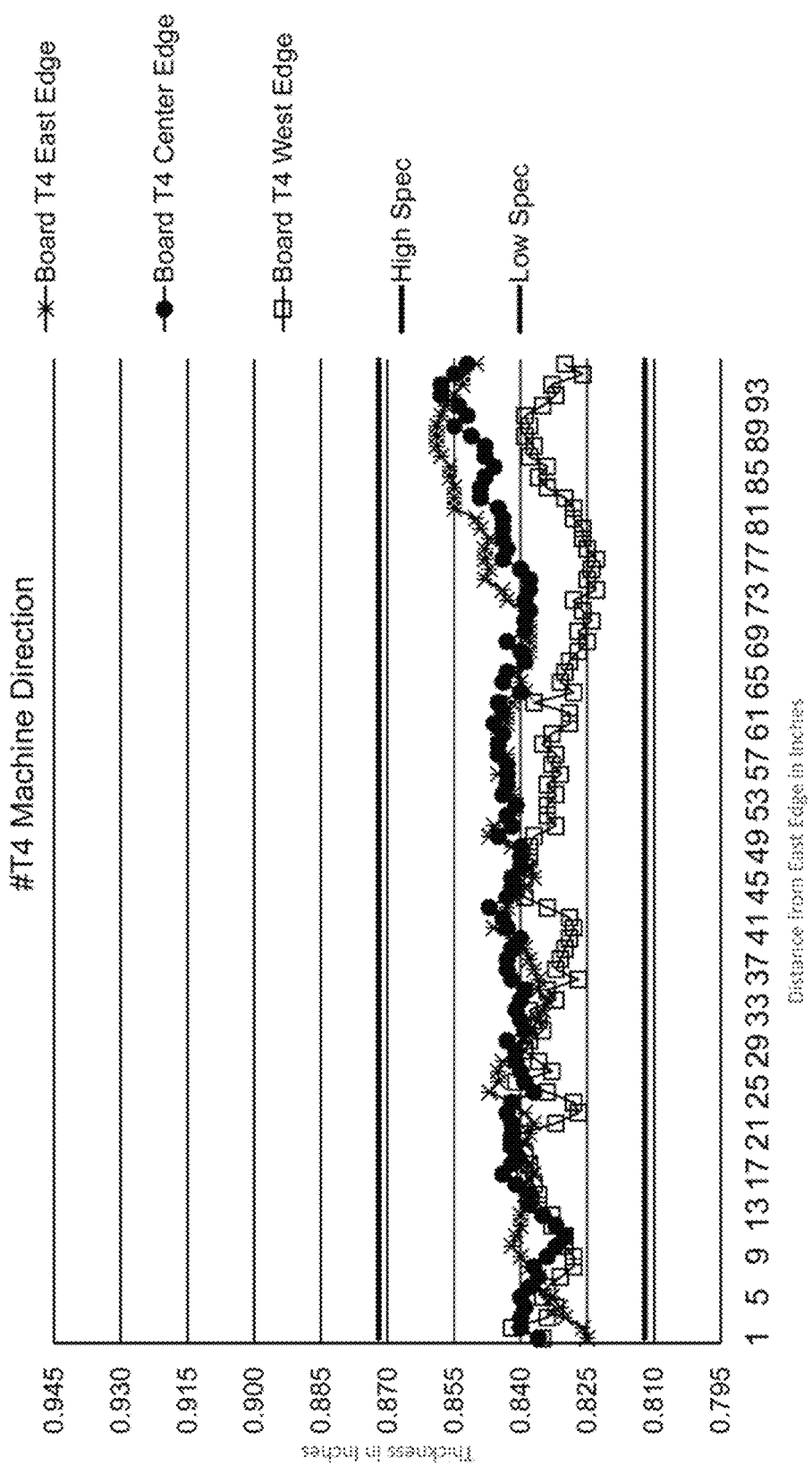
FIG. 29 shows cross-section profile of a formed cementitious panel for an example #T4 of the present specification measured in machine direction of a trial samples made in a production line with the thickness control device comprising the fixed horizontal forming plate of the invention.

FIG. 29 shows a cross-sectional profile of a formed cementitious panel for an example #T4 of the present specification measured in machine direction of a trial samples made in a production line with the thickness control device comprising the fixed horizontal forming plate of the invention.

The data of this example showed the effectiveness of the fixed horizontal forming plate of this invention in reducing thickness variation. The data of this example proved the concept produced FRC panels with dramatic reduction to thickness variation for making the FRC panels which are formed with multiple layers of cement slurry and glass fiber, in addition to panels formed with just one layer of pre-mixed cement slurry and glass fiber. This reduction allows reducing the average thickness of formed panels while avoiding individual thin spots which would result in the panel being rejected for being off-specification.

Example 5—Achieving Target Panel Thickness on the Panel Forming Line by Employing a Facer Fabric and a Thickness Control Device Comprising the Fixed Horizontal Forming Plate A production trial employing a fixed forming plate was conducted using a multi-layer process in a full-scale manufacturing plant. A glass mat facer was used in conjunction with the fixed forming plate. The multilayer panel was made utilizing 4 distinct slurry layers and seven discrete fiber layers. The target panel thickness was 0.77 inches with a tolerance of +/−0.03 inches. The fixed forming plate was same as the one described in Example 4. The forming plate was adjusted such that the gap between the bottom surface of the forming plate and the forming surface was about 0.77 inches.

The boards were made using a gypsum-cement binder composition. The cementitious binder comprised a composite blend of calcium sulfate alpha hemihydrate, Portland cement, silica fume, and hydrated lime added in the following proportions 62:25:12:1, respectively. Expanded perlite was used as a lightweight filler. The perlite particles were chemically coated with a silicone-based hydrophobic chemical coating to reduce particle water absorption. The perlite to cementitious binder weight ratio was 0.09. Water and chemical processing aids were added in sufficient quantities to obtain an aqueous mixture of workable consistency required for the process. Alkali-resistant glass fibers were used as structural reinforcement in the panel.

Five panels of size 48 inches×96 inches were selected for thickness measurements. Thickness measurements were made in machine direction (i.e., along the 96 inch dimension) as well in the cross-machine direction (i.e., across the 48 inch dimension). Thickness measurements were made at a spacing interval of 4 inches—i.e., 24 measurements were made in machine direction and 12 measurements were made in the cross-machine direction. TABLE 6 shows the measured average thickness as well as the measured standard deviation. It can be observed that the average measured thickness of five panels was 0.783 inches in the machine direction as well as 0.783 inches in the cross-machine direction. It can also be observed that the measured panel thickness was within the target thickness specification of 0.77+/−0.03 inches.

TABLE 6

| Property | Measured Panel Thickness | |
| --- | --- | --- |
| | Cross-machine Direction inches | Machine Direction inches |
| Average Thickness | 0.783 | 0.783 |
| Average Std. Dev. | 0.011 | 0.006 |

Figure 30:
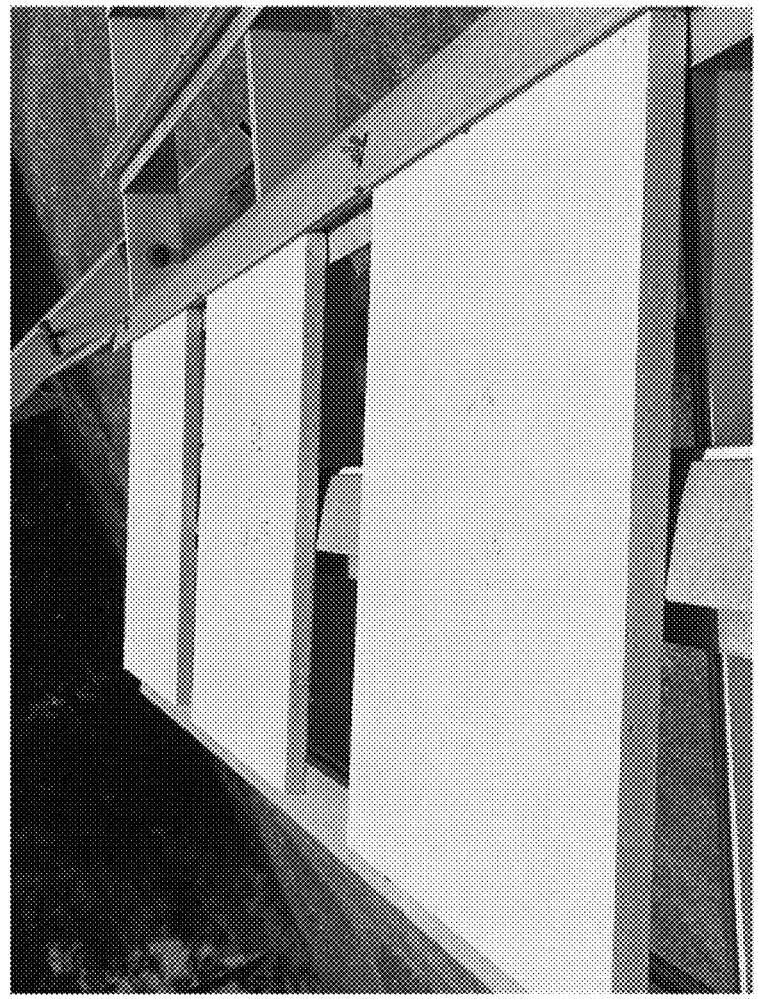
FIG. 30 shows FRC panels with glass mat facer in an exterior weathering exposure farm located in Northern Illinois, USA.
Figure 31A:
FIG. 31A shows a closeup view (front surface) of a FRC panel without a facer after nine months of exterior weathering exposure
Figure 31B:
FIG. 31B shows a closeup view (front surface) of a FRC panel with glass mat facer after nine months of exterior weathering exposure

Example 6—Enhanced Weathering and Exterior Durability of Panels Employing Glass Mat Facer It has unexpectedly been found that application of a facer fabric material on the panel surface helps to significantly enhance the durability of panels when exposed to weathering in exterior environments. Panels from Example 4 comprising glass mat facer were exposed to weathering in an exterior weathering exposure farm, located in Illinois, USA, as shown in FIG. 30. The panels (24 inches×24 inches size specimen) were exposed for about nine months where they witnessed one winter season, one spring season, and one summer season. At the end of the summer season, observations were made to assess the panel physical characteristics and durability. FIG. 31a shows a photograph of a FRC panel without a facer after nine months of exterior exposure. FIG. 31b shows a photograph of a FRC panel with glass mat facer only on the top surface after nine months of exterior exposure. The panels with glass mat were found to be in very good condition with the glass mat being firmly adhered to the base panel. The back surface and cut edges were in very good condition with no observable signs of material erosion or damage. This unexpected physical behavior is comparatively superior to the FRC panels without glass mat where the panel surface can be observed to erode (slight pitting and surface wear) with prolonged exterior weathering exposure.

CLAUSES OF THE INVENTION

The following clauses disclose aspects of the invention.

Clause 1. A fiber reinforced cementitious panel production line comprising:

a moving carrier web, a support frame for supporting the moving carrier web, wherein the panel is transported on the moving carrier web having a direction of travel relative to the support frame, and a thickness control device for controlling thickness of a formed, but not yet set, fiber reinforced cementitious panel comprising fiber laden cementitious slurry comprising cementitious material and embedded chopped fibers on the moving carrier web, wherein the thickness control device comprises an angled rigid plate and a mounting frame for mounting the angled rigid plate over the support frame for the moving carrier web, and a flat, rigid support bed under the angled rigid plate, adapted and configured sufficient to support the fiber laden slurry and preferably withstand downward force exerted by the angled rigid plate with deflection less than 0.03 inches, preferably less than 0.01 inches, preferably less than 0.003 inches, the angled rigid plate having a transverse upstream back wall, a transverse downstream bottom wall extending downstream from a lower end of the transverse upstream back wall, open sidewalls and an open top, wherein the bottom wall lower surface has a flat horizontal profile, the transverse upstream back wall meeting the downstream bottom wall to form a bent transition section aligned transverse to the moving carrier web direction of travel, and the transverse upstream back wall meeting the transverse downstream bottom wall to form an angle (8) in a range of 60 to 120 degrees, preferably from 70° to 110°, and most preferably from 80° to 100°, the transverse upstream back wall directed from the bent transition section upwardly away from the moving carrier web, the transverse downstream bottom wall directed from the bent transition section downwardly towards the moving carrier web, the angled rigid plate transverse upstream back wall mounted to the mounting stand to be transverse to the direction of travel of the moving carrier web, a vibrator attached to the angled rigid plate transverse upstream back wall, the mounting stand for fixedly, but adjustably, maintaining height of the angled plate over the moving carrier web and fixedly, but adjustably, maintaining mounting member angle "α" (alpha) of the angled plate relative to the moving carrier web 5° to 30°, typically the angle is in the range of 10° to 25°, to fixedly locate a downstream end of the transverse bottom wall at a height of 0.1 to 2 inches, preferably 0.2 to 1.1 inches, over the moving carrier web, wherein the downstream end of the transverse bottom wall is transverse to the direction of travel of the slurry and moving carrier web, wherein the downstream end of the transverse bottom wall extends transversely across on the moving web, and wherein the downstream end of the transverse bottom wall is capable of contacting the fiber-laden slurry when carried on the moving carrier web.

Clause 2. The apparatus of Clause 1, wherein the thickness control device comprises the angled rigid plate and wherein the mounting frame comprises a U-shaped mounting stand for mounting the angled rigid plate over the support frame for the moving carrier web, the mounting stand having opposed upright members, a tiltable transverse mounting member having opposed ends mounted to respective upright members at a fixed but adjustable angle relative to the moving carrier web and fixed but adjustable height above the moveable carrier web, the mounting frame also having a connector plate having an upper end portion attached to the transverse mounting member and a lower end portion attached to a back wall of the angled rigid plate, the vibrator (vibration motor) is also mounted to the back wall of the angled rigid plate.

Clause 3. The apparatus of Clause 2, wherein the U-shaped mounting frame has upright members fixedly attached to a stationary frame crosspiece, the U-shaped mounting frame also has the tiltable transverse mounting member moveably attached to the upright members. the tiltable transverse mounting member has opposed ends each rotatably mounted to a respective metal plate with holes for angle adjustment.

Clause 4. The apparatus of Clause 3, wherein each of the opposed ends of the transverse mounting member is mated with a selected hole of the tiltable transverse mounting member for angle adjustment to fixedly set the angle "α" (alpha) of the angled rigid plate relative to the moveable carrier web.

Clause 5. The apparatus of Clause 4, wherein to assist in adjusting angle, the tiltable transverse mounting member is provided with a handle to lift up and down the vibrating plate.

Clause 6. The apparatus of any of Clauses 1 to 5, wherein the length of the rigid angled plate in the machine direction of travel "T" on the side in contact with the slurry is typically from about 2 inches to 24 inches and the width of the vibrating angled plate in the direction transverse to the machine direction of travel "T" can range from about 1 feet to 8 feet, wherein the preferred width of the metal plate ranges from about 2 feet to 6 feet, or about 2 feet to 5 feet, or about 3 feet to 4 feet.

Clause 7. The apparatus of any of Clauses 1 to 6, wherein the thickness of the vibrating angled plate 95 on the side for contact with the slurry is typically from about 1/16 inches to 1/4 inches, wherein the preferred thickness of the plate on the side for contact with the slurry is about 1/8 inches with a gradual taper from 1/4 inches thick on side adapted and configured to be away from the slurry contact to 1/16 inches on the edge for contact with slurry.

Clause 8. The apparatus of any of Clauses 1 to 7, wherein the depth of embedding the angled plate and vibration means into the fiber laden slurry is for applying force to the surface of the panel sufficient to control thickness of the surface.

Clause 9. The apparatus of any of Clauses 1 to 8, further comprising means for depositing chopped fibers upon the slurry transported on the moving carrier web relative to the support frame, means for embedding the fibers in the slurry on the moving carrier web to form the formed, but not yet set, fiber reinforced concrete panel by passing the slurry with the deposited fibers through an embedment device for use in the fiber reinforced concrete panel production line to contact a first plurality of axially spaced disks axially fixed to a first integrally formed elongate shaft rotatably secured to the support frame and contact a second plurality of axially spaced disks axially fixed to a second integrally formed elongate shaft rotatably secured to the support frame;

said first shaft being disposed relative to said second shaft to be horizontally aligned and so that said disks intermesh with each other, and wherein, when viewed from the side, peripheries of said first and second pluralities of disks overlap each other.

Clause 10. The apparatus of any of Clauses 1 to 8, further comprising a mixer for mixing the cementitious slurry and reinforcing fibers to form the fiber laden slurry and feeding the fiber laden slurry to a headbox, a headbox for depositing a layer of fiber laden slurry onto the moving carrier web, wherein the fiber-slurry mixture deposited from the headbox has a slump of 4 to 11 inches as measured according to a slump test using a 4 inch tall and 2 inch diameter pipe, the resulting fiber-slurry mixtures also have a viscosity less than 45000 centipoise when measured using a Brookfield Viscometer, Model DV-II+ Pro with Spindle HA4 attachment running at 20 RPM speed.

Clause 11. A continuous process for controlling thickness of a formed, but not yet set, fiber reinforced cementitious panel comprising fiber laden cementitious slurry comprising cementitious material and embedded chopped fibers, in the fiber reinforced cementitious panel production line of claim 1 comprising the steps of: transporting the panel on a moving carrier web having a direction of travel relative to a support frame for supporting the moving carrier web, contacting the formed, but not yet set, fiber reinforced cementitious panel comprising slurry and embedded chopped fibers with a downstream end of a thickness control device, wherein the thickness control device comprises an angled rigid plate and a mounting frame for mounting the angled rigid plate over the support frame for the moving carrier web, and a flat, rigid support bed under the angled rigid plate, adapted and configured sufficient to support the fiber laden slurry and preferably withstand downward force exerted by the angled rigid plate with deflection less than 0.03 inches, preferably less than 0.01 inches, preferably less than 0.003 inches, the angled rigid plate having a transverse upstream back wall, a transverse downstream bottom wall extending downstream from a lower end of the transverse upstream back wall, open sidewalls and an open top, wherein the bottom wall lower surface has a flat horizontal profile, the transverse upstream back wall meeting the downstream bottom wall to form a bent transition section aligned transverse to the moving carrier web direction of travel, and the transverse upstream back wall meeting the transverse downstream bottom wall to form an angle in a range of 60 to 120 degrees, preferably from 70° to 110°, and most preferably from 80° to 100°, the transverse upstream back wall directed from the bent transition section upwardly away from the moving carrier web, the transverse downstream bottom wall directed from the bent transition section downwardly towards the moving carrier web, wherein the angled plate transverse upstream back wall is mounted to the mounting stand to be transverse to the direction of travel of the moving carrier web, a vibrator attached to the angled plate transverse upstream back wall, the mounting stand fixedly, but adjustably, maintaining height of the angled plate over the moving carrier web and fixedly, but adjustably, maintaining angle of the angled plate relative to the moving carrier web less than 30°, typically the angle is 5° to 30°, preferably in the range of 10° to 25°, to fixedly locate the downstream end of the bottom wall at a height of 0.1 to 2 inches, preferably 0.2 to 1.1 inches, over the moving carrier web, wherein the downstream end of the bottom wall contacts the fiber-laden slurry carried on the moving carrier web to control the thickness of the fiber laden slurry.

Clause 12. The process of Clause 11, wherein the angled plate is disposed over the entire width of the formed panel.

Clause 13. The process of any of Clauses 11-12, wherein the vibrating angled plate is placed such that the functional edge of the plate remains in contact with the slurry, at a depth 0.05 inches or more in to the slurry.

Clause 14. The process of any of Clauses 11-13, wherein the vibrating angled plate is vibrated by a vibrating motor 105 having a weight that is attached a distance from the metal plate, wherein the distance of the rotating weight ranges from the metallic plate is from about 0.50 to 8 inches, about 1 to 7 inches, or about 2 to 6 inches, so that the vibrations from motor and that of the plate remain in phase.

Clause 15. The process of any of Clauses 11-14, wherein the speed of rotation of the eccentric weights are typically from about 100 rpm to about 4000 rpm, the vibrating motor is mounted for use such that the eccentric weight attached to the rotating shaft rotates in the plane parallel to the metal plate face touching the cementitious slurry.

Clause 16. The process of any of Clauses 11-15, further comprising deposited chopped fibers upon the slurry transported on the moving carrier web relative to the support frame, embedding the fibers in the slurry on the moving carrier web in a fiber embedment station to form the formed, but not yet set, fiber reinforced concrete panel by passing the slurry with the deposited fibers through an embedment device for use in the fiber reinforced concrete panel production line to contact a first plurality of axially spaced disks axially fixed to a first integrally formed elongate shaft rotatably secured to the support frame and contact a second plurality of axially spaced disks axially fixed to a second integrally formed elongate shaft rotatably secured to the support frame;

said first shaft being disposed relative to said second shaft to be horizontally aligned and so that said disks intermesh with each other, and wherein, when viewed from the side, peripheries of said first and second pluralities of disks overlap each other.

Clause 17. The process of Clause 16, wherein the panel discharged from the fiber embedding station passes to the thickness control device.

Clause 18. The process of Clause 16, further wherein the panel passes through at least two fiber embedding stations and the panel discharged from the most downstream fiber embedding station is fed to the thickness control device.

Clause 19. The process of any of Clauses 11-15, further comprising mixing the cementitious slurry and reinforcing fibers to form the fiber laden slurry and feeding the fiber laden slurry to a headbox, depositing a layer of fiber laden slurry from headbox onto the moving carrier web, wherein the fiber-slurry mixture deposited from the headbox has a slump of 4 to 11 inches as measured according to a slump test using a 4 inch tall and 2 inch diameter pipe, the resulting fiber-slurry mixtures also have a viscosity less than 45000 centipoise when measured using a Brookfield Viscometer, Model DV-II+ Pro with Spindle HA4 attachment running at 20 RPM speed.

Clause 20. The process of Clause 19, wherein the fiber-slurry mixture deposited from the headbox has a slump of 4 to 11 inches as measured according to a slump test using a 4 inch tall and 2 inch diameter pipe. The resulting fiber-slurry mixtures also have a viscosity less than 45000 centipoise, preferably less than 30000 centipoise, more preferably less than 15000 centipoise, and most preferably less than 10000 centipoise when measured using a Brookfield Viscometer, Model DV-II+ Pro with Spindle HA4 attachment running at 20 RPM speed, typically the resulting fiber-slurry mixtures have a viscosity of at least 1500 centipoise.

Clause 21. The process of Clause 20, wherein the cementitious slurry and fibers discharged from the headbox and deposited uniformly as a continuous layer 0.125 to 2 inches thick on a moving surface of a panel production line to produce a fiber reinforced cement panel, wherein an outer lip of the bottom wall of the angled rigid plate assembly is situated from about 0.01 inches to 0.25 inches below the top surface of the panel being formed.

Clause 22. The process of any of Clauses 11-21, wherein the dry cementitious powder comprises a reactive powder portion and an optional lightweight filler portion, wherein the reactive portion comprises, on a dry basis, 35 to 75 wt. % calcium sulfate alpha hemihydrate, 20 to 55 wt. % hydraulic cement, 0.2 to 3.5 wt. % lime, and 5 to 25 wt. % of an active pozzolan.

Clause 23. The process of any of Clauses 11-22, wherein the slurry has a water to cement weight ratio of about 0.20 to about 0.7:1.

Clause 24. The process of any of Clauses 11-23, wherein dry cementitious powder comprises 20 to 50% by weight of the lightweight filler particles on a dry basis, wherein the lightweight filler particles are selected from the group consisting of ceramic microspheres, glass microspheres, fly ash cenospheres and perlite.

Clause 25. The process of any of Clauses 11-24, wherein the moving carrier web moves at a speed of 1 to 100 feet per minute.

Clause 26. A fiber reinforced cementitious panel production line comprising:
  a moving carrier web,
  a support frame for supporting the moving carrier web, wherein the panel is transported on the moving carrier web having a direction of travel relative to the support frame,
  a means for applying a facer, such as a glass mat, on a fiber laden cementitious slurry on the moving carrier web, the means for applying the facer placed across the width of a forming surface of the moving carrier web,
  a horizontal thickness control device for controlling thickness of a formed, but not yet set, fiber reinforced cementitious panel comprising fiber laden cementitious slurry comprising cementitious material and embedded chopped fibers on the moving carrier web,
    wherein the horizontal thickness control device comprises
    a rigid horizontal top forming plate (for example horizontal forming plate 446), wherein the rigid horizontal top forming plate has a flat bottom surface, an upstream end and a downstream end, and
    a forming plate mounting frame for mounting the rigid horizontal top forming plate in a horizontal orientation over the support frame for the moving carrier web, wherein the rigid horizontal top forming plate is mounted to the forming plate mounting frame, and
    a flat, rigid support bed under the rigid horizontal top forming plate, adapted and configured sufficient to support the fiber laden cementitious slurry and preferably withstand downward force exerted by the rigid horizontal top forming plate with deflection less than 0.03 inches, preferably less than 0.01 inches, preferably less than 0.003 inches,
  the forming plate mounting frame for fixedly, but adjustably, maintaining height of the rigid horizontal top forming plate over the moving carrier web and maintaining the rigid horizontal top forming plate parallel relative to the moving carrier web, to fixedly locate the flat bottom surface at a height of 0.1 to 2 inches, preferably 0.2 to 1.1 inches, over the moving carrier web,
  wherein the upstream end of the flat bottom surface extends across the moving web transversely, relative to direction of travel of the moving web,
  wherein the downstream end of the flat bottom surface extends across the moving web transversely, relative to direction of travel of the moving web, and
  wherein the entire flat bottom surface is capable of contacting the facer on the fiber-laden slurry when carried on the moving carrier web.

Clause 27. The apparatus of Clause 26, further comprising:
  means for depositing chopped fibers upon the slurry transported on the moving carrier web relative to the support frame,
  means for embedding the fibers in the slurry on the moving carrier web to form the formed, but not yet set, fiber reinforced concrete panel by passing the slurry with the deposited fibers through an embedment device for use in the fiber reinforced concrete panel production line to contact a first plurality of axially spaced disks axially fixed to a first integrally formed elongate shaft rotatably secured to the support frame and contact a second plurality of axially spaced disks axially fixed to a second integrally formed elongate shaft rotatably secured to the support frame;
  said first shaft being disposed relative to said second shaft to be horizontally aligned and so that said disks intermesh with each other, and wherein, when viewed from the side, peripheries of said first and second pluralities of disks overlap each other.

Clause 28. The apparatus of Clause 26, further comprising a mixer for mixing the cementitious slurry and reinforcing fibers to form the fiber laden slurry and feeding the fiber laden slurry to a headbox,
  a headbox for depositing a layer of fiber laden slurry onto the moving carrier web,
  wherein the fiber-slurry mixture deposited from the headbox has a slump of 4 to 11 inches as measured according to a slump test using a 4 inch tall and 2 inch diameter pipe, the resulting fiber-slurry mixtures also have a viscosity less than 45000 centipoise when measured using a Brookfield Viscometer, Model DV-II+ Pro with Spindle HA4 attachment running at 20 RPM speed.

Clause 29. The apparatus of any of Clauses 26-28, wherein an upstream end of the horizontal forming plate is beveled.

Clause 30. A process for making fiber reinforced cementitious panel comprising:
  transporting a fiber laden slurry for a panel on a moving carrier web, the moving carrier web supported by a support frame, wherein the panel is transported on the moving carrier web having a direction of travel relative to the support frame,
  applying a facer, such as a glass mat, on a fiber laden cementitious slurry on the moving carrier web, across the width of a forming surface of the moving carrier web to cover the forming surface,
  passing the facer covered forming surface under a horizontal thickness control device for controlling thickness of a formed, but not yet set, fiber reinforced cementitious panel comprising fiber laden cementitious slurry comprising cementitious material and embedded chopped fibers on the moving carrier web,
    wherein the thickness control device comprises
    a rigid horizontal top forming plate (for example horizontal forming plate 446), wherein the rigid horizontal top forming plate has a flat bottom surface, an upstream end and a downstream end, and
    a forming plate mounting frame for mounting the rigid horizontal top forming plate in a horizontal orientation over the support frame for the moving carrier web, wherein the rigid horizontal top forming plate is mounted to the forming plate mounting frame, and
    a flat, rigid support bed under the rigid horizontal top forming plate, adapted and configured sufficient to support the fiber laden cementitious slurry and preferably withstand downward force exerted by the rigid horizontal top forming plate with deflection less than 0.03 inches, preferably less than 0.01 inches, preferably less than 0.003 inches, controlling thickness of the formed, but not yet set, fiber reinforced cementitious panel by contacting the facer covered formed, but not yet set, fiber reinforced cementitious panel comprising fiber laden cementitious slurry with a bottom surface of the rigid horizontal top forming plate;

the mounting frame for fixedly, but adjustably, maintaining height of the rigid horizontal top forming plate over the moving carrier web and maintaining the plate parallel relative to the moving carrier web, to fixedly locate the flat bottom surface at a height of 0.1 to 2 inches over the moving carrier web, wherein the upstream end of the flat bottom surface extends across the moving web transversely, relative to direction of travel of the moving web, wherein the downstream end of the flat bottom surface extends across the moving web transversely, relative to direction of travel of the moving web, and wherein the entire flat bottom surface contacting the facer on the fiber-laden slurry when carried on the moving carrier web.

Clause 31. The process of Clause 30:

further comprising deposited chopped fibers upon the slurry transported on the moving carrier web relative to the support frame, embedding the fibers in the slurry on the moving carrier web to form the formed, but not yet set, fiber reinforced concrete panel by passing the slurry with the deposited fibers through an embedment device for use in the fiber reinforced concrete panel production line to contact a first plurality of axially spaced disks axially fixed to a first integrally formed elongate shaft rotatably secured to the support frame and contact a second plurality of axially spaced disks axially fixed to a second integrally formed elongate shaft rotatably secured to the support frame;

said first shaft being disposed relative to said second shaft to be horizontally aligned and so that said disks intermesh with each other, and wherein, when viewed from the side, peripheries of said first and second pluralities of disks overlap each other.

Clause 32. The process of Clause 30, further comprising mixing the cementitious slurry and reinforcing fibers to form the fiber laden slurry and feeding the fiber laden slurry to a headbox, depositing a layer of fiber laden slurry from headbox onto the moving carrier web, wherein the fiber-slurry mixture deposited from the headbox has a slump of 4 to 11 inches as measured according to a slump test using a 4 inch tall and 2 inch diameter pipe, the resulting fiber-slurry mixtures also have a viscosity less than 45000 centipoise when measured using a Brookfield Viscometer, Model DV-II+ Pro with Spindle HA4 attachment running at 20 RPM speed.

Clause 33. The process of Clause 32, wherein the cementitious slurry and fibers discharged from the headbox and deposited uniformly as a continuous layer 0.125 to 2 inches thick on a moving surface of a panel production line to produce a fiber reinforced cement panel, wherein an outer lip of the bottom wall of the angled rigid plate assembly is situated from about 0.01 inches to 0.25 inches below the top surface of the panel being formed.

Clause 34. The process of any of Clauses 30 to 33, wherein the moving carrier web moves at a speed of 1 to 100 feet per minute.

Clause 35. The process of any of Clauses 30 to 34, wherein the slurry has a water to cement weight ratio of about 0.20 to about 0.7:1.

Clause 36. The process of any of Clauses 30 to 35, wherein the dry cementitious powder comprises a reactive powder portion and an optional lightweight filler portion, wherein the reactive portion comprises, on a dry basis, 35 to 75 wt. % calcium sulfate alpha hemihydrate, 20 to 55 wt. % hydraulic cement, 0.2 to 3.5 wt. % lime, and 5 to 25 wt. % of an active pozzolan.

Clause 37. The process of any of Clauses 30 to 36, wherein dry cementitious powder comprises 20 to 50% by weight of the lightweight filler particles on a dry basis, wherein the lightweight filler particles are selected from the group consisting of ceramic microspheres, glass microspheres, fly ash cenospheres and perlite.

Clause 38. The process of any of Clauses 30 to 33, wherein the fixed horizontal forming plate is placed to locate the lower surface of the fixed horizontal forming plate at a height 0.001 to 0.05 inch, preferably 0.01 to 0.03 inch, less than a target thickness of the FRC panel.

While particular embodiments of the present fiber-reinforced cementitious structural panel production have been shown and described, it will be appreciated by those skilled in the art that changes and modifications may be made thereto without departing from the invention in its broader aspects and as set forth in the following claims.

What is claimed is:

1. A fiber reinforced cementitious panel production line comprising:
    a moving carrier web,
    a support frame for supporting the moving carrier web, wherein the panel is transported on the moving carrier web having a direction of travel relative to the support frame, and
    a thickness control device for controlling thickness of a formed, but not yet set, fiber reinforced cementitious panel comprising fiber laden cementitious slurry comprising cementitious material and embedded chopped fibers on the moving carrier web, wherein the thickness control device comprises:
    an angled rigid plate and
    a mounting frame for mounting the angled rigid plate over the support frame for the moving carrier web, and
    a flat, rigid support bed under the angled rigid plate, adapted and configured sufficient to support the fiber laden slurry and withstand downward force exerted by the angled rigid plate with deflection less than 0.03 inches,
    the angled rigid plate having a transverse upstream back wall, a transverse downstream bottom wall extending downstream from a lower end of the transverse upstream back wall, open sidewalls and an open top, wherein the bottom wall lower surface has a flat horizontal profile, the transverse upstream back wall meeting the downstream bottom wall to form a bent transition section aligned transverse to the moving carrier web direction of travel, and the transverse upstream back wall meeting the transverse downstream bottom wall to form an angle ($\theta$) in a range of 60 to 120 degrees, the transverse upstream back wall directed from the bent transition section upwardly away from the moving carrier web, the transverse downstream bottom wall directed from the bent transition section downwardly towards the moving carrier web, the angled rigid plate transverse upstream back wall mounted to the mounting stand to be transverse to the direction of travel of the moving carrier web, a vibrator attached to the angled rigid plate transverse upstream back wall, the mounting stand for fixedly, but adjustably, maintaining height of the angled plate over the moving carrier web and fixedly, but adjustably, maintaining a mounting member angle "α" (alpha) of the angled plate relative to the moving carrier web at an angle in a range of 5° to 30°, to fixedly locate a downstream end of the transverse bottom wall at a height of 0.1 to 2 inches, over the moving carrier web, wherein the downstream end of the transverse bottom wall is transverse to the direction of travel of the slurry and moving carrier web, wherein the downstream end of the transverse bottom wall extends transversely across on the moving web, and wherein the downstream end of the transverse bottom wall is capable of contacting the fiber-laden slurry when carried on the moving carrier web.

2. A fiber reinforced cementitious panel made using the apparatus of claim 1.

3. A fiber reinforced cementitious panel production line comprising:

a moving carrier web, a support frame for supporting the moving carrier web, wherein the panel is transported on the moving carrier web having a direction of travel relative to the support frame, a means for applying a facer on a fiber laden cementitious slurry on the moving carrier web, the means for applying the facer placed across the width of a forming surface of the moving carrier web, a horizontal thickness control device for controlling thickness of a formed, but not yet set, fiber reinforced cementitious panel comprising fiber laden cementitious slurry comprising cementitious material and embedded chopped fibers on the moving carrier web, the means for applying the facer upstream of the horizontal thickness control device, wherein the horizontal thickness control device comprises a rigid horizontal top forming plate, wherein the rigid horizontal top forming plate has a flat bottom surface, an upstream end and a downstream end, and a forming plate mounting frame for mounting the rigid horizontal top forming plate in a horizontal orientation over the support frame for the moving carrier web, wherein the rigid horizontal top forming plate is mounted to the forming plate mounting frame, and a flat, rigid support bed under the rigid horizontal top forming plate, adapted and configured sufficient to support the fiber laden cementitious slurry and withstand downward force exerted by the rigid horizontal top forming plate with deflection less than 0.03 inches, the forming plate mounting frame for fixedly, but adjustably, maintaining height of the rigid horizontal top forming plate over the moving carrier web and maintaining the rigid horizontal top forming plate parallel relative to the moving carrier web, to fixedly locate the flat bottom surface at a height of 0.1 to 2 inches over the moving carrier web to provide a fixed gap between the lower surface of the rigid horizontal forming plate and the moving carrier web, wherein the upstream end of the flat bottom surface extends across the moving web transversely, relative to direction of travel of the moving web, wherein the downstream end of the flat bottom surface extends across the moving web transversely, relative to direction of travel of the moving web, and wherein the entire flat bottom surface is capable of contacting the facer on the fiber-laden slurry when carried on the moving carrier web.

4. A fiber reinforced cementitious panel made using the production line of claim 3.

5. A process for making fiber reinforced cementitious panel comprising:

transporting a fiber laden slurry for a panel on a moving carrier web, the moving carrier web supported by a support frame, wherein the panel is transported on the moving carrier web having a direction of travel relative to the support frame, applying a facer on a fiber laden cementitious slurry on the moving carrier web, across the width of a forming surface of the moving carrier web to cover the forming surface, passing the facer covered forming surface under a horizontal thickness control device for controlling thickness of a formed, but not yet set, fiber reinforced cementitious panel comprising fiber laden cementitious slurry comprising cementitious material and embedded chopped fibers on the moving carrier web, wherein the thickness control device comprises a rigid horizontal top forming plate, wherein the rigid horizontal top forming plate has a flat bottom surface, an upstream end and a downstream end, and a forming plate mounting frame for mounting the rigid horizontal top forming plate in a horizontal orientation over the support frame for the moving carrier web, wherein the rigid horizontal top forming plate is mounted to the forming plate mounting frame, and a flat, rigid support bed under the rigid horizontal top forming plate, adapted and configured sufficient to support the fiber laden cementitious slurry and preferably withstand downward force exerted by the rigid horizontal top forming plate with deflection less than 0.03 inches, controlling thickness of the formed, but not yet set, fiber reinforced cementitious panel by contacting the facer covered formed, but not yet set, fiber reinforced cementitious panel comprising fiber laden cementitious slurry with a bottom surface of the rigid horizontal top forming plate;

the mounting frame for fixedly, but adjustably, maintaining height of the rigid horizontal top forming plate over the moving carrier web and maintaining the plate parallel relative to the moving carrier web, to fixedly locate the flat bottom surface at a height of 0.1 to 2 inches over the moving carrier web, wherein the upstream end of the flat bottom surface extends across the moving web transversely, relative to direction of travel of the moving web, wherein the downstream end of the flat bottom surface extends across the moving web transversely, relative to direction of travel of the moving web.

6. A fiber reinforced cementitious panel made using the process of claim 5.

7. The production line of claim 1, wherein the flat, rigid support bed under the angled rigid plate, adapted and configured sufficient to support the fiber laden slurry and preferably withstand downward force exerted by the angled rigid plate with deflection less than 0.01 inches,
the transverse upstream back wall meets the transverse downstream bottom wall to form an angle in a range of from 70° to 110°.

8. The production line of claim 1, wherein the flat, rigid support bed under the angled rigid plate, adapted and configured sufficient to support the fiber laden slurry and preferably withstand downward force exerted by the angled rigid plate with deflection less than 0.003 inches
the transverse upstream back wall meets the transverse downstream bottom wall to form an angle in a range of from 80° to 100° and
the mounting stand fixedly, but adjustably, maintaining height of the angled plate over the moving carrier web and fixedly, but adjustably, maintaining the angle of the angled plate relative to the moving carrier web in the range of 10° to 25°, to fixedly locate the downstream end of the bottom wall at a height of 0.2 to 1.1 inches, over the moving carrier web.

9. The production line of claim 1, wherein the mounting frame comprises a U-shaped mounting frame having a pair of opposed upright members fixedly attached to a stationary frame crosspiece,
the U-shaped mounting frame further comprises
a tiltable transverse mounting member moveably attached to the upright members,
a connector plate having an upper end portion attached to the transverse mounting member and a lower end portion attached to a back wall of the angled rigid plate,
the tiltable transverse mounting member has opposed ends each rotatably mounted to a respective metal plate with holes for angle adjustment on opposed sides of the mounting frame,
a metal rod locked at specific angular position by the holes on the metal plates mounted on the opposed sides of the mounting frame in a plane perpendicular to the forming surface, for adjustment of the angle of angled rigid plate relative to the moving carrier web,
wherein each of the opposed ends of the tiltable transverse mounting member is mated with a selected hole for angle adjustment of the plate to fixedly set the angle of the tiltable transverse mounting member relative to the moveable carrier web.

10. The production line of claim 9, wherein the connector plate has an elastomeric shock absorber between the upper end portion attached to the transverse mounting member and the lower end portion attached to a back wall of the angled rigid plate.

11. A process for making fiber reinforced cementitious panel on the fiber reinforced cementitious panel production line of claim 1 comprising:
transporting the panel on a moving carrier web having a direction of travel relative to a support frame for supporting the moving carrier web,
contacting the formed, but not yet set, fiber reinforced cementitious panel comprising slurry and embedded chopped fibers with a downstream end of a thickness control device, wherein the thickness control device comprises:
an angled rigid plate and
a mounting frame for mounting the angled rigid plate over the support frame for the moving carrier web, and
a flat, rigid support bed under the angled rigid plate, adapted and configured sufficient to support the fiber laden slurry and withstand downward force exerted by the angled rigid plate with deflection less than 0.03 inches,
the angled rigid plate having a transverse upstream back wall, a transverse downstream bottom wall extending downstream from a lower end of the transverse upstream back wall, open sidewalls and an open top, wherein the bottom wall lower surface has a flat horizontal profile, the transverse upstream back wall meeting the downstream bottom wall to form a bent transition section aligned transverse to the moving carrier web direction of travel, and the transverse upstream back wall meeting the transverse downstream bottom wall to form an angle in a range of 60 to 120 degrees, the transverse upstream back wall directed from the bent transition section upwardly away from the moving carrier web, the transverse downstream bottom wall directed from the bent transition section downwardly towards the moving carrier web,
wherein the angled plate transverse upstream back wall is mounted to the mounting stand to be transverse to the direction of travel of the moving carrier web,
a vibrator attached to the angled plate transverse upstream back wall,
the mounting stand fixedly, but adjustably, maintaining height of the angled plate over the moving carrier web and fixedly, but adjustably, maintaining angle of the angled plate relative to the moving carrier web in a range of is 5° to 30° to fixedly locate the downstream end of the bottom wall at a height of 0.1 to 2 inches, over the moving carrier web, wherein the downstream end of the bottom wall contacts the fiber-laden slurry carried on the moving carrier web to control the thickness of the fiber laden slurry,
wherein an outer lip of the bottom wall of the angled rigid plate assembly is situated below a top surface of panel being formed.

12. The process of claim 11, wherein an outer lip of the downstream end of the bottom wall is situated about 0.01 inches to 0.25 inches below the top surface of the panel being formed.

13. The process of claim 11, further comprising:
depositing the cementitious slurry containing reinforcing fibers on the inside surface of a rigidly mounted headbox,
depositing the cementitious slurry containing reinforcing fibers from the headbox as a continuous layer on to a travelling web;
wherein the cementitious slurry containing reinforcing fibers deposited from the headbox has a slump of 4 to 11 inches as measured according to a slump test using a 4-inch-tall and 2 inch diameter pipe, the cementitious slurry containing reinforcing fibers has a viscosity at least 1500 centipoise and less than 45000 centipoise, when measured using a Brookfield Viscometer, with Spindle HA4 attachment running at 20 RPM speed
wherein the slurry has a water to cement weight ratio of about 0.20 to about 0.7:1, wherein the dry cementitious powder comprises a reactive powder portion and an optional lightweight filler portion, wherein the reactive portion comprises, on a dry basis, 35 to 75 wt. % calcium sulfate alpha hemihydrate, 20 to 55 wt. % hydraulic cement, 0.2 to 3.5 wt. % lime, and 5 to 25 wt. % of an active pozzolan, wherein dry cementitious powder comprises 20 to 50% by weight of the lightweight filler particles on a dry basis, wherein the lightweight filler particles are selected from the group consisting of ceramic microspheres, glass microspheres, fly ash cenospheres and perlite.

14. The process of claim 11, wherein the flat, rigid support bed under the angled rigid plate, adapted and configured sufficient to support the fiber laden slurry and withstand downward force exerted by the angled rigid plate with deflection less than 0.01 inches,
   the transverse upstream back wall meets the transverse downstream bottom wall to form an angle in a range of from 70° to 110°.

15. The process of claim 11, wherein the transverse upstream back wall meets the transverse downstream bottom wall to form an angle in a range of from 80° to 100° and
   the mounting stand fixedly, but adjustably, maintaining height of the angled plate over the moving carrier web and fixedly, but adjustably, maintaining the angle of the angled plate relative to the moving carrier web in the range of 10° to 25°, to fixedly locate the downstream end of the bottom wall at a height of 0.2 to 1.1 inches, over the moving carrier web.

16. The process of claim 11, wherein the mounting frame comprises a U-shaped mounting frame having a pair of opposed upright members fixedly attached to a stationary frame crosspiece,
   the U-shaped mounting frame further comprises
   a tiltable transverse mounting member moveably attached to the upright members,
   a connector plate having an upper end portion attached to the transverse mounting member and a lower end portion attached to a back wall of the angled rigid plate,
   the tiltable transverse mounting member has opposed ends each rotatably mounted to a respective metal plate with holes for angle adjustment on opposed sides of the mounting frame,
   a metal rod locked at specific angular position by the holes on the metal plates mounted on the opposed sides of the mounting frame in a plane perpendicular to the forming surface, for adjustment of the angle of angled rigid plate relative to the moving carrier web,
   wherein each of the opposed ends of the tiltable transverse mounting member is mated with a selected hole for angle adjustment of the plate to fixedly set the angle of the tiltable transverse mounting member relative to the moveable carrier web.

17. The process of claim 16, wherein the connector plate has an elastomeric shock absorber between the upper end portion attached to the transverse mounting member and the lower end portion attached to a back wall of the angled rigid plate.

18. The production line of claim 3, wherein an upstream end of the horizontal forming plate is beveled such that an upper wall of the horizontal forming plate extends further upstream than a lower wall of the horizontal forming plate.

19. The process of claim 5, wherein the facer comprises a glass mat.

20. The process of claim 5, further comprising:
   depositing the cementitious slurry containing reinforcing fibers on the inside surface of a rigidly mounted headbox,
   depositing the cementitious slurry containing reinforcing fibers from the headbox as a continuous layer on to a travelling web;
   wherein the cementitious slurry containing reinforcing fibers deposited from the headbox has a slump of 4 to 11 inches as measured according to a slump test using a 4-inch-tall and 2 inch diameter pipe, the cementitious slurry containing reinforcing fibers has a viscosity at least 1500 centipoise and less than 45000 centipoise, when measured using a Brookfield Viscometer, with Spindle HA4 attachment running at 20 RPM speed,
   wherein the slurry has a water to cement weight ratio of about 0.20 to about 0.7:1, wherein the dry cementitious powder comprises a reactive powder portion and an optional lightweight filler portion, wherein the reactive portion comprises, on a dry basis, 35 to 75 wt. % calcium sulfate alpha hemihydrate, 20 to 55 wt. % hydraulic cement, 0.2 to 3.5 wt. % lime, and 5 to 25 wt. % of an active pozzolan, wherein dry cementitious powder comprises 20 to 50% by weight of the lightweight filler particles on a dry basis, wherein the lightweight filler particles are selected from the group consisting of ceramic microspheres, glass microspheres, fly ash cenospheres and perlite.

* * * * *